US010571482B2

(12) United States Patent
Wiseman

(10) Patent No.: US 10,571,482 B2
(45) Date of Patent: Feb. 25, 2020

(54) DIRECTIONAL DIFFERENTIAL PRESSURE DETECTOR HAVING INCLINATION ADJUSTMENT BETWEEN TWO CONDUITS

(71) Applicant: Brian M. Wiseman, Newbury, MA (US)

(72) Inventor: Brian M. Wiseman, Newbury, MA (US)

(*) Notice: Subject to any disclaimer, the term of this patent is extended or adjusted under 35 U.S.C. 154(b) by 438 days.

(21) Appl. No.: 15/356,396

(22) Filed: Nov. 18, 2016

(65) Prior Publication Data

US 2017/0067929 A1    Mar. 9, 2017

Related U.S. Application Data

(63) Continuation of application No. PCT/US2015/031773, filed on May 20, 2015.

(60) Provisional application No. 62/000,757, filed on May 20, 2014.

(51) Int. Cl.
*G01P 13/00* (2006.01)
*G01L 13/02* (2006.01)
*G01L 19/12* (2006.01)

(52) U.S. Cl.
CPC .......... *G01P 13/0066* (2013.01); *G01L 13/02* (2013.01); *G01L 19/12* (2013.01)

(58) Field of Classification Search
None
See application file for complete search history.

(56) References Cited

U.S. PATENT DOCUMENTS

| | | |
|---|---|---|
| 2,542,442 A | 2/1951 | Weber |
| 3,930,568 A | 1/1976 | Levey |
| 4,040,650 A | 8/1977 | Shotbolt |
| 4,154,101 A | 5/1979 | Buchanan et al. |
| 4,271,693 A | 6/1981 | Bute |
| 4,486,744 A | 12/1984 | Pratt et al. |
| 4,679,827 A | 7/1987 | Law |
| 4,787,251 A | 11/1988 | Kolodjski |
| 4,819,577 A | 4/1989 | Campau |

(Continued)

FOREIGN PATENT DOCUMENTS

| | | |
|---|---|---|
| GB | 394 145 A1 | 6/1933 |
| WO | WO 98/52050 A1 | 11/1998 |

OTHER PUBLICATIONS

Extended European Search Report for European Application No. 15796526.0, dated Oct. 18, 2017.

(Continued)

*Primary Examiner* — Harshad R Patel
(74) *Attorney, Agent, or Firm* — Wolf, Greenfield & Sacks, P.C.

(57) ABSTRACT

Methods and apparatuses for indicating the presence of a directional differential pressure between separated adjacent spaces are provided. A differential pressure set point indicator with integral calibration sensing the earth's gravitational horizontal or vertical planes may be configured to correlate multiple potential angles of inclination of a conduit located on one side of a wall to respective threshold differential pressures between two spaces which generate net flow of fluid sufficient to cause a lightweight ball to move from one region of the conduit to an opposing region. The inclination of the conduit may be adjusted through a rotatable configuration similar to a turret-type arrangement.

27 Claims, 38 Drawing Sheets

(56) References Cited

U.S. PATENT DOCUMENTS

| | | | |
|---|---|---|---|
| 5,195,376 | A | 3/1993 | Banks et al. |
| 5,291,182 | A | 3/1994 | Wiseman |
| 5,410,298 | A | 4/1995 | Wiseman |
| 5,461,910 | A | 10/1995 | Hodson et al. |
| 5,589,643 | A | 12/1996 | Pyle |
| 5,661,461 | A | 8/1997 | Wiseman |
| 5,787,919 | A | 8/1998 | Pyle |
| 5,798,697 | A | 8/1998 | Wiseman |
| 5,981,877 | A | 11/1999 | Sakata et al. |
| 6,477,896 | B1 | 11/2002 | Nyberg |
| 6,506,974 | B2 | 1/2003 | Nakata |
| 6,569,219 | B1 | 5/2003 | Connor et al. |
| 7,891,311 | B2 | 2/2011 | Logan et al. |
| 8,003,014 | B2 | 8/2011 | Breay et al. |
| 8,910,516 | B2 | 12/2014 | Wiseman |
| 9,395,260 | B2 | 7/2016 | Pyle |
| 10,191,077 | B2 | 1/2019 | Wiseman |
| 2009/0301213 | A1 | 12/2009 | Barmettler et al. |
| 2011/0094294 | A1 | 4/2011 | Townsend et al. |
| 2014/0260594 | A1 | 9/2014 | Wiseman |
| 2015/0059464 | A1 | 3/2015 | Wiseman |
| 2018/0164174 | A1* | 6/2018 | Wiseman ............... G01L 13/04 |
| 2019/0154724 | A1 | 5/2019 | Wiseman |

OTHER PUBLICATIONS

International Search Report and Written Opinion for Application No. PCT/US2015/031773, dated Aug. 7, 2015.
International Preliminary Report on Patentability for Application No. PCT/US2015/031773, dated Dec. 1, 2016.

* cited by examiner

DIRECTIONAL DIFFERENTIAL PRESSURE DETECTOR HAVING INCLINATION ADJUSTMENT BETWEEN TWO CONDUITS

RELATED APPLICATIONS

This application is a continuation of and claims the benefit of International Application No. PCT/US2015/031773, filed May 20, 2015 and entitled, "Directional Differential Pressure Detector", which claims priority to U.S. Provisional Application No. 62/000,757, filed May 20, 2014, each of which is incorporated herein by reference in its entirety.

FIELD

Aspects of the present disclosure relate generally to methods and apparatuses for detecting the presence of a directional differential pressure.

DISCUSSION OF RELATED ART

Various applications within hospitals, laboratories, pharmaceutical facilities, clean room facilities, etc., often require a particular direction of air flow to be maintained, such as between neighboring rooms, compartments, corridors, ducts, or other spaces. The pressure of a room relative to adjacent space(s) will determine the net direction of air flow through an opening into or out of the room.

For example, a hospital operating room, containing a patient who is undergoing surgery, may be supplied with highly filtered air so as to achieve a positive pressure, i.e., so that more air flows out of the room than into the room, thereby preventing dirty or infectious air from entering the room and entering the patient's wound. This positive pressure is accomplished by supplying clean air to the operating room at a greater flow rate than the flow rate at which air is exhausted from the room. Such an arrangement, where the operating room has a comparatively higher pressure than its surroundings, prevents air which may contain bacteria or other undesirable airborne contaminants from entering the operating room from the surrounding space(s).

Or, if a hospital patient is infected with an airborne communicable pathogen such as tuberculosis, the room may be kept under a negative pressure, i.e., the rate at which potentially contaminated air is exhausted from the room is greater than the rate at which air is supplied to the room and from the immediate surroundings. Such a negative pressure arrangement, where the room is under a comparatively lower pressure than its immediate surroundings, prevents air, which may contain bacteria or other undesirable airborne contaminants, from exiting the room and escaping into surrounding space(s).

The net differential pressure between rooms will cause air to flow from one room to the other in the direction from a higher pressure to a lower pressure. Depending on the application, the desired degree of differential pressure to be maintained between rooms, compartments, corridors, etc. will vary. For example, it is likely that a room that contains a highly infectious or hazardous matter should be kept under a greater degree of negative pressure than a room that contains a toxin that does not cause major concern.

Thus, it is often necessary that the general direction of air flow between compartments be closely monitored as well as the particular magnitude of differential pressure causing the net air flow. In addition, it may be desirable to refer to the detector when adjusting the magnitude of differential pressure between rooms, for example, when the application of the room has changed.

SUMMARY

The inventor has appreciated that it would be beneficial to provide a simple detection system for fluid (e.g., air) flow that provides quantitative information regarding different degrees of differential pressure that may exist between adjacent spaces (e.g., enclosed rooms, compartments, corridors, etc.) and the associated causal direction of fluid flow between the spaces. In addition, the inventor has appreciated the need for an adjustable set point threshold directional differential pressure detector incorporating an integrated differential pressure indication system that is calibrated with gravity (i.e., gravitational field of the earth).

As an example, the differential fluid (e.g., air) pressure between, e.g., two adjacent enclosed spaces A and B separated by a wall may be zero or more positive in space A than space B or more positive in space B than space A, causing a potential of air to flow between the spaces from zero or in the direction from space A to B or in the direction from space B to space A, respectively. The relative pressure between space A and B forms a differential pressure and depending on which space is of higher pressure, the relative pressure is directional in nature, i.e., causes a fluid to flow in a direction from a higher pressure region towards a lower pressure region and therefore a directional differential pressure exists.

Directional differential pressure detectors described herein may provide information that allows an observer to know immediately whether or not the room, as compared with its adjacent space, exhibits a particular direction of air flow, into or out of the room in response to a particular degree of negative or positive pressure difference, which may be required under set protocols for the room. Further, directional differential pressure detectors of the present disclosure may provide an observer not only with an indication that the direction of air flow from one space to another is in the desired direction, but also may inform the observer with the approximate magnitude of pressure difference between the spaces.

In some embodiments disclosed herein, a detection system is readily adjustable to account for changes in the use of the space. For example, when it is desired to change the direction of air flow and/or the differential pressure between spaces, differential pressure detectors discussed herein may be adjusted in a simple manner so as to provide an indication of whether the direction and magnitude of differential pressure between the spaces actually falls within the adjusted range.

A device for detecting a directional differential pressure between enclosed and neighboring spaces may include one or more elongated conduits arranged to be coupled with a wall (e.g., extend through the wall, located on substantially one side of the wall) connecting the spaces. The conduit(s) may have openings that may be located at opposite ends that permit fluid (e.g., air) to flow between the otherwise enclosed spaces through the conduit(s) in a direction that corresponds with the existing differential pressure between the spaces. It can be appreciated that the openings are not required to be located at opposite ends. For example, the openings may be located between the ends and/or positioned toward the end(s). At least one movable element (e.g., a lightweight ball) may be disposed within a lumen of a conduit so as to be affected by directional air flow generated by the pressure differential. That is, in response to the existing differential pressure between neighboring rooms, the resulting directional air flow may move the movable element from one region of the conduit to an opposite region (e.g., between two ends).

When the conduit is tilted at an angle with respect to a horizontal reference plane, one end of the conduit is positioned vertically lower than the opposite end. Absent net fluid flow through the conduit, the movable element falls by force of gravity to the lower end of the conduit. Though, given a sufficient amount of fluid flow through the conduit, from the lower end of the conduit towards the higher end (e.g., due to a net pressure differential), the force of gravity on the movable element may be overcome such that the movable element moves toward the higher end of the conduit.

The device may include a differential pressure set point indicator that responds to the angle of inclination of the conduit with respect to a horizontal plane. In particular, the differential pressure set point indicator may be configured and calibrated (e.g., based on a given size/weight of the movable element, parameters of the conduit, size of the openings at each end of the conduit) to correlate the angle of inclination of the conduit to a threshold differential pressure between the two spaces that is sufficient to cause the movable element within the conduit to move from one region (e.g., at a vertically lower position) of the conduit towards an opposite region (e.g., at a vertically higher position). For example, the greater the degree of tilt of the conduit, the greater the differential pressure required to generate sufficient fluid flow in the conduit to move the movable element from a lower region towards a higher region.

In some embodiments, a gravity sensing differential pressure set point indicator may be calibrated according to the gravitational field of the earth so as to display the directional differential pressure threshold required to move one or more movable elements from a vertically lower position of a conduit to a vertically higher position of the conduit.

In some embodiments, an elongated conduit may be adjustable in length. For example, the conduit may have two separate telescoping components that are slidable with respect to one another. Such adjustability in length may accommodate installation of the device into walls of varying thicknesses.

The movable element within the conduit may be contained by a stop near each of the ends of the open ended conduit. When the movable element impacts either of the stops of the conduit, in some cases, a noticeable sound may be heard, largely depending on the relative compositions of the movable element and the stop(s) of the conduit. For instance, with the conduit installed at an incline from the horizontal, when the differential pressure between spaces becomes equal (e.g., the door between the room and an outside corridor is opened resulting in pressure equalization), the movable element may drop down from a higher vertical position back to a lower vertical position within the conduit, and the impact of the movable element with a lower end stop of the conduit may produce a sound. Such a sound may be irritating to those in close proximity to the lower end of the conduit, particularly if repeated frequently. For example, hospital inpatients in an infectious isolation room or laboratory mice in a vivarium, may be awakened during their sleep cycle each time the staff enters and exits the room. Accordingly, the device may include a sound attenuator that is adapted to reduce noise upon impact of the movable element from one region of the conduit to an opposing region. In some embodiments, the sound attenuator may be a relatively soft energy absorbing material or include an energy absorbing geometry provided as part of an end stop.

The device may further include a sealing material (e.g., gasket) placed in contact with the exterior surface of the conduit so as to provide a seal between the surface of the wall and the conduit when the device is installed. Accordingly, transfer of potentially contaminated air between a space and the interior cavity of a hollow wall may be substantially prevented. As the conduit may be positioned at a particular angle of inclination when installed, the sealing material may be flexible to provide and maintain a seal as well as accommodate appropriate adjustment(s) in position of the conduit (e.g., from one angle of incline to another). Yet, for some embodiments, the sealing material may also be firm enough to provide a suitable amount of support for the tilted conduit (e.g., to maintain the position/orientation of the conduit).

In an illustrative embodiment, a device for indicating directional differential pressure between two spaces is provided. The device may include an elongated conduit arranged to be coupled with and substantially located on one side of a wall separating a first space from a second space. The conduit may have openings that permit fluid flow through the conduit from the first space toward the second space. The conduit may be arranged to be adjustably inclined with respect to a horizontal reference plane such that a first region of the conduit associated with the first space is vertically lower than a second, vertically higher region of the conduit that is associated with the second space. The device may include at least one movable element disposed within the conduit adapted to be moved from the first, vertically lower region of the conduit to the second, higher region or from the second higher region to the first vertically lower region, in response to a differential pressure between the first and second spaces. The device may include a differential pressure set point indicator configured to correlate each of a plurality of angles of inclination of the conduit with respect to the horizontal reference plane to a respective threshold differential pressure between the first and second spaces that is sufficient to cause the at least one movable element to move from the first, lower region of the conduit to the second, higher region.

In another illustrative embodiment, a device for indicating a directional differential pressure between two spaces is provided. The device may include an elongated conduit arranged to be coupled with a wall separating a first space from a second space, the conduit having openings that permit fluid flow through the conduit from the first space toward the second space, the conduit arranged to be inclined with respect to a horizontal or vertical reference plane such that a first region of the conduit associated with the first space is vertically lower than a second, vertically higher region of the conduit that is associated with the second space. The device may include at least one movable element disposed within the conduit adapted to be moved from the first, vertically lower region of the conduit to the second, higher region or from the second higher region to the first vertically lower region, in response to a differential pressure between the first and second spaces. The device may further include a differential pressure set point indicator configured to correlate each of a plurality of angles of inclination of the conduit with respect to the horizontal or vertical reference plane to a respective threshold differential pressure between the first and second spaces that is sufficient to cause the at least one movable element to move from the first, lower region of the conduit to the second, higher region.

In another illustrative embodiment, a device for indicating a directional differential pressure between two rooms is provided. The device may include an elongated conduit arranged to be coupled with a wall separating the two spaces, the conduit having openings ends that permit fluid flow between the two spaces through the conduit, the conduit being adjustable in length, and at least one movable element disposed within the conduit adapted to be moved from one region of the conduit toward an opposing region in response to the differential pressure.

In yet another illustrative embodiment, a device for indicating a directional differential pressure between two rooms is provided. The device may include an elongated conduit arranged to be coupled with a wall separating the two spaces, the conduit having openings that permit fluid flow between the two spaces through the conduit; at least one movable element disposed within the conduit adapted to be moved from one region of the conduit toward an opposing region in response to the differential pressure, and a sound attenuator adapted to reduce noise upon the movable element reaching one of the two conduit ends.

In another illustrative embodiment, a device for indicating a directional differential pressure between two rooms is provided. The device may include an elongated conduit arranged to be coupled with a wall separating the two spaces, the conduit having openings that permit fluid flow between the two spaces through the conduit; a sealing material in contact with an exterior surface of the conduit and adapted to support the conduit in an installed orientation, and at least one movable element disposed within the conduit adapted to be moved from one region of the conduit toward an opposing region in response to the differential pressure.

In an illustrative embodiment, a device for indicating directional differential pressure between two spaces is provided. The device may include an elongated conduit arranged to extend through a wall separating a first space from a second space, the conduit having openings that permit fluid flow through the conduit from the first space to the second space, the conduit arranged to be inclined with respect to a horizontal reference plane such that a first region of the conduit associated with the first space is vertically lower than a second, vertically higher region of the conduit that is associated with the second space. The device may include a plurality of movable elements each adapted to provide a set point indication of a respective threshold differential pressure between the first and second spaces that is sufficient to cause the movable element, when disposed within the conduit, to move from the first, vertically lower region of the conduit to the second, vertically higher region in response to a differential pressure between the first and second spaces.

In another illustrative embodiment, a device for indicating directional differential pressure between two spaces is provided. The device may include an elongated conduit arranged to extend through a wall separating a first space from a second space, the conduit having openings that permit fluid flow through the conduit from the first space to the second space, the conduit arranged to be inclined with respect to a horizontal reference plane such that a first region of the conduit associated with the first space is vertically lower than a second, vertically higher region of the conduit that is associated with the second space. The device may include a movable element disposed within the conduit, wherein the conduit is adapted to provide a set point indication of a respective threshold differential pressure between the first and second spaces that is sufficient to cause the movable element to move from the first, vertically lower region of the conduit to the second, vertically higher region in response to a differential pressure between the first and second spaces.

In an illustrative embodiment, a device for indicating directional differential pressure between two spaces is provided. The device may include a conduit arranged to be coupled with and substantially located on one side of a wall, the wall separating a first space and a second space, the conduit having openings that permit fluid flow through the conduit as part of allowing flow between the first space and the second space, wherein an angle of inclination of the conduit is adjustable with respect to a horizontal reference plane such that a first region of the conduit is vertically lower than a second, vertically higher region of the conduit. The device may further include at least one movable element disposed within the conduit and adapted to move from the first, vertically lower region of the conduit to the second, higher region, in response to a differential pressure between the first and second spaces. The device may include a differential pressure set point indicator configured to correlate each of a plurality of angles of inclination of the conduit with respect to the horizontal reference plane to a respective threshold differential pressure between the first and second spaces that is sufficient to cause the at least one movable element to move from the first, lower region of the conduit to the second, higher region.

In another illustrative embodiment, a device for indicating directional differential pressure between two spaces is provided. The device may include a first conduit arranged to extend through a portion of a wall, the wall separating a first space from a second space. The first conduit may have openings that permit fluid flow through the first conduit between the first space and the second space. The device may include a yoke body adapted to be coupled to one side of the wall and to house an end of the first conduit that extends through the portion of the wall. The device may include a second conduit rotatably (e.g., pivotally) coupled to the yoke body and in fluid communication with the first conduit. The second conduit may have openings that permit fluid flow through the second conduit between the first space and the second space. The second conduit may be arranged to be adjustably inclined with respect to a horizontal or vertical reference plane such that a first region of the second conduit associated with the first space is vertically lower than a second, vertically higher region of the second conduit associated with the second space. The device may include at least one movable element disposed within the second conduit adapted to be moved from the first, vertically lower region of the second conduit to the second, vertically higher region, in response to a differential pressure between the first and second spaces. The device may include a differential pressure set point indicator to correlate each of a plurality of angles of inclination of the second conduit with respect to the horizontal or vertical reference plane to a respective threshold differential pressure between the first and second spaces that is sufficient to cause the at least one movable element to move from the first, vertically lower region of the conduit to the second, vertically higher region.

In yet another illustrative embodiment, a method of installing a device for indicating a differential pressure between two spaces is provided. The method may include positioning an elongated conduit on one side of a wall separating a first space from a second space, the conduit having openings that permit fluid flow through the conduit from the first space to the second space, the conduit arranged to be inclined with respect to a horizontal reference plane such that a first region of the conduit associated with the first space is vertically lower than a second, vertically higher region of the conduit that is associated with the second space, wherein at least one movable element disposed within the conduit is adapted to be moved from the first, vertically lower region of the conduit to the second, higher region in response to a differential pressure between the first and second spaces. The method may include referring to a differential pressure set point indicator to determine a first angle of inclination of the conduit with respect to a horizontal reference plane that corresponds to a first threshold differential pressure between the first and second spaces that is sufficient to cause the at least one movable element to move from the first, lower region of the conduit to the second, higher region. The method may include tilting the conduit to achieve the determined first angle of inclination of the conduit with respect to the horizontal reference plane that corresponds to the first threshold differential pressure. The method may include referring to the differential pressure set point indicator to determine a second angle of inclination of the conduit with respect to the horizontal reference plane that corresponds to a second threshold differential pressure between the first and second spaces, different from the first threshold differential pressure, that is sufficient to cause the movable element to move from the first, lower region of the conduit to the second, higher region. The method may include tilting the conduit to achieve the determined second angle of inclination of the conduit with respect to the horizontal reference plane that corresponds to the second threshold differential pressure.

In another illustrative embodiment, a device for indicating directional differential pressure between two spaces is provided. The device may include at least one conduit arranged to extend through a wall separating a first space from a second space, the at least one conduit having openings that permit fluid flow through the at least one conduit between the first space and the second space, the at least one conduit having a first portion, a second portion and a middle portion, the first portion extending from the first space toward the middle portion and inclined with respect to a horizontal reference plane such that an end of the first portion located within the first space is vertically higher than the middle portion, the second portion extending from the second space toward the middle portion and inclined with respect to the horizontal reference plane such that an end of the second portion located within the second space is vertically higher than the middle portion. The device may further include at least one movable element disposed within the at least one conduit and movable from the first portion of the at least one conduit to the second portion of the at least one conduit in response to a differential pressure between the first and second spaces.

In some embodiments, the conduit includes a conductive material adapted to dissipate electrostatic charge build-up that may otherwise arise therein.

In some embodiments, the air flow traveling through the conduit from one room to an adjacent room may be stopped, reversed or otherwise regulated as desired, by any suitable method. This requirement may be maintained throughout any position of the apparatus' vertically adjustable conduit.

Advantages, novel features, and objects of the present disclosure will become apparent from the following detailed description of the present disclosure when considered in conjunction with the accompanying drawings, which are schematic and which are not intended to be drawn to scale. For purposes of clarity, not every component is labeled in every figure, nor is every component of each embodiment of the present disclosure shown where illustration is not necessary to allow those of ordinary skill in the art to understand the present disclosure.

BRIEF DESCRIPTION OF THE DRAWINGS

The accompanying drawings are not intended to be drawn to scale. In the drawings, each identical or nearly identical component that is illustrated in various figures is represented by a like numeral. Various embodiments of the present disclosure will now be described, by way of example, with reference to the accompanying drawings. The embodiments and drawings shown are not intended to narrowly define the present disclosure.

DETAILED DESCRIPTION

Figure 1:
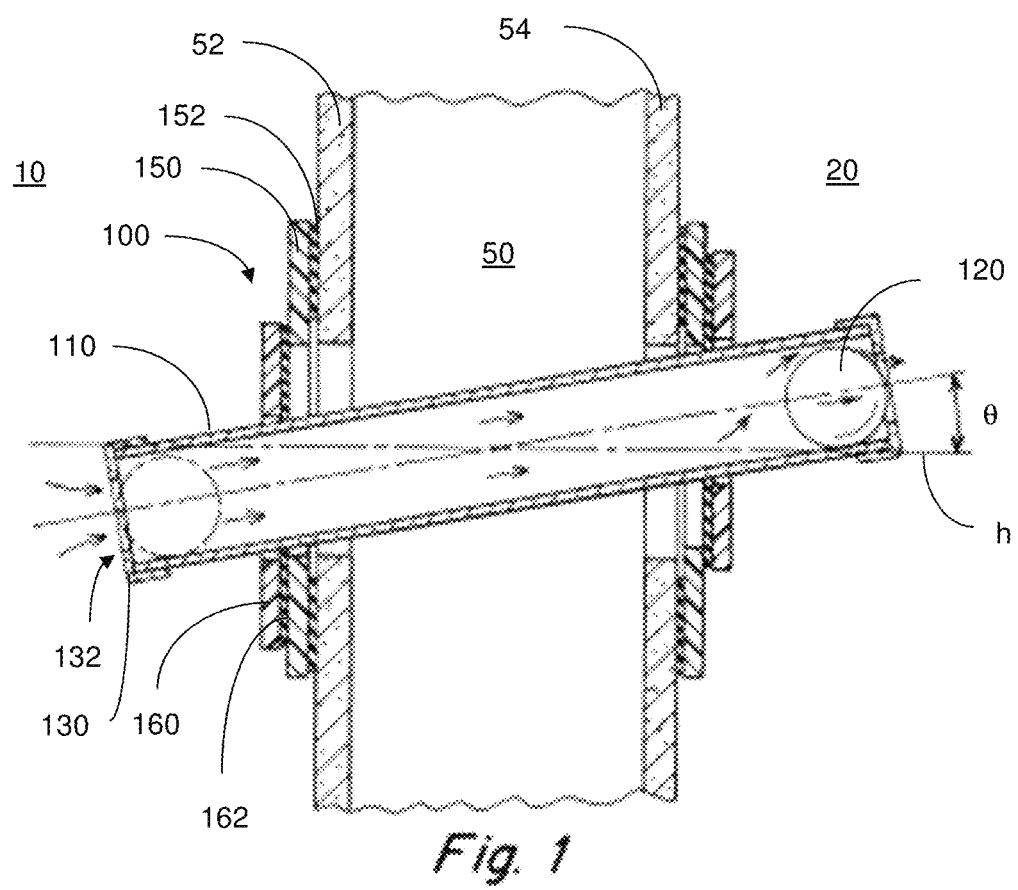
FIG. 1 is a cross-sectional view of a device subject to a differential pressure in accordance with some embodiments.

The present disclosure relates to a device that provides an indication of directional air flow and whether a particular degree of directional differential pressure exists between spaces separated by a wall (e.g., two neighboring rooms). In some embodiments, the device includes one or more elongated conduits with openings, for example, located at opposite ends. As described further herein, the conduit(s) may extend through the wall, or may be located substantially on one side of the wall. A single conduit or multiple conduits may be employed. In some embodiments, an end of one of the conduits may extend into one of the rooms while the opposite end of the conduit does not extend into the other of the rooms. At least one ball, or other movable element, is disposed within a lumen of the conduit and may move freely back and forth along the length of the conduit. Restraints or end stops located at opposite ends of the conduit may be used to contain the ball within the conduit so that the ball does not exit from the conduit. The end stops may have openings that allow fluid (e.g., air, inert gas, liquid) to flow through the lumen of the conduit from one end to an opposite end.

The conduit(s) may include any suitable material. In some embodiments, the conduit(s) may be made up of glass, plastic, or another appropriate material. In some cases, the conduit(s) may be transparent or translucent so that the movable element within the conduit is viewable to an observer. In some embodiments, the conduit(s) are rigid, though, in various embodiments, the conduit(s) are flexible. The device may include a combination of rigid and flexible conduits.

The device may include a differential pressure set point indicator associated with the conduit and at least one movable element within the lumen of the conduit. The set point indicator may be configured to correlate the incline of the conduit with respect to the earth's gravitational horizontal or vertical plane to a respective threshold directional differential pressure between the two adjacent spaces sufficient to cause the movable element to move from a lower region of the inclined conduit to a higher region. The directional differential pressure set point indicator may include, for example, a bubble vial, a rotating weighted pendulum pointer, or other components that respond to the incline of the conduit and correlate to a directional differential pressure set point. The differential pressure set point indicator may be appropriately calibrated such that the markings on the differential pressure set point indicator correspond to specific minimum values of directional positive and/or negative differential pressure that may exist between spaces separated by a wall (e.g., at ends of the conduit). Accordingly, the differential pressure set point indicator may provide an indication of what angle of conduit inclination corresponds to the directional threshold differential pressure set point between the two separated spaces that results in movement of the ball from a lower region of the conduit towards an opposing, higher region of the conduit.

In some embodiments, when installed, the conduit extends from one side of a wall to the other side such that opposite ends of the conduit extend outwardly into neighboring spaces that are separated by the wall. In some embodiments, only one end of the conduit extends outwardly from the wall. Air is permitted to flow between the spaces through the conduit, from one end of the conduit to the opposite end. When the conduit is inclined, and there is little to no net differential pressure between the spaces to which opposite ends of the conduit extend, the force of gravity acting on the ball causes the ball to move toward or remain at the lower end of the conduit.

In practice, the incline of the conduit is such that the lower end of the conduit is placed in the room desired to be of a higher pressure relative to the adjacent communicating room via the conduit where the higher end of the conduit resides. In this arrangement, the desired direction of air flow caused by this pressure differential will be from the higher pressure room with the low end of the conduit towards the lower pressure room with the higher end of the conduit.

Depending upon the physical features of the conduit (e.g., lumen diameter, straightness/curvature, surface finish), physical features of the ball (e.g., diameter, weight, surface finish), degree of incline of the conduit, fluid properties of the media between compartments, orifice size at the end stops, and the directional differential pressure between compartments, the equilibrium position of the ball may be on either end of the conduit such that the ball can be seen from the appropriate space. Though, in some cases, depending at least in part on how the incline of the conduit is set relative to the existing differential pressure between spaces, the ball may remain stationary at an intermediate location with respect to the ends of the conduit.

As an example, for a hospital isolation room occupied by a patient with an infectious disease that is capable of airborne transmission, it may be desirable to keep the room at a negative differential pressure relative to one or more adjacent rooms, so as to substantially prevent airborne transmission of the disease to an adjacent room. In such an arrangement, the room exhausts more air than is supplied within it and from the surroundings, to an extent that the negative pressure is of a greater magnitude than any adjacent space. Thus, the conduit should be installed such that the end of the conduit that extends toward the isolation room (e.g., extends inside the isolation room) is at a higher position than the opposite end of the conduit that extends toward a space immediately exterior to the isolation room (e.g., into a corridor, a compartment, duct, or another room).

When the net differential pressure between the isolation room and the outside space is zero (e.g., a door between the room and the outside space is opened), the ball will fall to the lower end of the conduit such that an observer inside the isolation room would not be able to view the ball; for some cases, where the opposite end of the conduit is located within the neighboring room, it follows that an observer outside the isolation room in the neighboring room would be able to see the ball. Or, if the conduit is substantially located within the isolation room (e.g., in a turret-type configuration), the ball may fall to the lower end of the conduit yet remain within the isolation room (e.g., exposed or covered from view), or within the wall cavity between rooms. When the appropriate degree of negative pressure is applied to the room, the ball moves upwardly within the conduit to the vertically higher end (e.g., through the wall and into the isolation room). That is, the difference between the pressure of the isolation room and the pressure in the outside space on the opposite side of the wall causes an air flow rate through the conduit that is sufficient to move the ball upwardly where it can be conspicuously viewed from inside the isolation room—thereby indicating that at least the appropriate direction of air flow and degree of negative pressure is applied to the room.

In the case of a room that is required to exhibit a positive pressure, so as to substantially prevent air to flow from a surrounding region into a room, the net flow of air is from the room itself to the immediate surroundings. Accordingly, the conduit is installed such that the end of the conduit that extends toward the room (e.g., extends inside the isolation room) is at a lower position than the opposite end of the conduit that extends toward the surrounding space exterior to the room. Thus, when a suitable amount of positive pressure is applied to the room, there is sufficient directional air flow through the conduit to move the ball upwardly within the conduit (e.g., through the wall) to the conduit end toward the surrounding space.

It may be necessary to adjust the device for different minimum differential pressures that give rise to respective directions of air flow between the spaces. For example, it may be desired that a room containing cyanide be at a higher negative differential pressure as compared to a wood processing plant room containing airborne sawdust. If it is desired that the magnitude of the negative pressure difference between a room and the outside space be increased, the conduit may be adjusted to be inclined at a greater angle relative to a horizontal reference plane. Devices described herein may allow for simple adjustment of the angle of the conduit relative to a horizontal reference plane, so as to provide a clear indication as to whether the newly desired net differential pressure exists to cause a desired direction of air flow between the separate spaces.

When installed, the conduit may be set at an appropriate angle of inclination that corresponds to the desired threshold differential pressure set point to cause a desired direction of air flow between separate spaces. In some embodiments, the desired differential pressure between separate spaces to which the device may provide an indication of the appropriate degree of incline may be between 0.001 inch of $H_2O$ and 10 inches of $H_2O$ (e.g., between 0.001 inch of $H_2O$ and 1 inch of $H_2O$, between 0.001 inch of $H_2O$ and 5 inch of $H_2O$, between 0.005 inches of $H_2O$ and 0.5 inches of $H_2O$, between 0.1 inch of $H_2O$ and 0.5 inches of $H_2O$, between 0.01 inch of $H_2O$ and 0.1 inches of $H_2O$, between 0.01 inch of $H_2O$ and 0.05 inches of $H_2O$, between 0.01 inch of $H_2O$ and 0.03 inches of $H_2O$, between 0.005 inches of $H_2O$ and 0.1 inch of $H_2O$, between 0.001 inch of $H_2O$ and 0.005 inches of $H_2O$, between 0.001 inch of $H_2O$ and 0.003 inches of $H_2O$, etc.), as measured by a standard water column barometer. It can be appreciated that devices of the present disclosure may provide an indication of other differential pressures between adjacent spaces outside of these ranges.

As discussed, a differential pressure set point indicator may be appropriately secured to the conduit so as to provide a correlation between the angle of inclination of the conduit with respect to a horizontal reference plane that corresponds to the threshold differential pressure between spaces that is required to generate sufficient directional air flow through the conduit to move the ball from an end at a lower position to the opposite end at a higher position.

As an example, if the desired differential pressure leading to air flow in a particular direction between compartments separated by a wall is 0.02 inches of $H_2O$, then, given the components of the system (e.g., ball, conduit, orifices), the conduit may be angled in such a manner that the force of gravity on the ball will be overcome by the directional air flow created by at least 0.02 inches of $H_2O$ pressure difference between the compartments. Thus, if the angle of inclination of the conduit is set for a differential pressure of 0.02 inches of $H_2O$ between compartments, and the differential pressure between the compartments is actually 0.01 inches of $H_2O$, then the amount of directional air flow generated by the only 0.01 inches of $H_2O$ differential pressure in the direction from the lower end to the upper end of the conduit will be insufficient to overcome the force of gravity on the ball, due to the angle of incline of the conduit being too high (conduit is too steep). The same holds if the direction of air flow within the conduit is from the higher end towards the lower end.

As a result, the ball will remain at the lower end of the conduit because the directional threshold differential pressure in the direction of air flow from the lower end to the higher end has not been met. However, if the angle of inclination of the conduit is adjusted to be less (conduit is less steep) so as to correspond to a lower, 0.01 inch of $H_2O$ differential pressure in the desired direction of air flow between compartments, from the lower end towards the higher end of the conduit, then the amount of directional air flow generated between rooms will be sufficient to overcome gravity and move the ball from the lower end to the higher end of the conduit.

As discussed above, when the conduit is not horizontally level, a ball located within the conduit will move in response to the net force that results from the combination of the downward force of gravity acting on the ball and the force arising from pressure that is present on the surface of the ball, to move the ball upward within the conduit.

The inventor has recognized that external calibration methods may be required to establish an accurate relationship between the angle of tilt of the conduit and the threshold differential pressure required to move the ball from one end of the conduit to the other. For example, once the device is installed, such external calibration methods may include the use of a manometer to measure the pressure differential between the adjacent spaces to which the device/conduit is coupled, and noting the angle of tilt of the conduit at which the ball moves from one end to an opposite end (e.g., falling from the higher end to the lower end, or moving from the lower end to the higher end). To continue the calibration process, the pressure difference between the adjacent spaces is then adjusted and measured, and the corresponding angle of tilt of the conduit at which the ball moves from one end to the other is further noted. These steps of calibration are repeated for multiple pressure differentials and corresponding angles of tilt for the device. Such steps of pressure measurement and calibration may be expensive and time-consuming.

One possible method that avoids having to re-calibrate the device each time it is installed to a wall involves including markings on the device that correlate the particular orientation of the conduit (i.e., angle of tilt) directly to the differential pressure between spaces that causes the ball to move from one end to the other. Though, the inventor has also recognized that such a method may rely on the orientation of the wall to which the device is mounted or resides against, which might not be aligned with the direction of gravity (i.e., the wall might not be plumb). That is, calibrating the device and providing markings that indicate particular threshold differential pressure values thereon may lead to inaccurate results unless the wall is vertically aligned with the direction of gravity (i.e., the wall is plumb) and the indicator is properly installed to the wall.

Thus, the inventor has appreciated that it would be advantageous to employ devices that integrate an indicator that is directly calibrated to gravity. For example, an inclinometer that responds to the force of gravity (e.g., bubble inclinometer, pendulum inclinometer, etc.) may be mounted to an appropriate portion of the differential pressure detection device so that an accurate determination can be made as to the actual degree of tilt of the conduit required to reach an equilibrium between the force of gravity and the pressure on the ball, arising from fluid flow between the adjacent spaces. Accordingly, the accuracy of the device is not reliant on whether the wall to which it is mounted or otherwise resides against is aligned with the direction of gravity (i.e., plumb).

In further embodiments of the present disclosure, a device for detecting whether a threshold directional differential pressure is present between two spaces separated by a wall may include multiple conduits that provide a continuous passageway through which air may flow between spaces on opposing sides of the wall. In some cases, such arrangements may allow for the angle of incline of the device to be adjusted from one side of the wall, rather than having to make adjustments to the angle of the incline of the device, coordinated from both sides of the wall.

For example, a conduit having at least one movable element (e.g., lightweight ball) located therein may be arranged to extend along, parallel to, or be rigidly coupled to an axis that rotates about a pivot point, where rotation of the conduit about the pivot point is accessible from one side of the wall. In some embodiments, the pivot point is positioned on one side of the wall, or is offset a suitable distance from one side of the wall. For example, the pivot point may be located within a space outside of the wall (e.g., spaced away from an exterior surface of the wall) or within a space between exterior surfaces of the wall. In some embodiments, the conduit may rotate without a set pivot point. For example, the conduit may be configured to translate and rotate at the same time.

In various embodiments, a first conduit may extend between the walls or within a wall, providing a passageway between the respective spaces separated by the wall, similar to that described above with respect to some embodiments. The first conduit may be a rigid tube or flexible hose or combination thereof, installed in any fashion that allows fluid communication between the adjacent spaces. Here, the angle of incline of the first conduit with respect to a horizontal reference plane does not affect the accuracy of the pressure detection, in contrast with other conduits described herein, which extend from one side of the wall to the other side and are adjustable between various angles of incline.

A second conduit may be positioned at substantially one end of the first conduit, extending the passageway through which air flows between spaces on opposing sides of the wall. In various embodiments, as discussed above, adjustability of the angle of incline of the second conduit may be accessible from one side of the wall, without having to access the second conduit from the other side of the wall. In some cases, the second conduit may be rotatable about a pivot point located on or near one side of the wall. For example, the second conduit may have a free end that extends away from the wall and an attached end that extends substantially toward the pivot point (e.g., located on the same side of the wall, within the wall cavity, or at another location).

Similar to that described with respect to various embodiments discussed above, the angle of inclination of the second conduit with respect to the horizontal or vertical plane may be employed in conjunction with one or more movable elements to provide an indication as to whether a directional differential pressure meeting a desired threshold exists between opposing sides of the wall.

When it is desirable for the device to provide an indication of the existence of another directional differential pressure threshold between spaces separated by the wall, the angle of inclination of the second conduit may be suitably adjusted. This function is similar to embodiments of conduits described above, except in this embodiment, rather than having to adjust the angle of inclination of a conduit from both sides of the wall, the second conduit is able to be adjusted solely on one side of the wall.

Such an arrangement makes adjustability of the device to provide indications of various directional differential pressure thresholds more convenient. For example, if it is desired that the magnitude of the pressure difference between a room and an adjacent space be increased, the second conduit may be adjusted to be inclined at a greater angle relative to a horizontal or vertical reference plane.

Turning to the figures, discussed below, a number of embodiments of a device that provides an indication of directional air flow and differential pressure existing between spaces separated by a wall are depicted. FIGS. 27-33, described in detail further below, illustrate various embodiments of a device that provides such an indication of directional air flow and differential pressure; though, in these embodiments, the device may be conveniently adjusted from only one side of the wall, in a "turret" type arrangement. FIGS. 34A-34B also depict yet another embodiment of a device that provides an indication of directional air flow and differential pressure.

FIG. 1 depicts a device 100 for detecting whether a directional differential pressure is present between two spaces separated by a wall 50. The device 100 includes a conduit 110 (e.g., tube) which has openings at opposite ends. Though, as noted herein, the openings are not required to be located at opposite ends of the conduit.

The conduit 110 extends from one surface 52 of a wall 50 to the opposite surface 54. In this embodiment, the surface 52 corresponds to a first room 10 and the surface 54 corresponds to a second room 20 on the opposite side of the wall. The conduit 110 extends between neighboring rooms 10, 20 at an angle θ with respect to a horizontal reference plane h.

A movable element, such as a ball 120 (e.g., a ping pong ball, other spherical ball, non-spherical object, etc.) or other suitable article, is contained by end stops 130 (e.g., end caps) that allow fluid flow through the end stop within a lumen of the conduit. The ball 120 has an outer diameter that is less than the inner diameter of the conduit 110. In some embodiments, the ball is made of a lightweight material and moves freely along the length of the conduit 110 between opposite ends. Any other suitable movable element may be used, for example, a slidable block, a cylindrically shaped article, etc. In some embodiments, multiple movable elements may be used by the device simultaneously.

Each end of the conduit may be fitted securely with restraints or end stops 130. The end stops 130 have respective openings 132 through which fluid (e.g., air) may readily flow. The openings 132 have respective shapes and sizes that prevent the ball from falling out of the conduit when the ball moves toward and impacts the end stop 130. For example, the opening 132 may have a diameter that is smaller than the outer diameter of the ball 120, keeping the ball retained within the lumen of the conduit.

The end stops 130 may be suitably secured as caps at the ends of the conduit 110, for example, by a friction fit, snap fit, or otherwise. In some embodiments, the end stops 130 and the conduit 110 are transparent or translucent so that the ball 120, when present, can be readily seen by a person observing the device from either space 10, 20 on opposite sides of the wall 50 in which the device is installed. In some cases, the ball 120 is brightly colored so that the ball is easily noticeable to a person who is looking at the device.

The conduit 110 is attached to the wall by a series of wall flanges. In particular, FIG. 1 shows inner wall flanges 150 and outer wall flanges 160, along with inner sealing materials 152 and outer sealing materials 162. The flanges 150, 160 are appropriately positioned so as to accommodate the desired angle of inclination of the conduit. The conduit is held by the outer sealing materials 162 at the desired angle of inclination, described further below.

An inner sealing material 152 is disposed between an inner wall flange 150 and the surface 52. The inner wall flange 150 and inner sealing material 152 may be secured (e.g., attached, adhered, fastened) together to the wall surface 52. As such, the inner sealing material 152 may provide an appropriate seal, preventing unwanted air leakage between rooms 10, 20 via the wall cavity space, should such a cavity exist. Additionally, the inner wall flange 150 and inner sealing material 152 have respective openings that are large enough through which the conduit 110 may extend without contact.

Outer wall flange 160, in turn, is secured (e.g., attached, adhered, fastened) to the inner wall flange 150 with the outer sealing material 162 being disposed between the flanges 150, 160. The outer wall flange 160 and outer sealing material 162 have openings through which the conduit 110 may extend. The inner sealing material 162 provides an appropriate seal preventing unwanted air leakage between rooms 10, 20, or via a wall cavity space. However, in various embodiments, the opening of the outer sealing material 162 has a diameter that is less than the outer diameter of the conduit 110 so that an appropriate seal may be formed between the outer sealing material 162 and the conduit 110. Such an arrangement further allows the conduit 110 to be suitably supported and held in a steady position when installed at an angle.

The wall flanges 150, 160 and sealing materials 152, 162 may be attached to respective wall surfaces 52, 54 and to each other by any suitable method, for example, via an adhesive and/or fastener. The wall flanges 150, 160 and sealing materials 152, 162 may be adjustable in position so as to accommodate variations in the angle of inclination θ of the conduit. In some embodiments, the inner wall flange 150 is attached to the wall 50; however, the position of the outer wall flange 160 may be adjusted vertically with respect to the inner wall flange 150. Accordingly, the outer wall flanges 160 may be re-positioned to permit the angle of the conduit to be appropriately altered.

The device 100, when installed, may be used to detect whether a desired directional differential pressure exists between the separate rooms 10, 20. When the air pressure between the separate rooms 10, 20 is the same, there will be no net flow of fluid through the conduit from one room to the other. Therefore, if the conduit is held at an angle of inclination with respect to the horizontal, due to gravity, the ball will fall down toward the lower of the two end stops and rest against that stop.

However, when the air pressure between the rooms 10, 20 is not equal, there will be a net flow of fluid through the conduit from the room with a comparatively higher pressure toward the other room. In FIG. 1, the pressure within room 10 is higher than the pressure within room 20. Accordingly, air will flow in a direction from room 10 to room 20, as indicated by the arrows shown within the conduit. If the velocity of air flow from room 10 to room 20 meets a certain threshold, the air flow will overcome the force of gravity on the ball causing the ball to move from the lower end of the conduit within room 10 towards the higher end of the conduit within room 20. Thus, for the embodiment of FIG. 1, when the ball moves from room 10, through the wall and into room 20, the device has indicated that the differential pressure between room 10 and room 20 has met a certain direction of air flow and a corresponding threshold differential pressure causing the air flow through the conduit to travel in the direction from room 10 towards room 20.

Figure 2:
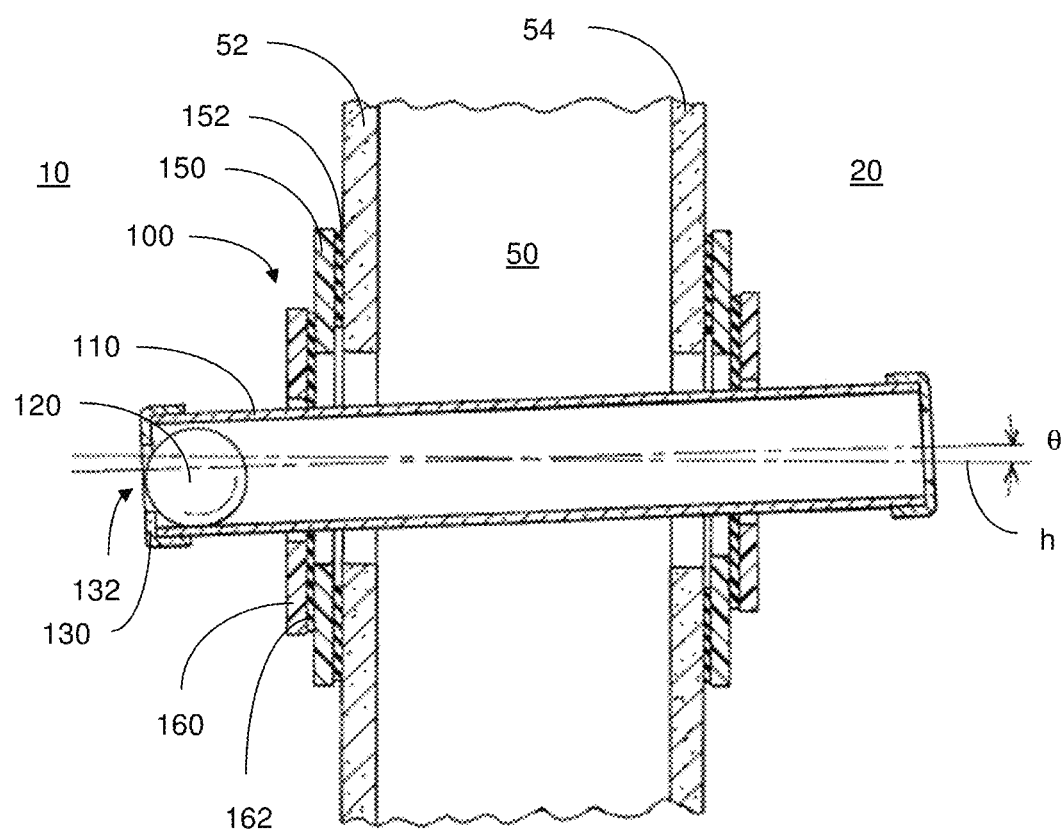
FIG. 2 is a cross-sectional view of the device of FIG. 1 at a different orientation.

In FIG. 2, there is no difference in pressure between the rooms 10, 20; hence, there is no net flow of air through the conduit. Accordingly, because the conduit remains at a slight angle of incline θ with respect to the horizontal h, the ball 120 rolls and/or falls back to the lower end of the conduit, within room 10. In FIG. 1, the outer wall flange of room 10 is positioned substantially lower than the outer wall flange of room 20. Accordingly, the conduit 110 is oriented according to a relatively steep angle. Though, in FIG. 2, the outer wall flange of room 10 is positioned to be in much closer alignment, vertically, with respect to the outer wall flange of room 20. Such positioning permits the conduit 110 to be oriented according to a much smaller angle of incline.

Other arrangements are possible. For example, as discussed further below, a device may include an angled conduit where only one end extends outwardly from a wall, rather than two ends. Accordingly, depending on the differential pressure between spaces, the ball may move between a vertically higher region of the conduit and a vertically lower region of the conduit within the same room, or at least partially within a wall cavity.

In some embodiments, the device includes a differential pressure set point indicator that provides an indication (e.g., via a pointer referencing various markings) of a minimum differential pressure threshold that would cause the ball to move from a lower end region toward a higher opposite end region of the conduit. Markings of the differential pressure set point indicator may refer to actual units of pressure indicating the directional threshold pressure differential set point between rooms. Markings may include alphanumeric values to which a correlating table may be referred, to determine the corresponding directional threshold differential pressure set point. Or, in some embodiments, markings of the differential pressure set point indicator may provide the actual inclination angle θ of the conduit with respect to a horizontal reference plane h, also to which a correlating table may be referred, to determine the corresponding directional threshold differential pressure set point.

The differential pressure set point indicator may include a suitable pointer that senses the true gravitational horizontal or vertical plane (e.g., via an air bubble within a liquid, a ball within a fluid, a tip pointer, a pendulum, a pivotally arranged member, a weighted member, etc.) and associated markings that, when referred to by the indicator, provide information regarding the angle of inclination of the conduit and corresponding directional threshold differential pressure set point. The markings may be calibrated such that steady alignment of the indicator with a particular region of the markings, resulting in a particular angle of incline of the conduit, provides an indication to an observer of the threshold differential pressure required to cause the ball to move from a lower region to a higher region of the conduit.

It may be desirable for the device to provide assurance to an observer that the direction of air flow and the associated differential pressure between separate spaces meets certain requirements. For example, the differential pressure requirement in a particular direction between neighboring rooms may be approximately 0.01 inch of $H_2O$, and the differential pressure set point indicator may have markings that, given a particular angle of incline of the conduit, correspond to the different levels of differential pressure required to create sufficient air flow to cause the ball to move from a lower region (e.g., lower end) to a higher region (e.g., higher end) of the conduit. In this example, upon installation or adjustment of the device, the conduit may be set at a particular angle θ such that the pointer or bubble or ball of the differential pressure set point indicator comes into steady alignment with markings that correspond to a 0.01 inch of $H_2O$ pressure differential. Accordingly, when the actual differential pressure between rooms is approximately 0.01 inch of $H_2O$ or above, the directional air flow generated by the pressure difference will be sufficient to overcome the force of gravity on the ball so as to move the ball toward the higher end of the conduit.

When the differential pressure between rooms degrades (e.g., a door/window is opened between rooms or the ventilation system airflows degrade from proper settings), then the directional differential pressure between rooms may fall below approximately 0.01 inch of $H_2O$ in the direction from the lower end to the higher end of the conduit, and the ball falls back to the lower end of the conduit, indicating to an observer that the minimum directional differential pressure is not present. Or, when the directional differential pressure between the rooms degrades due to other factors such as changes in the ventilation system and falls below 0.01 inch of $H_2O$ in the direction from the lower end towards the higher end of the conduit, then the force of gravity overcomes the force provided by the net air flow through the conduit and the ball drops down to the lower end. In some embodiments, when the directional differential pressure between rooms inadvertently falls below the desired directional threshold pressure differential, an alarm may sound alerting the appropriate personnel that the direction of air flow or the directional threshold differential pressure requirements of the room are not met.

It may be desirable to have an adjustable range of differential pressure set points to accommodate different requirements between neighboring rooms, which may be accomplished by adjusting any of the associated characteristics of the elements of the detector, e.g., the ball diameter and weight, the conduit lumen diameter, the end stop orifices, the incline of the conduit. For example, there may be a desired directional air flow and associated threshold differential pressure of 0.05 inches of $H_2O$, from a previous setting of 0.01 inch of $H_2O$. As a result, given all other elements of the detector unchanged, the angle of incline of the conduit should be adjusted appropriately. If the conduit remains at the angle corresponding to a differential pressure of 0.01 inch of $H_2O$, then an actual directional pressure difference between rooms of, for example, 0.03 inches of $H_2O$ in the same desired direction would give an observer an erroneous indication that the directional threshold differential pressure between the rooms is at least 0.05 inches of $H_2O$. That is, for this example, the air flow generated by a differential pressure of 0.03 inches of $H_2O$ would cause the ball to move upward within the conduit, despite the desired directional threshold differential pressure of 0.05 inches of $H_2O$.

Accordingly, the angle of incline of the conduit may be re-positioned at a different angle such that the pointer of the directional threshold differential pressure set point indicator comes into steady alignment with markings that correspond to a 0.05 inches of $H_2O$ directional threshold pressure differential. Thus, only when the actual directional differential pressure between rooms is 0.05 inches of $H_2O$ or above, the air flow generated by the pressure difference will be sufficient to overcome the force of gravity on the ball so as to move the ball toward the higher end of the conduit. If and when the differential pressure requirement between neighboring rooms is to be changed yet again, then the angle of incline of the conduit may be further re-positioned to a different orientation that corresponds to the updated threshold differential pressure desired, according to the read out provided by the differential pressure set point indicator.

A number of different differential pressure set point indicators suitable for use with the device will now be presented.

Figure 3:
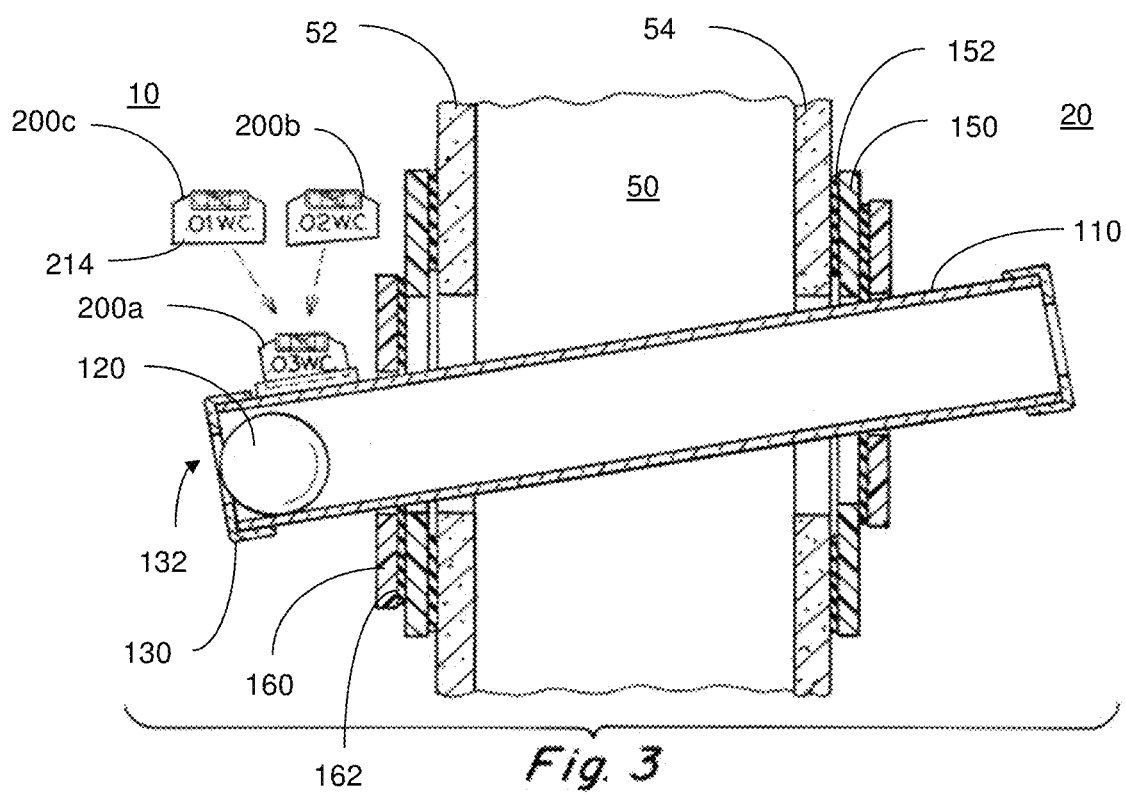
FIG. 3 is a cross-sectional view of a device for detecting a differential pressure in accordance with some embodiments.
Figure 4:
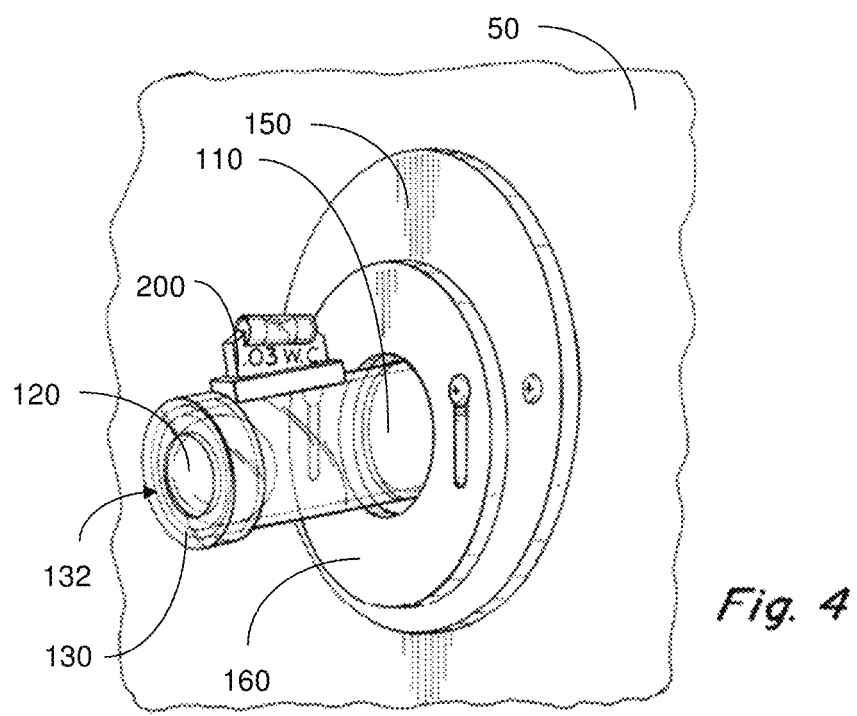
FIG. 4 is a partial perspective view of the device of FIG. 3.

FIGS. 3-4 show a device with an interchangeable bubble differential pressure set point indicator 200. Each bubble differential pressure set point indicator has a vial containing a liquid and an associated bubble. When the bubble reaches a steady equilibrium alignment between the lined markings on the vial, the differential pressure set point indicator is considered to be level with respect to the horizontal.

As shown, any one of a series of bubble differential pressure set point indicators 200a, 200b, 200c may be appropriately secured to the conduit. Each bubble differential pressure set point indicator 200 has a base plate 214 constructed for appropriate attachment to a surface of the conduit. The bottom surface of each base plate 214 is sloped so that when the respective differential pressure set point indicator is installed, the bubble will attain steady alignment between the lined markings when the conduit is set at a particular angle of incline. That is, the conduit will be positioned at an angle of incline that will allow the bubble of the differential pressure set point indicator to steadily remain within the middle of the vial between the lined markings. Such an angle of incline will correspond to the desired threshold differential pressure between separate spaces that would cause the ball to be displaced from the lower end toward the higher opposite end.

Referring to FIGS. 3-4, the currently installed differential pressure set point indicator 200a corresponds to a threshold differential pressure of 0.03 inches of $H_2O$. Accordingly, when the conduit is installed at the appropriate angle where the bubble of the differential pressure set point indicator 200a remains steadily at the middle of the vial, a directional differential pressure between rooms of 0.03 inches of $H_2O$ or greater in the direction that causes the air to flow in the direction from the lower end to the higher end of the conduit and will generate enough air flow through the conduit to cause the ball to move from room 10 to room 20. Hence, if the directional differential pressure between rooms is less than 0.03 inches of $H_2O$ in the direction from room 10 to 20 or the directional differential pressure goes to zero or reverses, then the air flow through the conduit will be insufficient to overcome the force of gravity on the ball. In such a case, the ball will remain at the lower end of the conduit.

The differential pressure set point indicator 200a may be appropriately replaced with either of differential pressure set point indicators 200b, 200c which, in this illustrative example, correspond to threshold pressure differentials of 0.02 inches of $H_2O$ and a 0.1 inch of $H_2O$, respectively. Thus, if the device is fitted with differential pressure set point indicator 200b, when the conduit is installed at an angle such that the bubble pointer of the differential pressure set point indicator 200b remains steadily at the middle of the vial, a directional differential pressure between rooms of 0.02 inches of $H_2O$ or greater in the direction from room 10 to 20 will cause the ball 120 to be moved from room 10 to room 20. And if the differential pressure between rooms is less than 0.02 inches of $H_2O$ in the direction from room 10 to 20 or the directional differential pressure goes to zero or reverses, then the air flow through the conduit will be insufficient to overcome the force of gravity on the ball.

Figure 5:
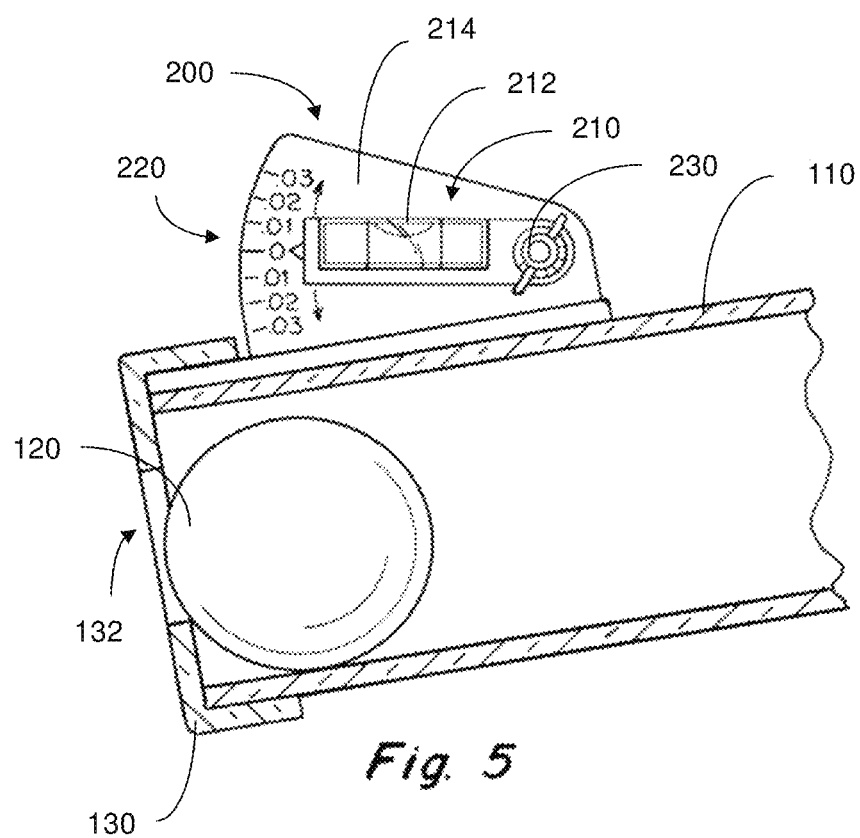
FIG. 5 is a partial cross-sectional view of another device for detecting a differential pressure in accordance with some embodiments.
Figure 6:
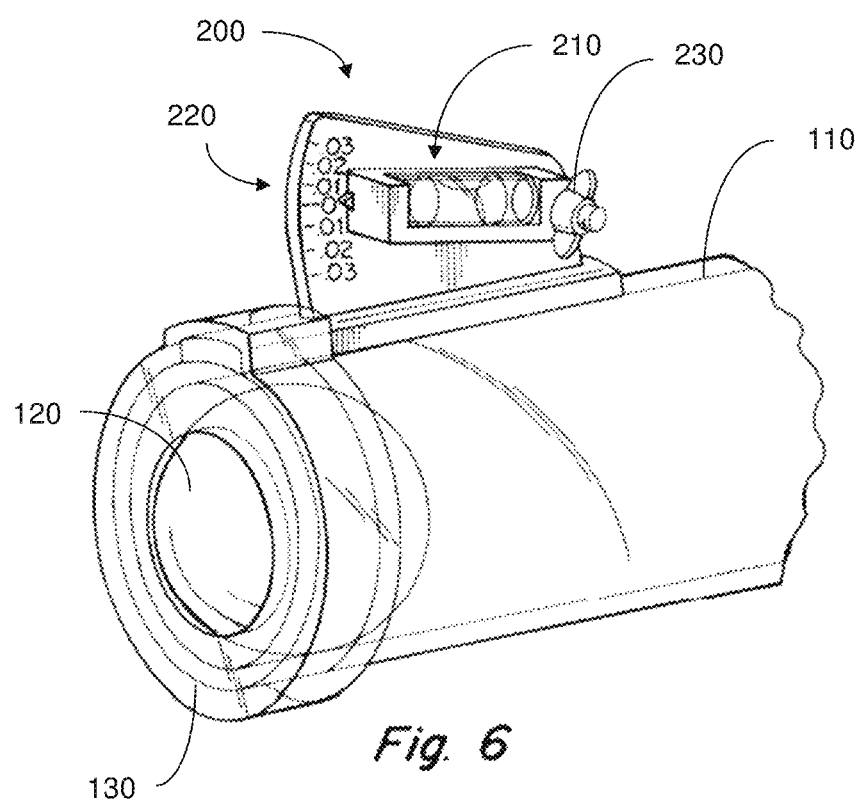
FIG. 6 is a partial perspective view of the device of FIG. 5.

As shown in FIG. 3, the indicator senses the degree of incline. The bottom surface of base plate 214 for attachment of differential pressure set point indicator 200a (corresponding to a threshold differential pressure of 0.03 inches of $H_2O$) to the conduit has a slope that is greater than that of differential pressure set point indicator 200b which, in turn, has a slope greater than that of differential pressure set point indicator 200c. Accordingly, for the differential pressure set point indicators of FIGS. 3-4, a greater desired threshold differential pressure will require a greater degree of slope of the conduit An embodiment of a device fitted with an adjustable bubble differential pressure set point indicator is shown in FIGS. 5-6. Like other bubble differential pressure set point indicators, this differential pressure set point indicator includes a vial 210 with a liquid and associated bubble pointer 212. The vial may be appropriately rotated about a pivot 230 with a fastener (e.g., wing nut), capable of loosening and securing rotation of the vial about the pivot so that the vial points to markings 220 that indicate corresponding threshold differential pressure values that may be set between separate spaces which, in turn, correspond to the appropriate angle of inclination of the differential pressure set point indicator 200 and, hence, the angle of the conduit 110 itself when the bubble pointer 212 is between the boundary lines 213. For instance, when it is desired for the device to be installed so as to extend through a wall and between rooms to indicate to an observer that a directional differential pressure of at least 0.02 inches of $H_2O$ is present, then, in the embodiment of FIGS. 5-6, the angular position of the vial on the pivot 230 is adjusted so that the vial 210 points to the particular marking that references a pressure of 0.02 inches of $H_2O$ in the desired direction of air flow. The desired direction of airflow is determined by placing the low end of the conduit in the room of desired higher pressure relative to the other room where the high end of the conduit resides. Since the differential pressure set point indicator can sense both directions of the conduit incline, there may be similar symmetric markings for the desired threshold differential pressure set point in each direction. Accordingly, the device is appropriately installed such that the pointer of the vial 210 aligns with the appropriate directional differential pressure markings resulting in the conduit having an angle of inclination that allows the bubble pointer 212 to remain steady at the middle of the vial between the boundary lines 213. Hence, after appropriate installation, a directional differential pressure in the direction from room 10 to room 20 of 0.02 inches of $H_2O$ or greater will generate enough air flow through the conduit to cause the ball to move from room 10 (lower end) to room 20 (higher end).

If it is further desired that the device provide indication to an observer of whether a directional different differential pressure between rooms is present, then the pivot can be appropriately adjusted so that the vial points to the appropriate one of the two similar markings which correspond to the desired pressure, of which the appropriate mark of the two is determined by adjusting the conduit incline with the low end in the desired higher pressure room and the high end in the desired lower pressure room so that the bubble 212 reaches an equilibrium state in the middle of the vial e.g., between boundary lines 213.

For example, a change in the desired pressure difference between the spaces from 0.2 inches of $H_2O$ to 0.03 inches of $H_2O$ with the same desired direction of air flow may involve a simple adjustment of the wing nut so that the vial 210 points to the closer marking that references 0.03 inches of $H_2O$, which would involve positioning the conduit at a steeper angle of incline to put the bubble 212 in between the boundary lines 213. Once the differential pressure set point indicator is appropriately adjusted and the angle of inclination of the conduit is set within the wall such that the bubble pointer 212 remains steady at the middle of the vial, the device is now ready to provide an accurate indication of whether the desired direction of air and directional threshold differential pressure between rooms is actually present.

Figure 7:
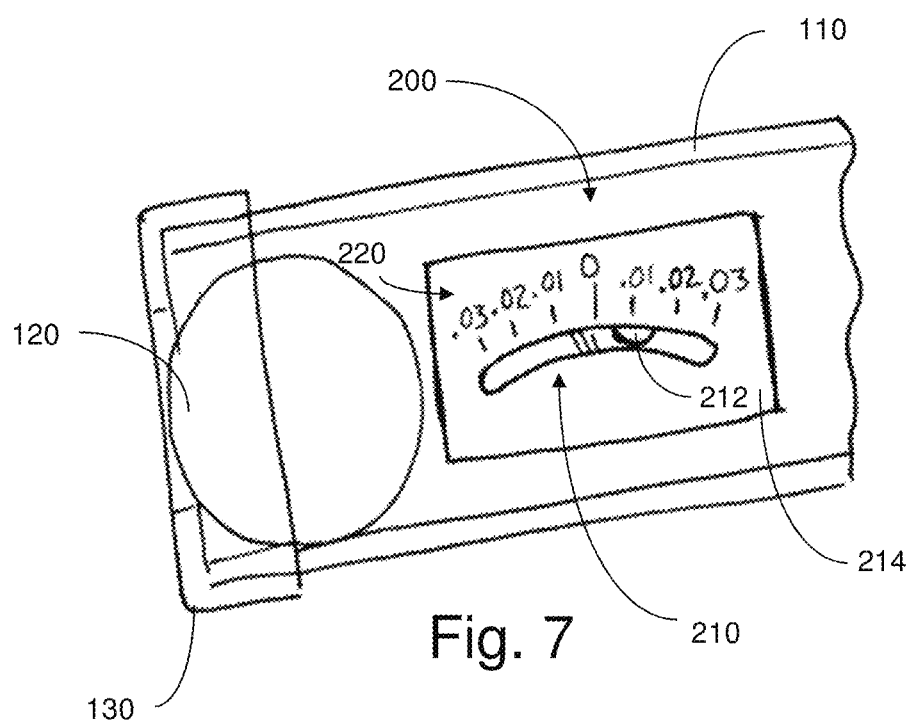
FIG. 7 is a partial cross-sectional view of a further device for detecting a differential pressure in accordance with some embodiments.

FIG. 7 shows a device that includes a bubble differential pressure set point indicator. In this embodiment, the differential pressure set point indicator 200 is attached to the conduit, via an appropriate base plate 214, and includes a vial 210 that contains liquid and an associated bubble pointer 212. Due to the geometry of the vial and gravity acting on the liquid within the vial, the bubble moves to the highest possible point within the vial. Here, the vial 210 exhibits a geometry (e.g., curvature) that allows for the bubble to provide differential pressure set point information at multiple regions along the vial. For instance, when the conduit is perfectly level, the bubble moves toward a position where the vial and base plate correlate to being level. However, when the conduit is tilted at an angle, the position of the bubble relative to the vial will change, so as to provide an indication that the conduit is set at a different angle of incline.

Accordingly, appropriate markings 220 are provided adjacent to the vial so that appropriate differential pressure set point information can be provided to an observer (e.g., someone who is adjusting the tilt of the conduit) when the conduit is angled in a manner that brings the bubble into steady alignment near particular marking(s). Since the differential pressure set point indicator can sense both directions of the conduit incline, there are two similar symmetric markings for each desired threshold differential pressure set point. Here, the markings 220 refer to the threshold differential pressure between rooms required to generate enough air flow through the conduit to move the ball from the lower end of the conduit to the higher end. That is, the conduit 110 may be tilted so that the bubble pointer 212 aligns with the appropriate one of the two similar markings which correspond to the desired pressure, of which the appropriate mark of the two is determined by adjusting the conduit incline with the low end in the desired higher pressure room and the high end in the desired lower pressure room so that the bubble 212 remains in steady alignment and pointing to the desired marking that indicates a particular value of the directional pressure differential. When the conduit is installed at the angle that corresponds to that particular value of pressure differential, movement of the ball 120 to a higher region of the conduit may provide assurance to an observer that the directional differential pressure indicated by the bubble 212, at a minimum, actually exists between the separate spaces.

Figure 8:
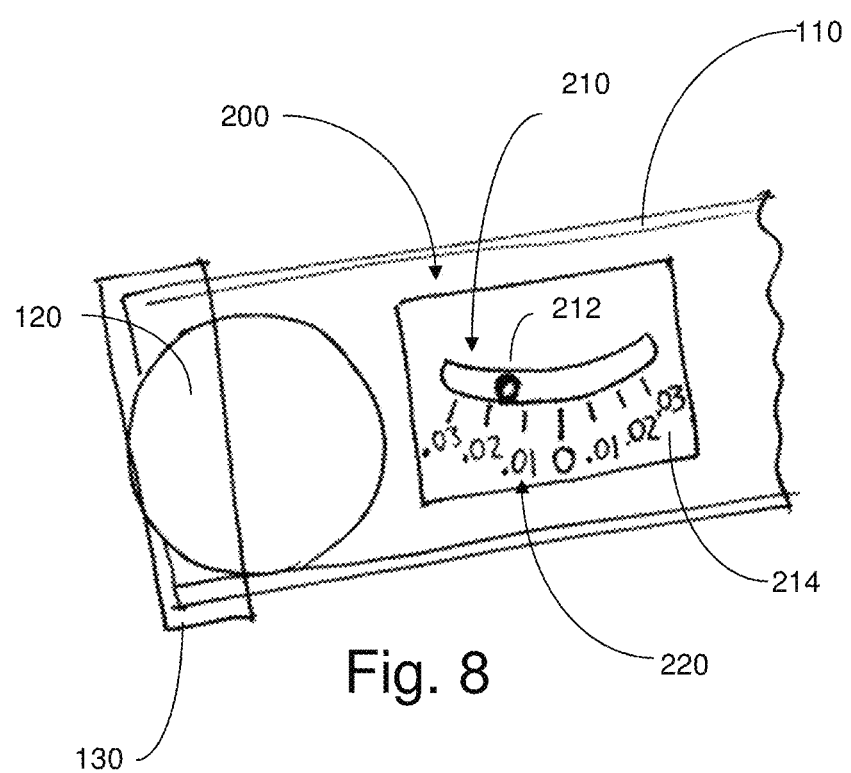
FIG. 8 is a partial cross-sectional view of yet another device for detecting a differential pressure in accordance with some embodiments.
Figure 9:
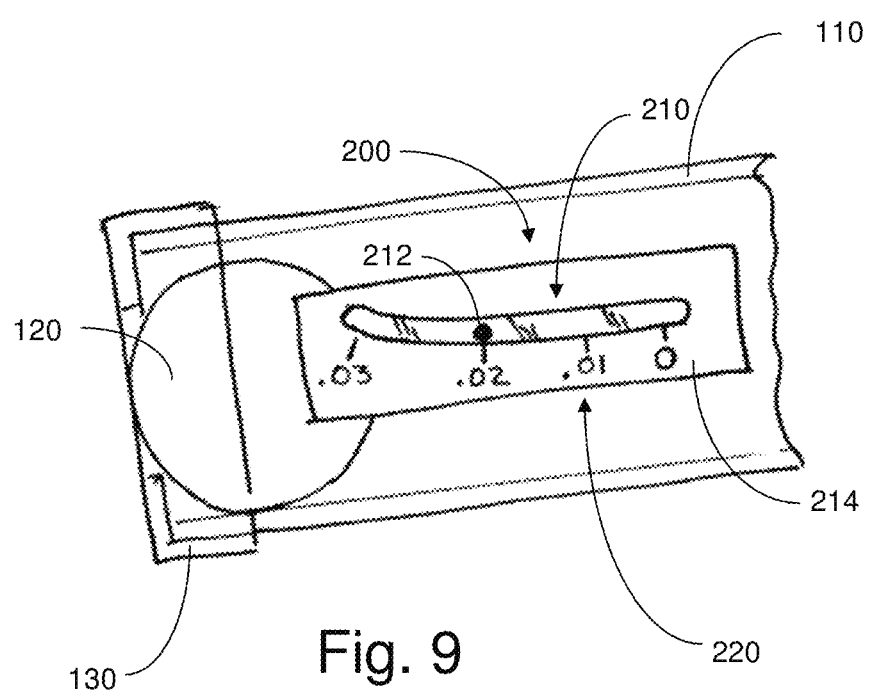
FIG. 9 is a partial cross-sectional view of a different device for detecting a differential pressure in accordance with some embodiments.

FIGS. 8-9 show devices that include ball-type differential pressure set point indicators where the differential pressure set point indicator 200 includes a vial 210 with a ball pointer 212. The vial 210 is filled with a fluid (e.g., gas, liquid) and the ball pointer moves to the lowest point within the vial by force of gravity. The vial 210 may exhibit a curvature that permits the ball to provide information regarding the angle of incline of the conduit when the ball 212 remains in steady alignment at various regions along the vial. For instance, when the conduit is perfectly level, the ball pointer 212 moves toward the middle of the vial. Though, when the conduit is tilted at an angle, the ball pointer 212 may still remain in steady alignment with a region of the vial that is offset from the middle of the vial.

Markings 220 are provided adjacent to the vial so that appropriate information can be provided when the conduit is tilted such that the ball pointer 212 steadily aligns with a particular set of the markings. The markings 220 refer to the threshold differential pressure set point between rooms required to create a sufficient degree of air flow that moves the ball 120 within the lumen of the conduit 110 from the lower end of the conduit to the higher end. That is, the conduit 110 may be tilted so that the ball pointer 212 aligns with markings that indicate a particular value of directional pressure differential. When the conduit is installed at the angle that corresponds to that particular value of directional pressure differential, movement of the ball 120 within the lumen from the lower end of the conduit to the higher end of the conduit may provide assurance to an observer that the directional differential pressure indicated by the ball pointer 212, at a minimum, actually exists between the rooms.

FIGS. 8 and 9 are various embodiments of ball-type differential pressure set point indicators 200 where the shape of the vial differs. Depending on how the vial of a ball-type differential pressure set point indicator is shaped, the markings 220 which relate the angle of incline of the conduit to the threshold pressure differential(s) between rooms will be calibrated and appropriately positioned.

The ball-type differential pressure set point indicator of FIG. 8 provides for different threshold differential pressure set points. Since the differential pressure set point indicator can sense both directions of the conduit incline, there are two similar symmetric markings for each desired threshold differential pressure set point. The ball-type differential pressure set point indicator of FIG. 9 provides for threshold differential pressure information for tilt of the conduit in only one direction. and so the markings are uni-directional rather than bi-directional as in FIGS. 5-8. In some embodiments, the ball-type differential pressure set point indicator of FIG. 9 as compared to those in FIGS. 5-8, provides for a finer degree of set point adjustment for indicating whether the threshold differential pressure between rooms is present.

Figure 10:
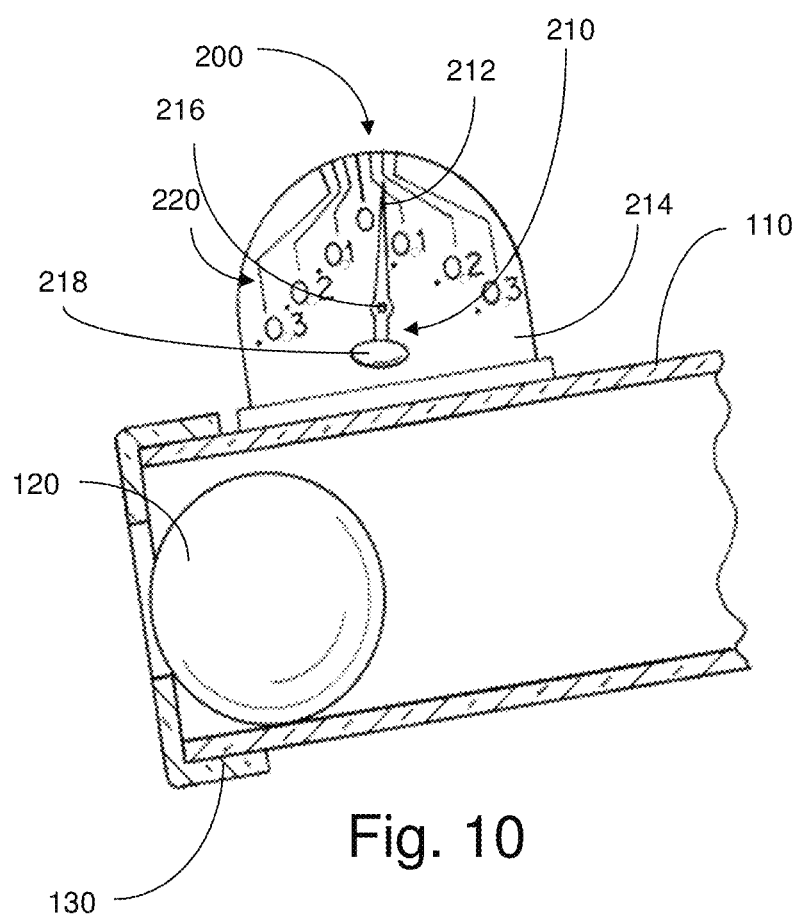
FIG. 10 is a partial cross-sectional view of another device for detecting a differential pressure in accordance with some embodiments.

In the embodiment of FIG. 10, the device 100 includes a differential pressure set point indicator 200 having a weighted pointer 210. As shown, the differential pressure set point indicator 200 is rigidly secured to the outer surface of the conduit 110 via base plate 214. The differential pressure set point indicator 200 includes a tip pointer 212 that is pivotally connected to the base plate 214. A weight 218 is provided at an end opposite the tip pointer below the pivot point 216. When the conduit 110 is placed within a wall at an angle of inclination with respect to the horizontal, the tip pointer 212 will vary in its position and pivot to reflect the degree to which the conduit is tilted with respect to the horizontal.

The tip pointer is further adapted to rotate about the pivot point so as to point to the bi-directional reference markings 220, which are calibrated to match the angle of incline with the threshold differential pressure between opposite ends of the conduit 110 at which the ball 120 will be urged against the force of gravity to move from the lower end toward the opposite higher end of the conduit. As such, depending on the angle of incline of the conduit, the tip pointer will come into steady alignment with reference markings 220 that are calibrated to represent minimum differential pressures required to move and maintain the ball 120 at a desired position within the conduit, for instance, at the highest point.

Figure 11:
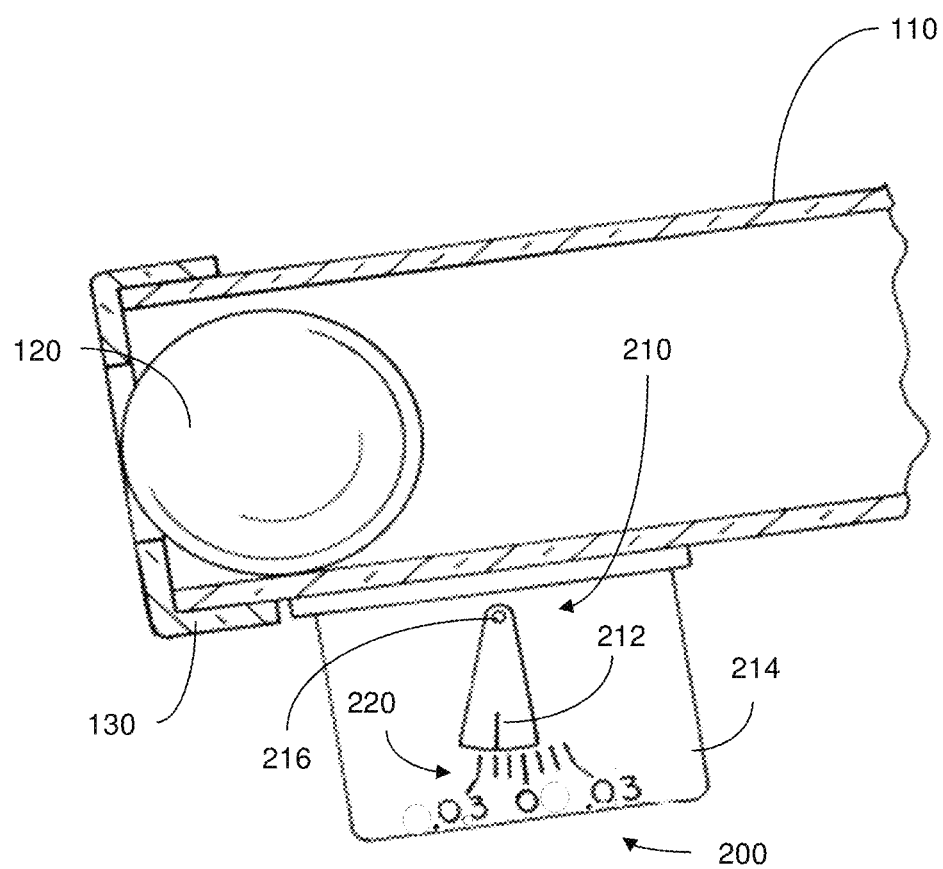
FIG. 11 is a partial cross-sectional view of a further device for detecting a differential pressure in accordance with some embodiments.

FIG. 11 shows a device 100 that includes a pendulum differential pressure set point indicator 200. The differential pressure set point indicator 200 is rigidly secured to the outer surface of the conduit 110 via base plate 214. The differential pressure set point indicator 200 includes a pendulum pointer 212 that is pivotally connected to the base plate 214 at a point 216. Here, the pendulum pointer 212 extends downwardly and rotates about the pivot point 216 so as to point to the bi-directional reference markings 220 which are calibrated similarly to that described above regarding FIG. 10.

Thus, given a desired minimum differential pressure between enclosed spaces that are separated by a wall through which the conduit extends, appropriately calibrated differential pressure set point indicators with accurate markings may allow the angle of inclination of the conduit according to the present disclosure to be easily adjusted to suit the desired directional pressure differential. That is, the conduit of a device installed into a wall separating two enclosed spaces may be oriented at a particular angle that corresponds to a threshold differential pressure between the separate spaces sufficient to cause a ball, or other movable element, disposed within the conduit to move from the lower end to the higher end of the conduit. When it is desired for that threshold differential pressure between the separate enclosed spaces to be altered, the differential pressure set point indicator, with appropriately calibrated reference markings, may be used as an easy reference to determine what the adjusted angle of the conduit should be to correspond to the new threshold pressure differential.

Such an adjustment of the angle of the conduit may be a relatively simple procedure. For instance, in an embodiment described, fasteners attaching respective outer wall flanges 160 to inner wall flanges 150 of the device may be loosened and the outer wall flanges, which provide support for the conduit, may be shifted vertically with respect to the inner wall flanges so as to suitably alter the angle of incline of the conduit. An appropriately calibrated differential pressure set point indicator may be used as a reference to determine what angle of incline to which the conduit should be set so as to correspond to the desired threshold differential pressure between opposite ends of the conduit. Once the conduit is oriented in accordance with the appropriate angle of incline, the fasteners of respective outer wall flanges are then tightened to set the conduit firmly in place. Respective gaskets secured to the outer wall flanges may assist in holding the conduit securely at the desired orientation.

Suitable adjustments of the angle of incline of the conduit may be performed manually or automatically. For example, an operator may use the above procedure to adjust the angle of incline of the conduit manually.

Or, the device may be set up in accordance with an automated system that is configured to adjust orientation of the conduit automatically depending on the desired level of differential pressure between spaces on opposite sides of the wall. In some embodiments, the device may be configured with a control system that automatically adjusts the angle of incline of the conduit according to input provided by a user, or related computer system, of a desired differential pressure to be established between neighboring spaces. For example, a user may simply input the minimum differential pressure that is required between two rooms into a user interface and the system may automatically, without further user interaction, adjust the angle of incline of the conduit to correspond to the desired minimum differential pressure between rooms. In some cases, the control system may refer to the differential pressure set point indicator by any suitable detection method, to determine the appropriate angle of incline of the conduit.

As discussed, physical features other than the incline of the conduit may provide an indication of whether the directional differential pressure between spaces meets a certain threshold.

For instance, the type of ball placed within the lumen of the conduit may be chosen based on particular characteristics, such as weight or surface finish of the ball. That is, a greater differential pressure will be required to move a heavier ball from a lower region of the conduit to a higher region of the conduit. Conversely, if the ball is lighter, a smaller differential pressure will be required to move the ball toward the higher end of the conduit. Alternatively, a ball having a rough surface finish may require a greater degree of air flow provided through differential pressure to move the ball toward the higher end of the conduit. Accordingly, different balls, or movable elements, may be marked according to the range of differential pressure that the detector, incorporating the particular ball(s), may indicate.

Alternatively, the type of stops at the ends of the conduit may be chosen according to the particular range of directional differential pressure(s) to be detected. For example, for a given ball within the conduit, an end stop having a small orifice that limits the rate of air flow through the conduit may be used as an indicator for the differential pressure between the spaces. That is, where end stops of a detector have relatively small openings such that the rate of air flow through the openings is limited, a greater differential pressure will be required to move a ball from a lower region of the conduit to a higher region of the conduit. Conversely, if the openings are wider, allowing a greater flow rate of air through the conduit, a smaller differential pressure may be required to move the movable element toward the higher end of the conduit. As a result, different end stops having different orifice sizes may be marked according to the range of differential pressure that the detector incorporating the particular end stop(s), may indicate.

Thus, different components of the differential pressure detector may be marked so as to provide an indication of the minimum differential pressure threshold that would cause the movable element to move from a lower end region toward a higher opposite end region of the conduit. Markings of the ball, conduit, end stops of the conduit, etc. may refer to actual units of pressure indicating the directional threshold pressure differential set point between rooms; such markings may be alphanumeric values to which a correlating table may be referred; alternatively, the markings may provide an actual property (e.g., ball weight, end stop orifice size, conduit curvature, conduit/ball surface finish, etc.) to which a correlating table may be referred, to determine the corresponding directional threshold differential pressure set point.

A differential pressure set point indicator may be secured to any portion of a device using any suitable manner. In some embodiments, differential pressure set point indicators are secured to a device (e.g., on the outer surface of the conduit) by an appropriate adhesive or fastener. Or, as discussed below, an appropriate holder may be used to mount the differential pressure set point indicator.

Figure 12:
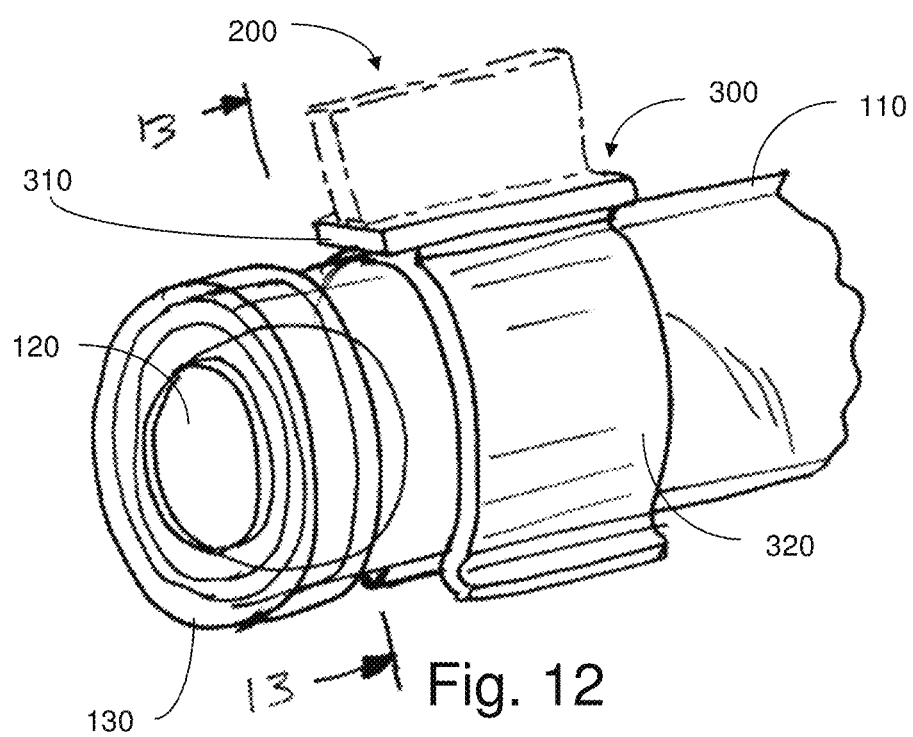
FIG. 12 is a partial perspective view of a holder used with a device for detecting a differential pressure in accordance with some embodiments.
Figure 13:
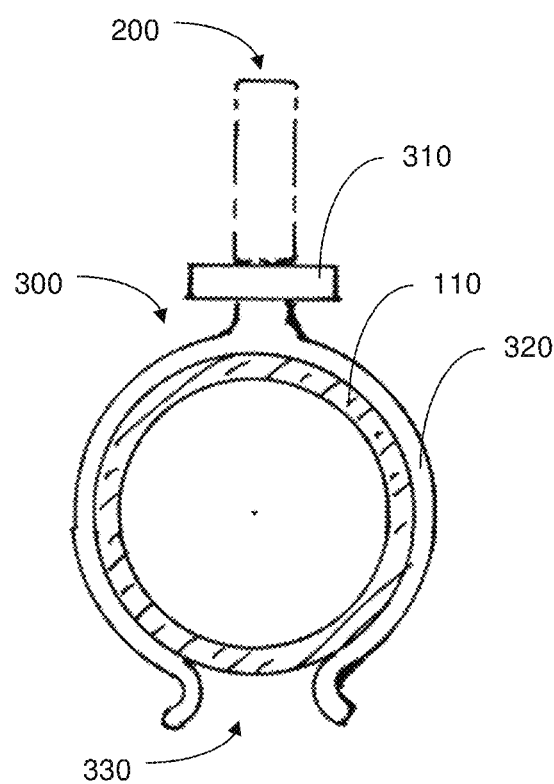
FIG. 13 is a cross-sectional view of the holder used with the device of FIG. 12.

FIGS. 12 and 13 show an embodiment of a holder 300 for mounting the differential pressure set point indicator 200 on to the conduit 110. The holder 300 includes a plate 310 to which a surface of a differential pressure set point indicator may be attached. The holder 300 further includes an elastically deformable spring clip 320 that wraps around the exterior of the conduit 110. In some embodiments, the spring clip 320 has an opening 330 with ends that may be spread apart so that the conduit 110 may be suitably secured within the clip 320. As an alternative, a split ring divided at one or more locations along the ring, capable of fastening tight about the perimeter of the conduit may be used to mount the differential pressure set point indicator.

In another aspect of the present disclosure, it may be desirable for noise to be attenuated upon impact of the ball, or other movable element, against either end stop that is useful for keeping the movable element contained within the conduit. For instance, the ball and end stops of the device may be made of materials that produce a noticeable sound when the ball drops on to an end stop at the lower position or when the ball is pushed up against the end stop at the higher position. For example, a ping pong ball makes a distinct noise upon impact with a relatively rigid surface. In some cases, such a sound may be irritating to people that may be located within either of the rooms that share the device. Thus, a sound attenuator or device may be included for substantially reducing noise when the ball moves from one end of the conduit to the opposite end and is subject to impact.

The sound attenuator may include any suitable material or combination of materials. In some embodiments, the sound attenuator may include a relatively soft energy absorbing material, such as an elastomer, rubber, neoprene, silicone, plastic, polymer, foam, fibrous material, paper, tissue, netting, etc. In some embodiments, the sound attenuator may exhibit a geometry that cushions the impact of the movable element on a stop.

In some embodiments, a sound attenuator separate from the end stops is fitted with the end stop(s) of the conduit, as shown by way of example, in FIGS. 14-16 and 18A-18B. In other embodiments, the end stop(s) include an energy absorbing material which is sound attenuating and, hence, comprise the sound attenuator, for example, shown in FIG. 17.

Figure 14:
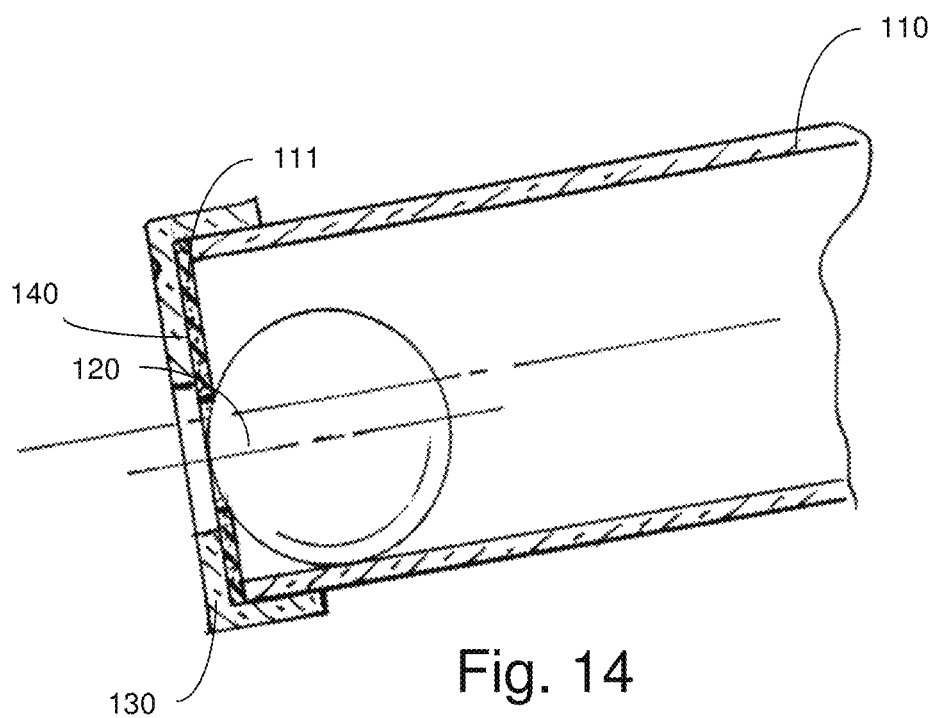
FIG. 14 is a partial cross-sectional view of a sound attenuator used with a device for detecting a differential pressure in accordance with some embodiments.
Figure 15:
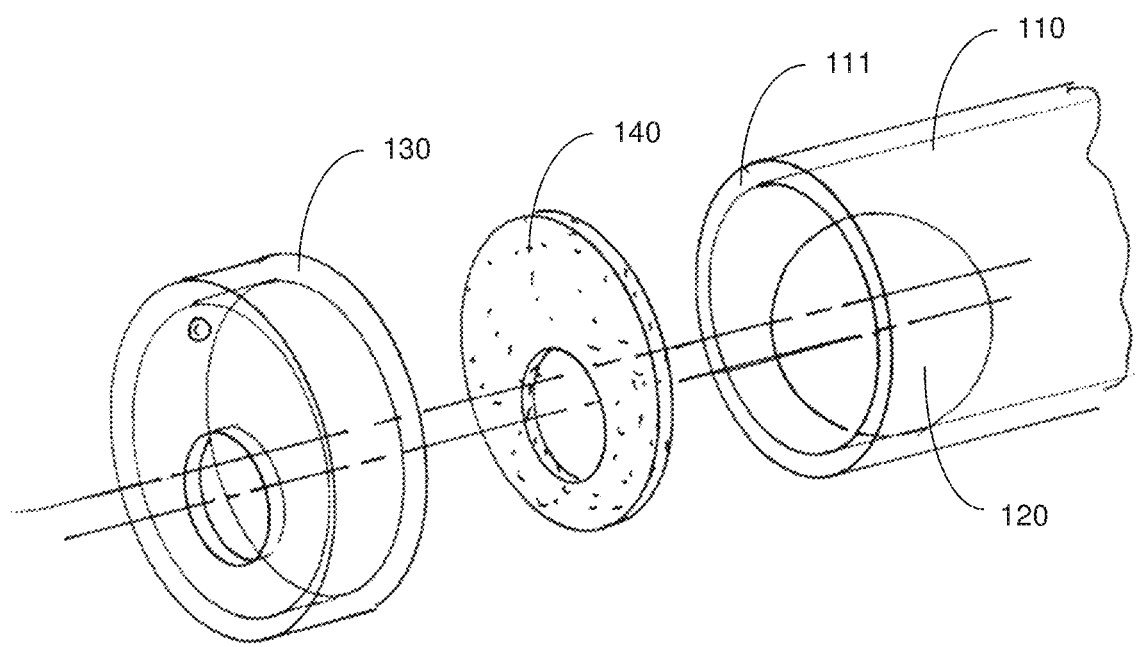
FIG. 15 is a partial exploded view of the sound attenuator used with the device for detecting a differential pressure of FIG. 14.

FIGS. 14-15 show conduit 110 with an end stop 130 that forms a suitable fit (e.g., interference fit, snap fit) over an edge 111 of the conduit. Positioned between the edge 111 of the conduit and the end stop 130 is a sound attenuator 140. In this embodiment, the ball 120 is a ping pong ball and the end stop 130 is made of a hard plastic. Thus, without appropriate placement of the sound attenuator 140 between the conduit and the end stop, when the ball impacts against the end stop 130, an abrupt sound is produced which can be easily heard by a person located in the room where the impact occurs, and possibly in an adjacent room where the other open end of the conduit resides. When the sound attenuator 140 is appropriately placed between the conduit and the end stop, impact of the ball against the sound attenuator 140 will produce a much softer sound which is not as readily noticeable as compared with the sound produced when the energy absorbing material is not present.

Figure 16:
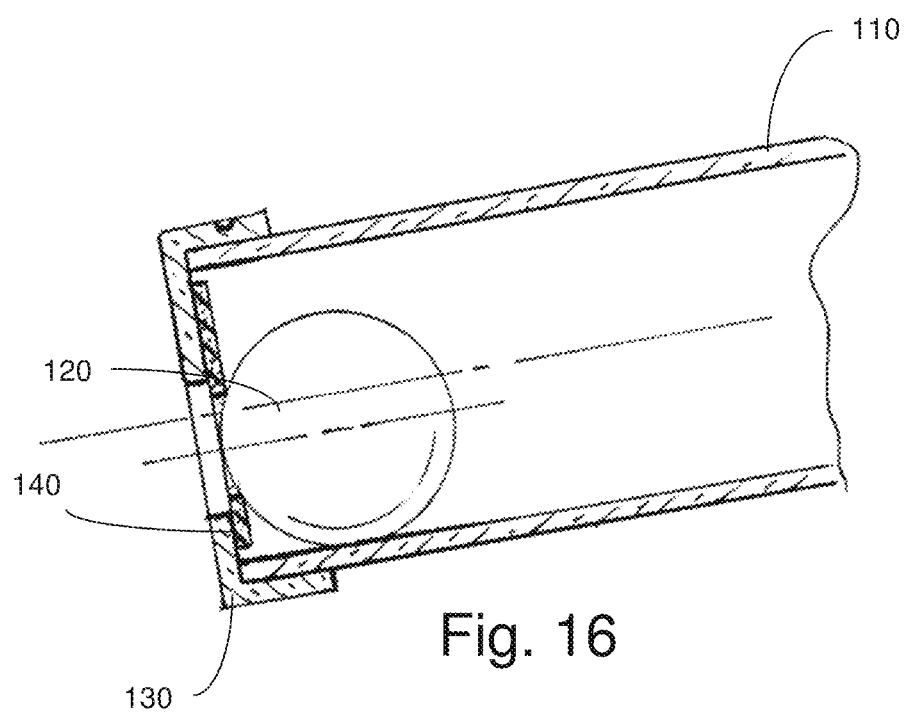
FIG. 16 is a partial cross-sectional view of another sound attenuator used with a device for detecting a differential pressure in accordance with some embodiments.

FIG. 16 depicts another embodiment of an end stop 130 associated with a sound attenuator 140. Here, the sound attenuator 140 is attached (e.g., adhered) to the inside surface of the end stop. The sound attenuator is made of a material that is shaped in a geometry that absorbs impact energy. Accordingly, when the ball impacts the sound attenuator 140, a relatively soft sound is produced as compared to instances where the energy absorbing material in an energy absorbing geometry is not present.

As shown in FIGS. 14-16, the center axis of the opening of the sound attenuator 140 and the opening of the end stop 130 is offset from the center axis of the conduit, as depicted by the offset axes in each figure, yet is substantially aligned with the center axis along which the ball travels. Such alignment of the opening of the sound attenuator with the center of the ball is more effective for lessening the amount of sound generated upon impact at the end(s) of the conduit than would otherwise be the case without the alignment. Additionally, alignment of the opening of the end stop is also effective for directing air flow generated by the differential pressure toward the ball, rather than allowing leakage of air flow around the ball, which could potentially give rise to inaccuracies in overall differential pressure indication by the device. This alignment also may contribute to closing off the end stop or sound attenuator hole with the ball (e.g., forming a seal) and limiting the transfer of air between rooms whenever the ball abuts the end stop or sound attenuator.

Figure 17:
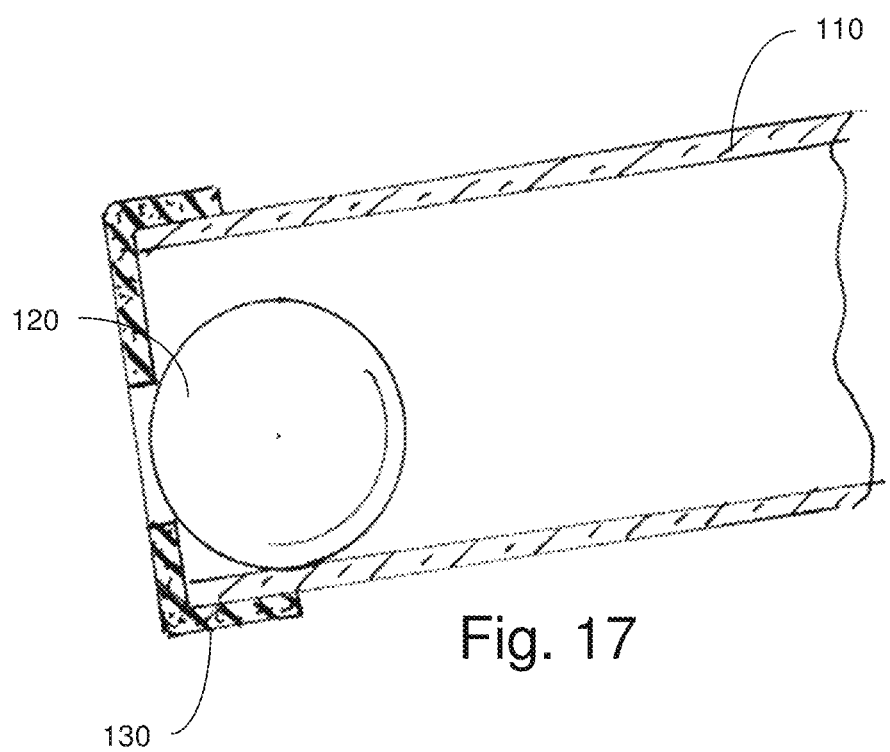
FIG. 17 is a partial cross-sectional view of yet another sound attenuator used with a device for detecting a differential pressure in accordance with some embodiments.

In some embodiments, the end stop itself is sound attenuating. As shown in FIG. 17, the end stop 130 includes an energy absorbing material. In some embodiments, the end stop may exhibit a geometry similar to a diaphragm. As a result, a softer sound is produced when the ball impacts the sound attenuating end stop as compared to an arrangement where the end stop was made of a relatively hard plastic.

Figure 18A:
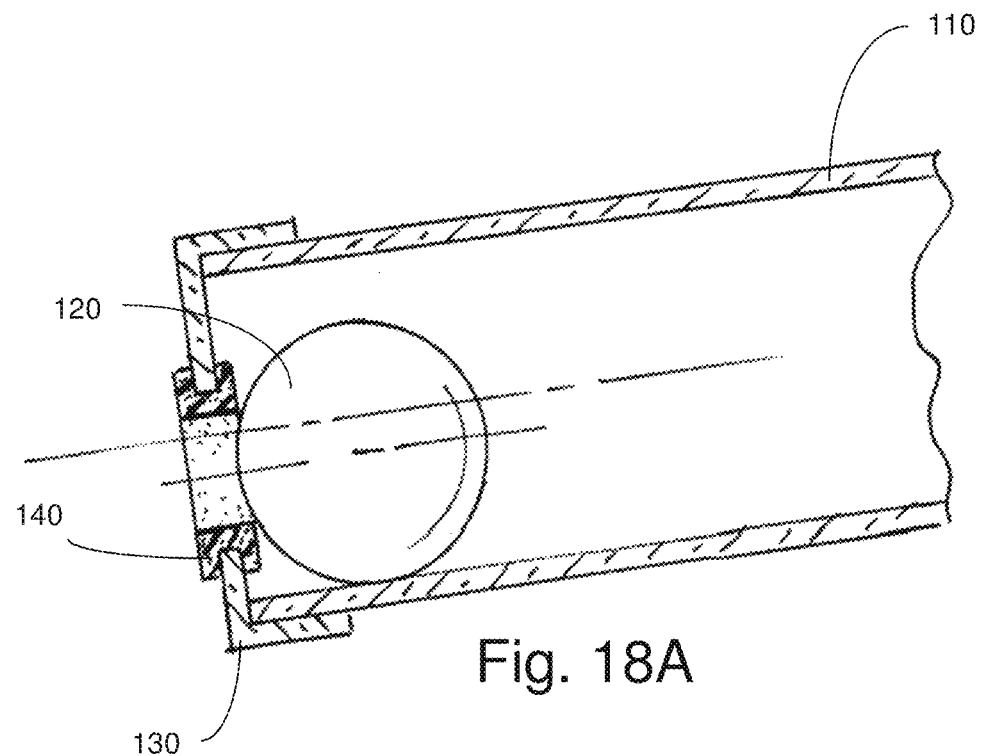
FIG. 18A is a partial cross-sectional view of another sound attenuator used with a device for detecting a differential pressure in accordance with some embodiments.
Figure 18B:
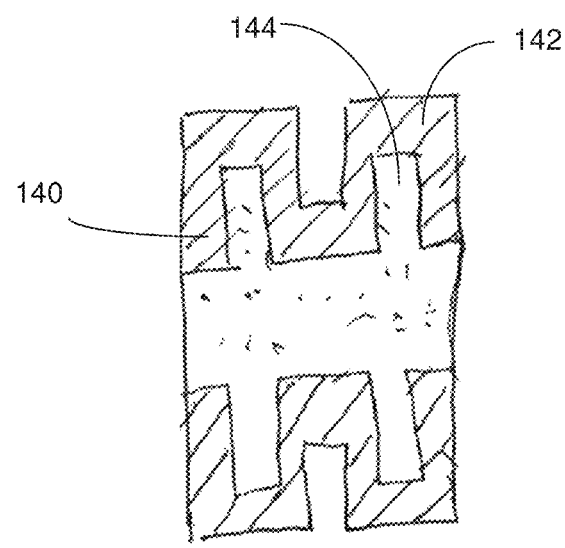
FIG. 18B is a cross-sectional view of another sound attenuator in accordance with some embodiments.

FIG. 18A shows a device where a sound attenuator 140 (e.g., grommet) is fitted at the opening of the end stop 130. The sound attenuator may attenuate sound that would otherwise be produced upon impact of the ball against the end stop of the conduit. In some embodiments, the sound attenuator is flexible so as to be removable from the opening of the end stop and subsequently replaced. In some embodiments, as shown in FIG. 18B, the sound attenuator includes a flexible flap 142 surrounding a space 144 that includes air and/or a soft material that absorbs the impact of the ball. In other embodiments, the sound attenuator is integrally formed with or permanently attached to the end stop.

Figure 19:
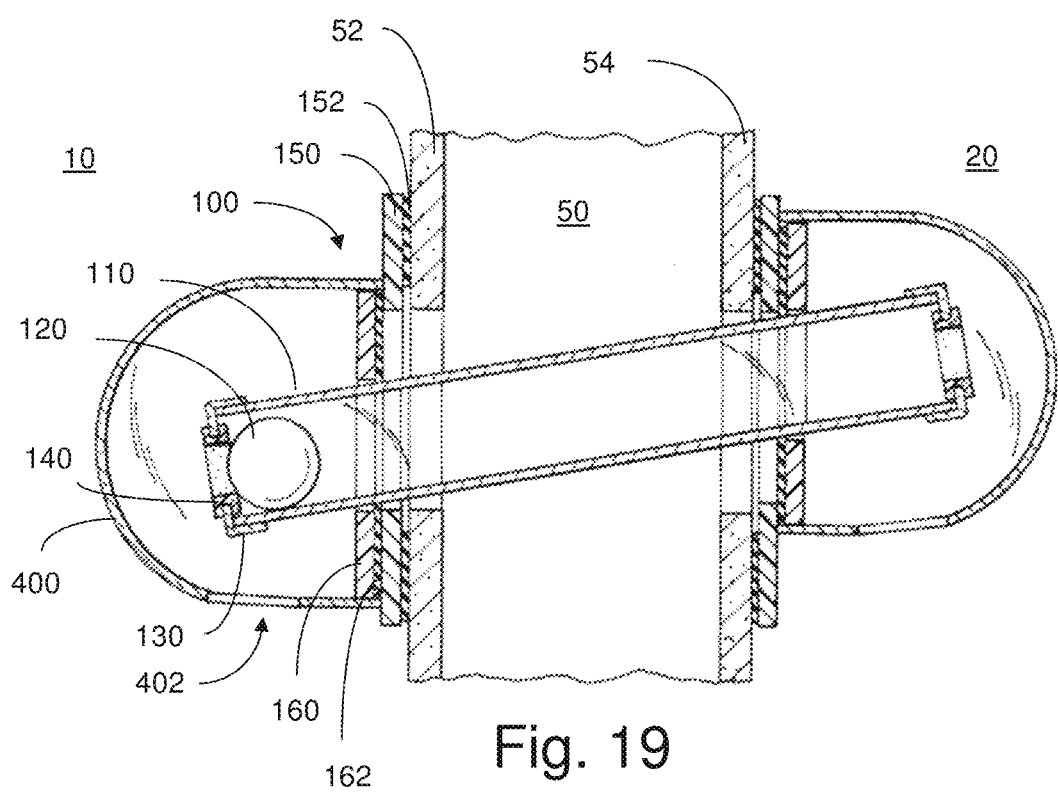
FIG. 19 is a cross-sectional view of a device for detecting a differential pressure in accordance with some embodiments.

FIG. 19 shows a device 100 in an installed configuration where the conduit is positioned at an angle with respect to the horizontal. The ball 120 rests against a replaceable sound attenuator 140, provided as a grommet which is, in turn, coupled to the end stop 130. The device further includes protective coverings 400 surrounding each end of the conduit. The protective coverings 400 include openings 402 through which fluid (e.g., air, gas) may flow from one room 10, through the conduit, and to the room 20 on the other side of the wall. The protective coverings 400 are shown in this embodiment to fit over the wall flange 160 and the associated sealing material 162 in a secured manner, with the edge of the coverings being in contact with the wall flange 150.

Protective coverings may be useful to shield the openings of the conduit, or the ball itself, from contamination or sudden rushes of air that may affect positioning of the ball within the conduit (e.g., a rush of air that occurs when a door between rooms is opened, equalizing the pressure difference between rooms, or when a window is opened). Such coverings also may discourage people from playing with or inappropriately manipulating various parts of the device, which could lead to damage to the device. For instance, absent the protective coverings, a person might be more likely to pull the end stop off of a conduit or inappropriately grasp the conduit as compared to if the ends are surrounding by the protective coverings. Thus, protective coverings may provide shielding for components of the device as well as deter people from potentially rendering the device nonfunctional.

To allow observers to view whether the ball is present at a particular end or other region of the conduit, protective coverings may be transparent, or substantially see-through.

Figure 20:
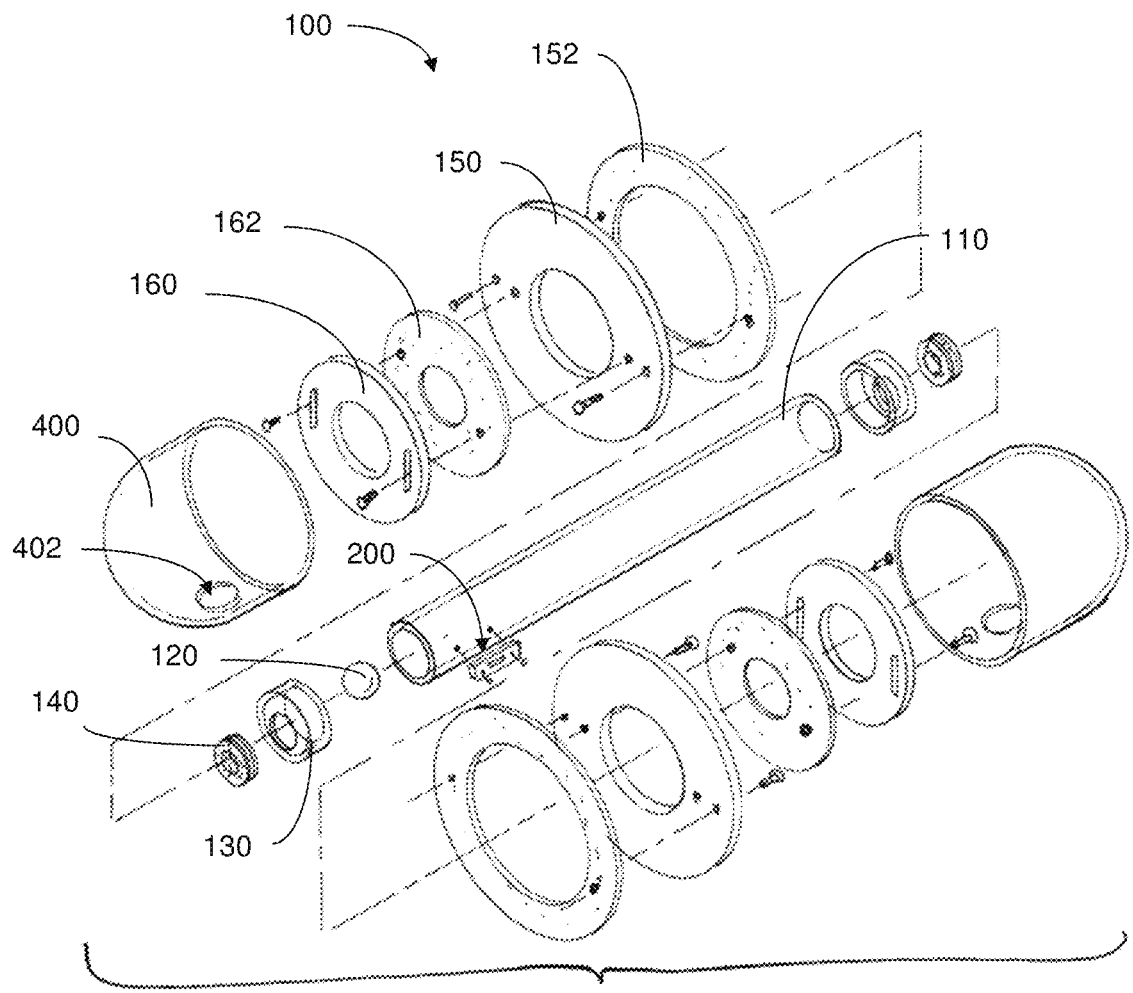
FIG. 20 is an exploded view of the device of FIG. 19.

FIG. 20 shows an exploded view of the device 100. As shown, the protective covering 400 fits over the outer wall flange 160 and sealing material 162. The outer wall flange 160 and outer sealing material 162 are attached to an inner wall flange 150 via a suitable set of fasteners. As discussed previously, the vertical position of a fastener for the outer wall flange 160 may be adjustable to suit the desired angle of incline of the conduit 110. The inner wall flange 150, in turn, is attached to the inner sealing material 152 and the exterior surface of the wall (not shown in this figure) via another set of fasteners.

Referring to the conduit 110, the differential pressure set point indicator 200 is attached to the exterior surface of the conduit. The ball 120 is disposed within the lumen of the conduit and the ends of the conduit are fitted with end stops 130 that prevent the ball from exiting the conduit while, at the same time, having openings 132 on opposite ends that allow fluid to flow through the length of the conduit. Sound attenuating grommets 140 are placed within respective openings 132 of the end stops so that the ball does not make a substantially noticeable noise upon impact with the end of the conduit.

In some embodiments, the sealing material 162 has an opening that has a diameter slightly smaller than the outer diameter of the conduit. Accordingly, the sealing material 162 may form a snug seal with the exterior surface of the conduit, preventing fluid from flowing through the opening of the wall flange 160, except through the lumen of the conduit. The diameter of the sealing material 162 is also slightly smaller than the opening diameter of the wall flange 160 so as to accommodate various orientations of the angled conduit within the opening of the wall flange 160.

Figure 21:
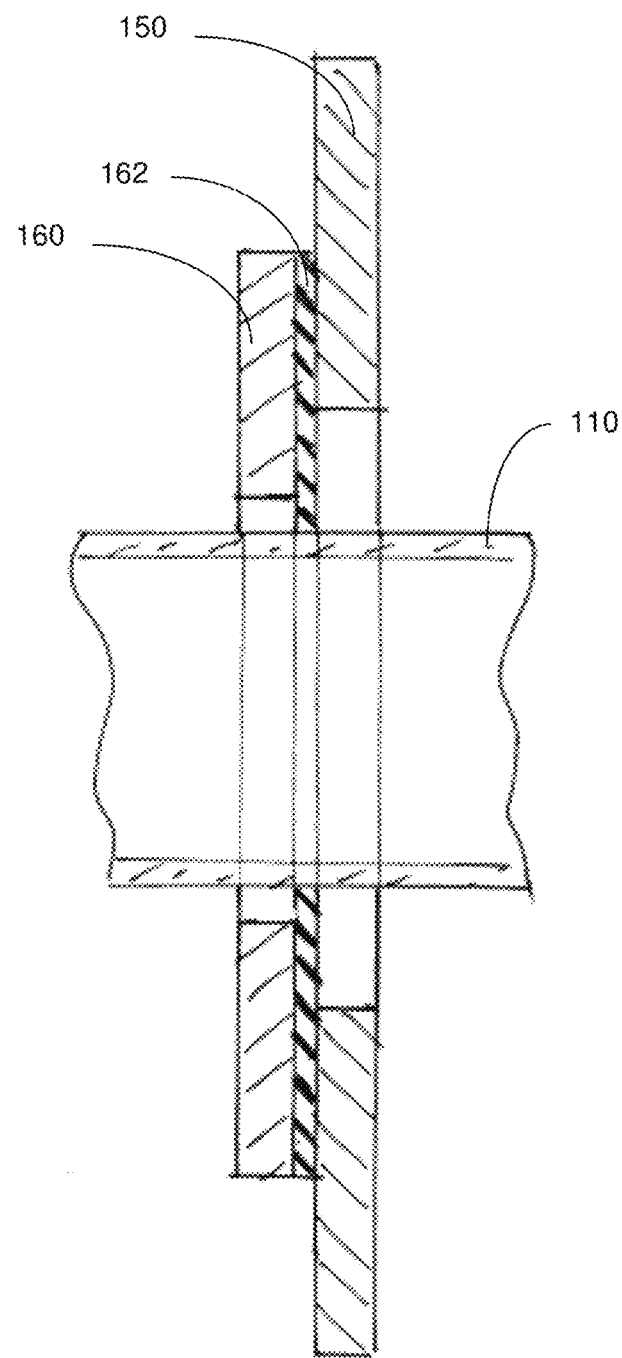
FIG. 21 is a partial cross-sectional view of a support used with a device for detecting a differential pressure in accordance with some embodiments.

As shown in FIG. 21, when the device is installed, the sealing material 162 is in contact with the exterior surface of the conduit so as to form a seal between the surface of the wall (via the wall flanges) and the conduit. The opening of the wall flange 160 may also provide vertical tolerance for the position of the conduit to be adjusted (e.g., adjusting the angle of inclination of the conduit).

Figure 22:
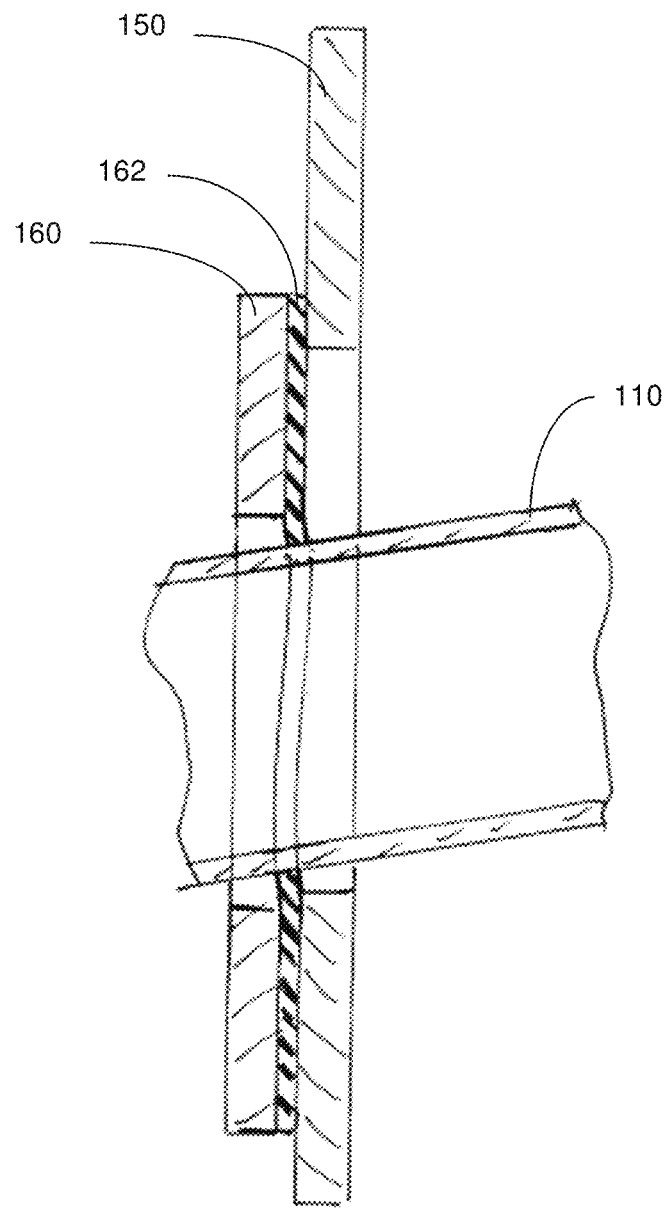
FIG. 22 is a partial cross-sectional view of the support used with the device of FIG. 21 in a tilted orientation.

The sealing material may be a gasket that is flexibly deformable. Such a characteristic allows for the sealing material to accommodate adjustments in position of the conduit, while also maintaining the seal between the surface of the wall and the conduit. For example, as shown in FIG. 22, while the conduit may be positioned at a particular angle of inclination, the seal remains unbroken. Further, the sealing material 162 may be composed of a composition that also provides an appropriate degree of support for the conduit while placed in the angled position.

The sealing material may comprise any suitable composition that is flexible, yet is appropriate for maintaining a seal. In some embodiments, the sealing material includes at least one of an elastomer, rubber, silicone, any other suitable composition and/or combinations thereof.

While FIG. 22 shows how the sealing material distorts upon adjustment of the conduit into an angled orientation, the sealing material 162 not only maintains the seal so as to prevent fluid flow from one side of the wall to the other over the exterior of the conduit, but also provides support for the conduit in the angled orientation. That is, the sealing material 162 may function as a gasket that substantially holds the conduit at the angled orientation. Accordingly, the sealing material mitigates the occurrence of creep of the conduit from its set angled orientation, reducing potential inaccuracies in the overall indication(s) of differential pressure between rooms within which opposite ends of the conduit are present.

In some embodiments, the device includes features that are adjustable in length so as to accommodate installation of the device into different walls of varying thickness.

Figure 23:
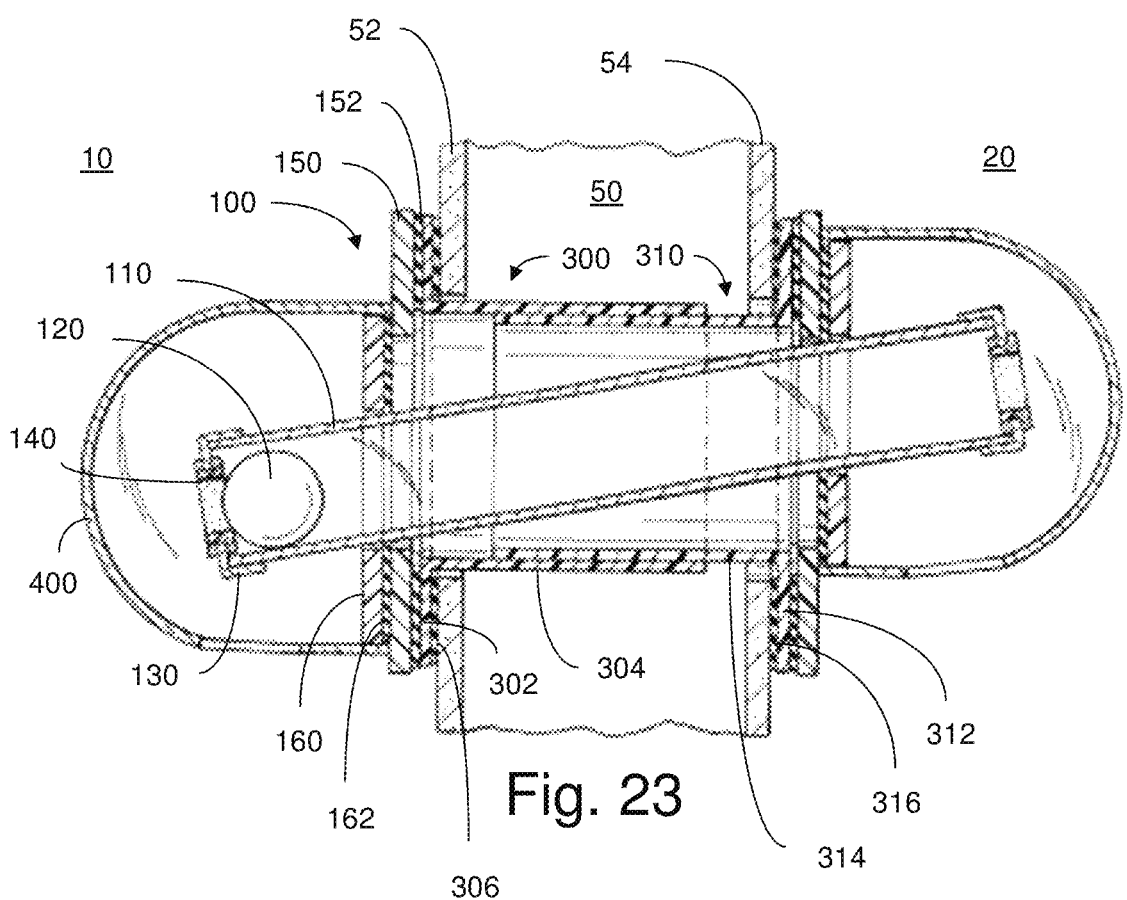
FIG. 23 is a cross-sectional view of another device for detecting a differential pressure in accordance with some embodiments.
Figure 24:
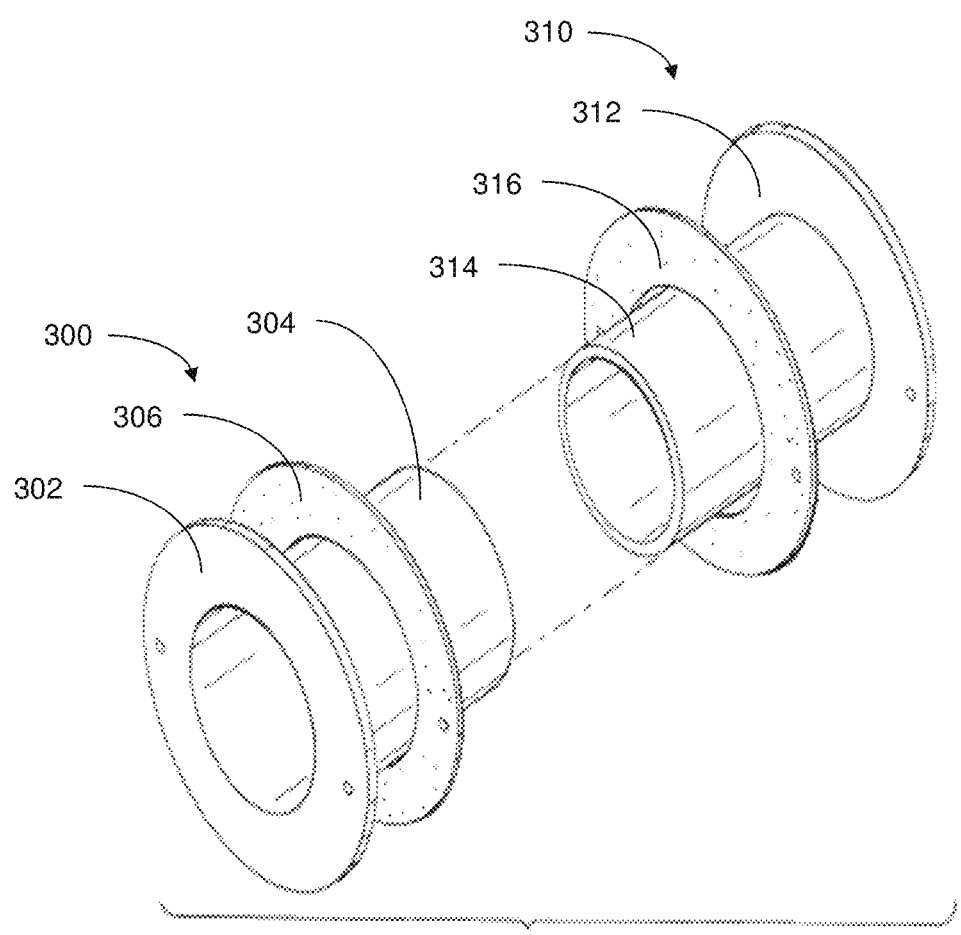
FIG. 24 is a perspective view of an adjustable portion of a device for detecting a differential pressure in accordance with some embodiments.

The embodiment illustrated in FIGS. 23-24 includes the device installed with telescoping wall cavity barriers 300, 310. Here, the wall flanges 150 and associated sealing materials 152 are attached to respective wall cavity barriers 300, 310, which are, in turn, attached to the exterior surfaces of the walls 52, 54. As shown in FIG. 23, when installed, the wall cavity barriers 300, 310 define a space within which the conduit 110 is housed, providing an additional degree of protection for the conduit within the wall. In some embodiments, wall cavity barriers provide protection for the conduit from any contaminants within the wall cavity 50 outside the lumen of the wall tubes 304, 305 from transmission into either of the rooms 10, 20 or conversely, any contaminants from either room 10, 20 from entering into the wall cavity outside the lumen of the wall tubes 304, 305.

As depicted in FIG. 24, the wall cavity barriers 300, 310 may include respective wall plates 302, 312, wall tubes 304, 314 and sealing materials 306, 316. The wall plates 302, 312 provide for attachment of the device to the wall during installation. That is, the wall plates may be attached (e.g., via fasteners, adhesives, etc.) on opposite sides of the wall to surfaces 52, 54 so that the wall tubes 304, 314 may extend into the wall and provide protection and support for the angled conduit. Sealing materials 306, 316 may protect transmission of air between rooms 10, 20 and the wall cavity 50.

The wall tubes 304, 314 operatively engage with one another, as shown in FIG. 23, so as to provide a housing for the conduit. For example, the wall tubes may be telescoping or otherwise slidable with respect to one another so that the wall cavity barrier may be appropriately installed in walls having different thicknesses. In some embodiments, the wall tubes may include features, such as spring-loaded protrusions along the length of one tube and corresponding holes along the length of another tube that allow the overall length housed by the wall tubes to be fixedly adjustable. Or, the wall tubes may include appropriate interference/snap fit features that provide length adjustability of the tubes with respect to one another. Alternatively, the wall tubes may be removably attached to each other via a suitable fastener and/or adhesive material. Telescoping tube arrangements may be of a sufficient interface fit so as to prevent transmission of contaminated or unwanted air between the wall cavity 50 and the lumen of the wall tubes 304, 314.

As shown in FIGS. 23-24, the sealing materials 306, 316 may have openings for respective wall tubes 304, 314 so that a seal is formed between the exterior surfaces of the wall 52, 54 and the wall plates 302, 312.

Figure 25:
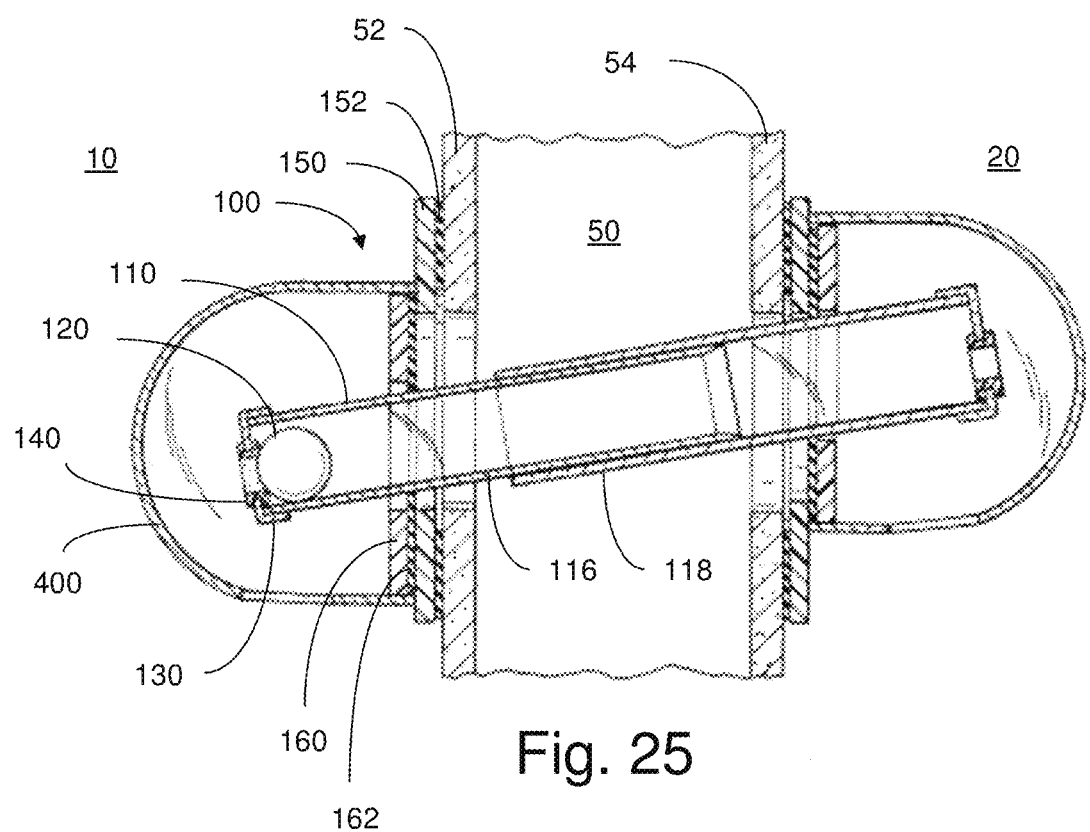
FIG. 25 is a cross-sectional view of another device for detecting a differential pressure in accordance with some embodiments.
Figure 26:
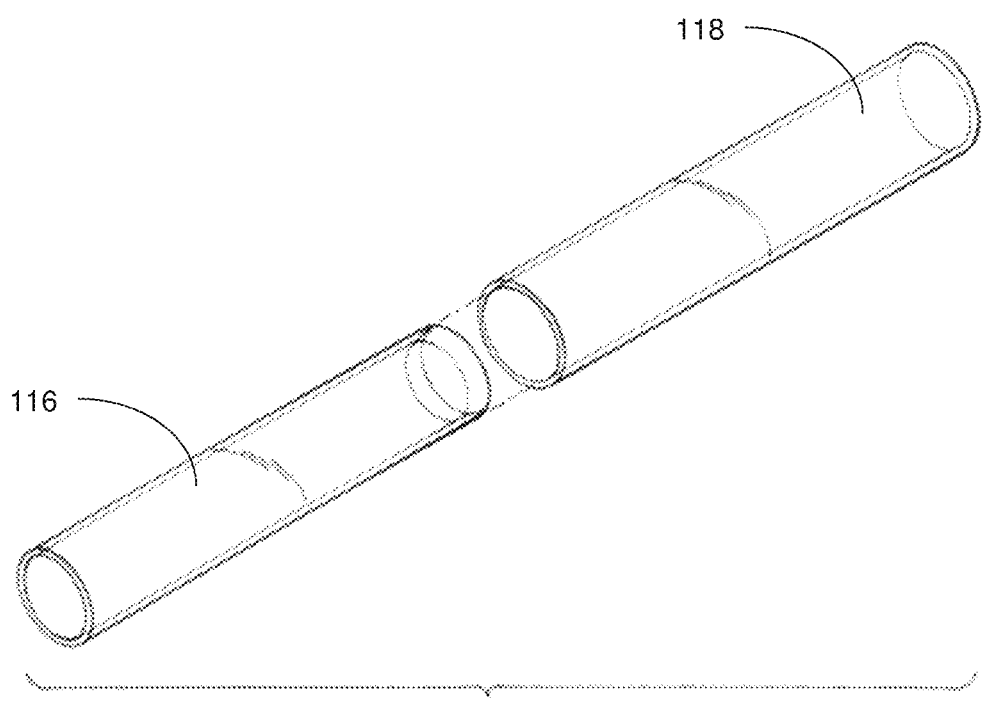
FIG. 26 is a perspective view of another adjustable portion of a device for detecting a differential pressure in accordance with some embodiments.

In some embodiments, the conduit itself may be adjustable in length. FIGS. 25-26 depict a telescoping conduit. In this embodiment, the conduit includes a first portion 116 and a second portion 118 that are operatively engaged with one another so as to provide for length adjustability of the conduit. For instance, the first and second portions of the conduit are configured to be telescoping or otherwise slidable with respect to one another. As a result, the device may be installed into different walls having varying thickness.

Similar to the wall tubes discussed above, the first and second portions of the conduit may include features that allow the length of the conduit to be appropriately adjusted. For example, such portions may include spring-loaded protrusions along the length of one portion and corresponding holes along the length of the other portion so that the overall length of the conduit is fixedly adjustable. Or, the conduit portions may have appropriate interference/snap fit features that provide length adjustability of the conduit. In some embodiments, the respective portions of the conduit may be removably attached to each other via a suitable fastener and/or adhesive material.

As noted above, FIGS. 27-33 illustrate various embodiments of a device that provides an indication of directional air flow and differential pressure existing between spaces separated by a wall where adjustability of the device lies on one side of the wall. Such a device may include a turret-type arrangement, which employs multiple conduits in fluid communication with one another where one of the conduits may be tilted with respect to the other, or angled with respect to a horizontal plane. Other arrangements may be possible.

Figure 27:
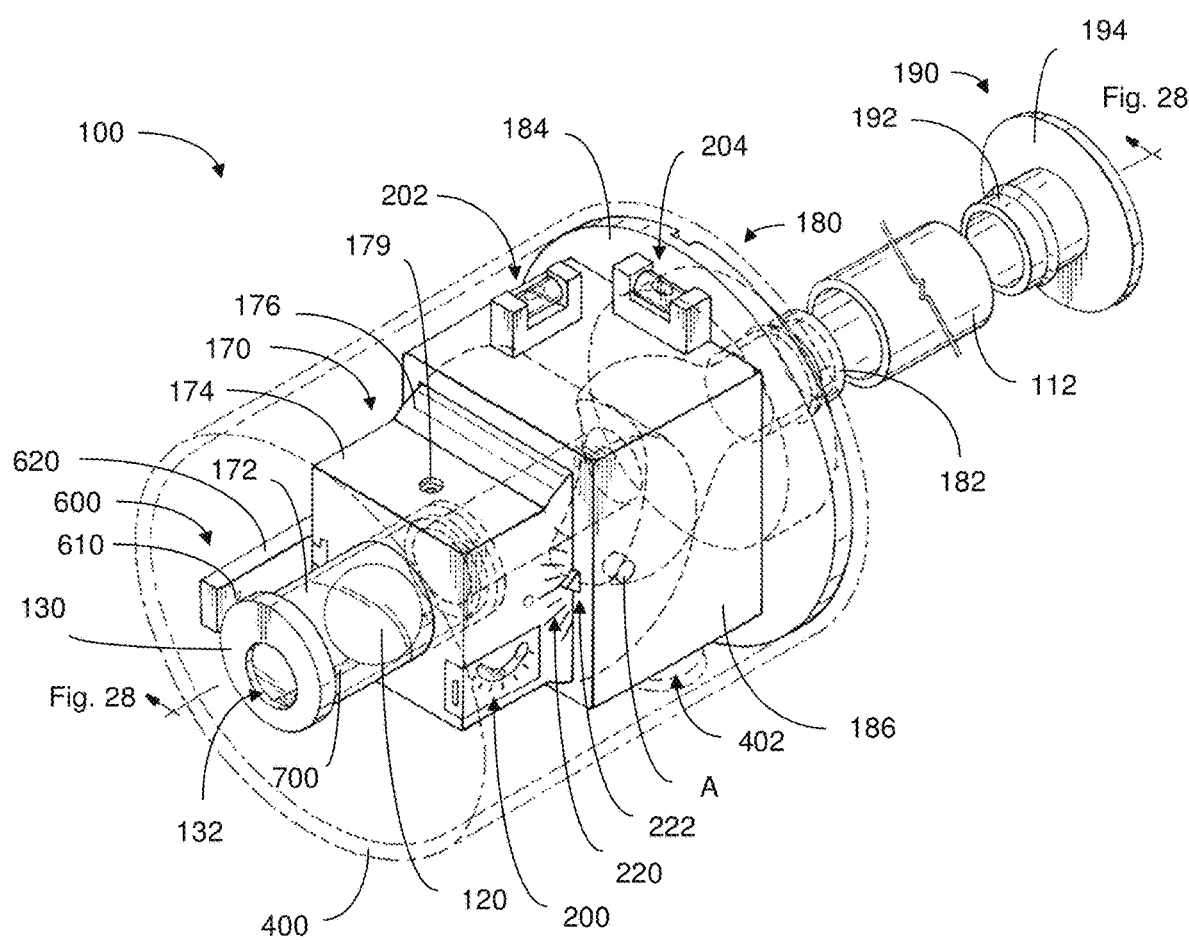
FIG. 27 is a perspective view of another device for detecting a differential pressure in accordance with some embodiments.
Figure 28:
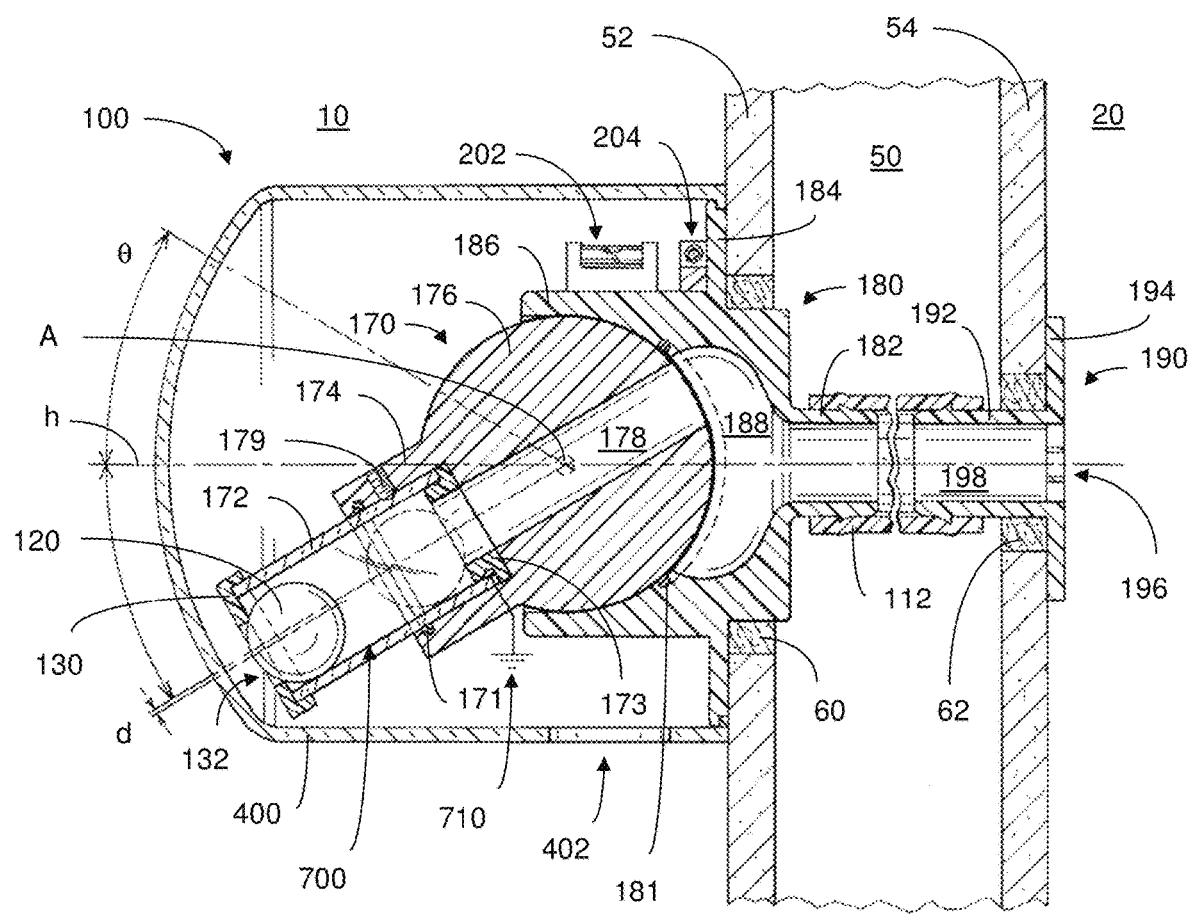
FIG. 28 is a cross-sectional view of the device of FIG. 27.
Figure 29:
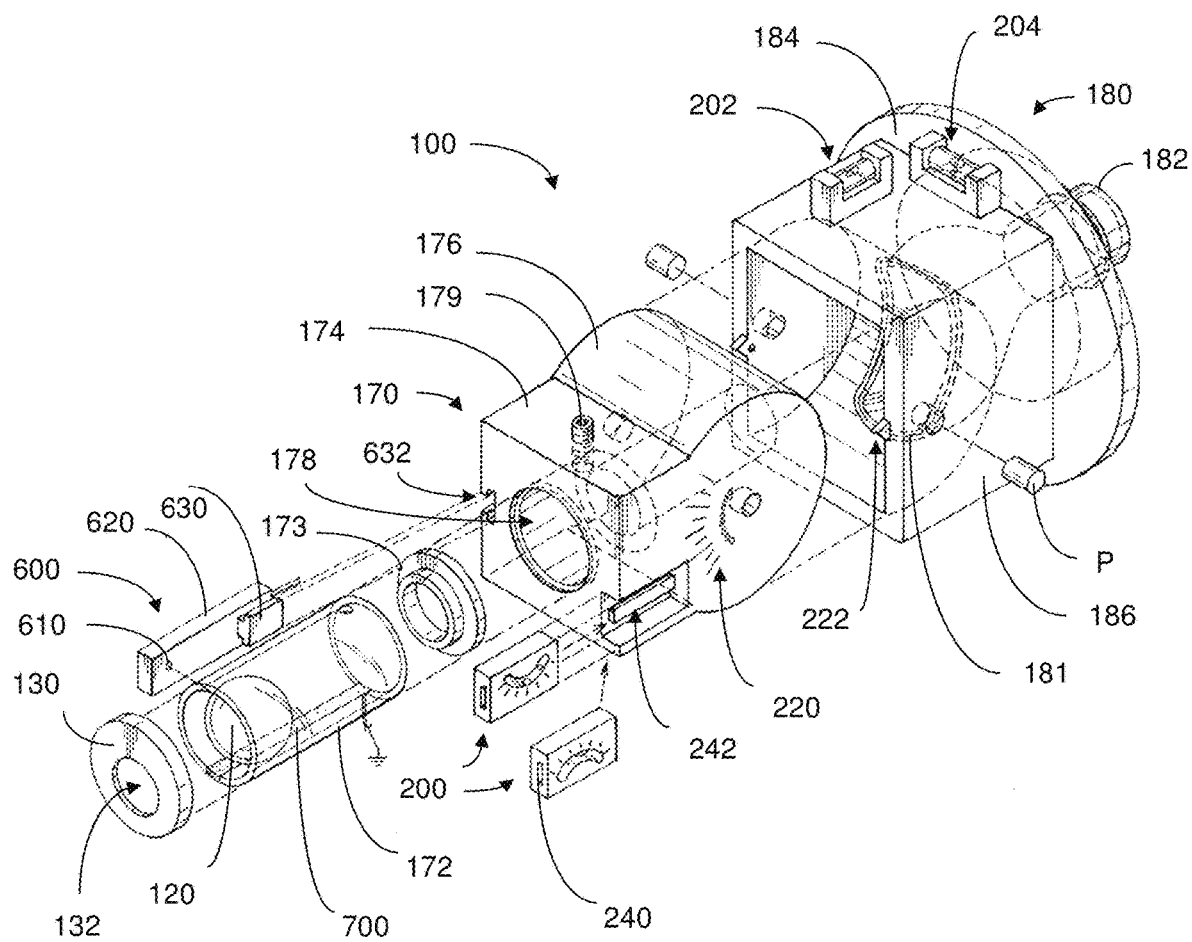
FIG. 29 is an exploded perspective view of a portion of the device of FIG. 27.

As shown in FIGS. 27-29, the device 100 includes a turret portion 170, a yoke portion 180 and a terminal portion 190. In this embodiment, the turret portion 170 is coupled to the yoke portion 180 to provide a rotatable housing for the conduit 172 to be suitably inclined. The yoke portion 180 may, in turn, be coupled with the terminal portion 190 to form a passageway through the wall cavity between otherwise separate spaces. The yoke portion 180 includes structure suitable for the adjustable part of the device 100 to be attached to or otherwise installed at one side surface 52 of the wall. That is, the angle of inclination of the device 100 may be adjusted from only one side of the wall. In various embodiments, the yoke portion 180 may include a mounting flange 184 that may be appropriately secured against or interfaced with one side 52 of the wall, for example, via a fastener, interference fit, interlocking arrangement, or other suitable method. To ensure suitable alignment of the device against the wall and in the vertical (gravitational) direction, structure members such as shims or adjustable standoff screws may be optionally employed with the mounting flange, as desired.

Similarly, the terminal portion 190 includes structure suitable for the device 100, upon installation, to form a passageway through the wall cavity 50. For instance, the terminal portion 190 may include a mounting flange 194 that may be appropriately secured against or interfaced with the other side 54 of the wall, such as with a fastener, interference fit, interlocking arrangement, etc. Any suitable arrangement may be used for installing and holding the device in place across the wall cavity 50 (e.g., solid wall, space between wall surfaces). As further shown, the terminal portion 190 further includes an opening 196 that allows fluid/air to flow between the passage 198 and the room 20.

FIG. 28 shows the device 100 installed and, in this embodiment, the yoke portion 180 includes an extension 182, and the terminal portion 190 also includes an extension 192. The extensions 182, 192 may complement one another or otherwise extend toward one another so as to optionally meet. Such extensions may provide support for a first conduit 112 in extending through the wall between separated spaces 10, 20, allowing fluid (e.g., air) to flow therebetween. As shown, one end of the first conduit 112 is coupled to one side 52 of the wall via the yoke portion 180. The other end of the first conduit 112 is coupled to the other side 54 of the wall via the terminal portion 190. The coupled unit including the first conduit 112 and extensions 182, 192 provide a passage 198 through which fluid (e.g., gas, liquid, etc.) may flow between rooms 10, 20. The conduit 112 may be secured to the extensions 182, 192 via any suitable manner, for example, through an adhesive attachment, interlocking/interference fit, threaded configuration, etc.

It can be appreciated that other configurations for suitably securing a conduit 112 in place may be possible. That is, it is not necessary for the yoke portion 180 or terminal portion 190 to include extensions 182, 192 as the conduit 112 may extend across the wall cavity 50 (e.g., solid wall, space between wall surfaces, etc.) without an arrangement which includes respective extensions 182, 192. In some embodiments, while not expressly shown in the figures, the yoke portion 180 and/or terminal portion 190 may include corresponding receptacles—each having a coupling region for interfacing with respective ends of the conduit 112. For instance, the yoke portion 180 and/or terminal portion 190 may include a respective recess shaped or otherwise configured to receive and secure a corresponding end of the conduit 112 thereto. In some cases, the recess may be lined with a gasket to maintain a seal between the internal passage of the conduit and the external environment.

The yoke portion 180 may include a yoke body 186 that interfaces and is rotatably coupled with the turret body 176 of the turret portion 170. As shown, the yoke body 186 may include a receptacle for receiving the turret body 176, and the turret body 176 may rotate and/or pivot within the receptacle. The yoke body 186 also includes a passage 188 that accommodates fluid flow therethrough between the turret body 176 and the passage 198. As further depicted in FIGS. 28-29, the yoke portion 180 may optionally include a gasket 181 for maintaining a seal at the interface between the yoke body 186 of the yoke portion 180 and the turret body 176 of the turret portion 170.

As shown, a second conduit 172 may be attached or otherwise coupled with the turret body 176 so as to be rotatable about a pivot axis A, which may be provided by an appropriate connection between the yoke body 186 and the turret body 176. It can be appreciated that the second conduit 172 may be pivotally or rotatably coupled to the yoke body in other ways. For instance, the second conduit itself may function as a pivoting turret, without requiring a rotatable housing (i.e., turret body) through which the second conduit may be coupled to the yoke body. As an example, the second conduit may directly be rotatably or pivotally coupled to a support structure (e.g., yoke body) via a pivoting attachment without need for a housing (e.g., turret body) to carry the conduit. Any suitable pivoting attachment may be employed, for example, a pivot pin/axle and/or fastener (e.g., wingnut) for tightening the pivoting attachment between the conduit and the support structure.

In some embodiments, a region and/or component (e.g., inclinometers) of the yoke portion may provide an indication as to whether the pivot itself is appropriately aligned or oriented according to the horizontal reference plane h, as determined by gravity, so that the device provides accurate readings. That is, such an arrangement allows the movable element or ball to translate along linear paths within the conduit that are consistent at various angles of inclination.

The second conduit 172 may be coupled with the turret body 176 in any suitable manner. For some embodiments, as shown, the turret body 176 may include a conduit receptacle 174 having a recess for receiving an end (e.g., attachment end) of the conduit 172. The conduit receptacle 174 may optionally include a retainer 171 and/or a fastener 179 for suitably holding the conduit 172 in place so that the conduit 172 is secured to the turret body 176. The end stop 173 may also serve to hold the conduit 172 in place. The retainer 171, end stop 173 and/or fastener 179 may include any appropriate structure or configuration. For example, the retainer 171 and/or end stop 173 may include a rubber gasket that provides resistance to movement of the conduit 172 when situated within the receptacle. Or, the fastener 179 may include a threaded rod that may be sufficiently turned so as to push up against the conduit 172 and keep the conduit secured in place upon establishing a suitable amount of contact force therebetween. As depicted, the opposite end (e.g., free end) of the second conduit 172 may extend away from the pivot axis A, and the wall. The turret body 176 may further include a passage 178 which, in concert with passages 188, 198, permits the fluid (e.g., gas, liquid, etc.) to flow between rooms 10, 20.

As shown, the second conduit 172 may be arranged so as to rotate about a pivot point and along a substantially vertical plane, having a pitch without appreciable horizontal offset or yaw. In some embodiments, such rotating motion may be such that the conduit rotates within the sagittal plane extending through the apparatus.

In accordance with aspects of the present disclosure, the conduit 172 may include one or more balls 120, or other movable element(s), which may provide an indication as to whether a particular differential pressure threshold exists between separated spaces on either side of the wall, as determined by the angle of incline θ of the conduit 172. For example, the ball(s) 120 may be adapted to move back and forth within the conduit 172 depending on the fluid flow through the device 100 that results from the direction and amount of differential pressure between the rooms 10, 20. In accordance with aspects of the present disclosure, when the conduit 172 is tilted at an angle with respect to the horizontal or vertical reference plane, absent net fluid flow through the conduit 172, the ball 120 falls by force of gravity to the lower free end of the conduit 172. Though, given a sufficient amount of fluid flow through the conduit 172, from the lower free end of the conduit towards the higher end (e.g., due to a net pressure differential), the force of gravity on the movable element may be overcome such that the ball 120 moves toward the higher end of the conduit.

Similar to embodiments described herein, the end stops 130, 173 may be located at opposite ends of the conduit 172 and may, at least in part, be provided as cushioning for the ball 120 as it comes into contact with respective ends of the conduit. In accordance with the present disclosure, for some embodiments, the ends stops 130, 173 include an energy absorbing material (e.g., elastomeric material, polymer, rubber gasket, etc.) that attenuates sound upon contact of the ball 120. Without such energy absorbing capability, an audible sound (e.g., when two relatively hard surfaces come into contact) may be distinctly heard. In some cases, such a sound may be distracting and it may be preferable for the sound to be substantially eliminated or reduced.

As discussed above, the turret, along with the conduit 172, may be configured to pivot or otherwise rotate about the yoke body along a vertical plane (e.g., sagittal plane) of the device 100. In various embodiments, such a configuration may be beneficial so that the ball 120 or other movable element may be suitably aligned with the opening 132 at the free end of the conduit 172. As described herein, for some embodiments, the center axis of the opening 132 may be slightly offset a distance d from the center axis of the conduit 172, yet substantially aligned with the center axis along which the ball 120 or other movable element travels. That is, the opening 132 and path of travel for the ball 120 may share substantially the same center axis, offset from the center axis of the conduit 172. Such a configuration may provide an added amount of stability for the ball 120, reducing the likelihood that the ball 120 spins or migrates from the opening through which fluid/air flows.

Though, it can be appreciated that it is not required for the turret to rotate or pivot along the sagittal plane. In some embodiments, while not shown in the figures, the turret is configured to rotate so as to exhibit adjustments in pitch and yaw. For example, rotation of the turret may involve movement of the end of the conduit in an approximately circular or ellipsoidal path.

Similar to that described with respect to other embodiments of the present disclosure, the device may include a protective covering 400 surrounding the turret. The protective covering 400 includes an opening 402 through which fluid may flow between rooms 10, 20 via the conduits 112, 172 and passages 178, 188, 198. In various embodiments, the protective covering 400 fits over the wall flange 184 and may include any suitable sealing material that may be associated therewith.

In accordance with aspects of the present disclosure, any suitable differential pressure set point indicator may be employed. As shown, a differential pressure set point indicator 200 is provided as an inclinometer which is mounted or otherwise located on the turret portion 170, in alignment with the inclination of the second conduit. Accordingly, the inclinometer is rotatable along with the conduit 172 and provides an indication as to the amount of pitch that exists in the orientation of the conduit 172. The angle of inclination of the conduit 172 is correlated to a threshold differential pressure between the two spaces that is sufficient to cause the ball 120, or other movable element within the conduit, to move from one region (e.g., a vertically lower position) of the conduit towards an opposite region (e.g., a vertically higher position) of the conduit. In some embodiments, as shown, the inclinometer is attached to a rotatable turret which rotates both the conduit 172 and the inclinometer together as a unit.

FIG. 29 depicts an exploded view of an illustrative embodiment of a device 100 where various types of differential pressure set point indicators 200 may be employed. In this figure, indicators (e.g., inclinometers with ball or bubble pointers) similar to those depicted in FIGS. 4-11 are provided, though, it can be appreciated that any suitable indicator may be employed. In various embodiments, the differential pressure set point indicator 200 includes a coupling region 240 which may, in turn, have a structure that corresponds to a complementary coupling region 242 of the turret portion 170. In this embodiment, the coupling region 240 of the indicator 200 includes a slot, and the coupling region 242 of the turret portion 170 includes a protruding ridge along which the slot may slide. Hence, the indicator 200 may slide along the ridge of the turret portion 170 for suitable coupling therewith. While not expressly shown in the figures, the indicator 200 may be suitably attached or otherwise secured to the turret portion 170, for example, via a fastener, interference fit, or other appropriate arrangement.

In some embodiments, the device 100 optionally may include markings and a pointer which provide an indication as to the desired setting for threshold pressure differential between spaces separated by the wall based on the inclined angle θ of the conduit 172. Such markings and pointer may act as a suitable differential pressure set point indicator. For instance, in the embodiment illustrated in FIG. 27, the turret body 176 includes markings 220 and the yoke body 186 includes a pointer 222 extending therefrom. In some cases, the markings 220 may indicate units of pressure. Here, the markings 220 and pointer 222 correlate the level of incline of the conduit 172 with the threshold pressure differential required between opposing spaces to cause the movable element to travel from a lower position of the conduit to a higher position.

In some embodiments, to accentuate the markings, a number of detents (e.g., respective recesses/protrusions) may be provided, for example, between the yoke body and the turret. Each detent position may correspond to an angle θ at which the conduit 172 is inclined which, in turn, corresponds to a particular threshold differential pressure across the wall that is sufficient to cause lift of the movable element at that particular angle of incline.

In some embodiments, the device may be configured so as to provide desired directional differential pressure threshold values that are calibrated against the true gravitational horizontal or vertical "plumb" planes of the earth. This provides for a greater degree of accuracy compared to a non-gravity sensing set point indicator that is coupled to a device and calibrated to a plumb vertical plane, where the indicator is mounted on a wall that is assumed to be installed "plumb," yet in fact may be significantly out of plumb and therefore indicating potentially significant inaccurate directional differential pressures. Accordingly, even if the wall upon which the device is installed is not perfectly vertical, the device still, within an acceptable tolerance, may provide an accurate indication of the threshold level of pressure differential required between rooms to move the ball between opposing ends of the conduit.

In various embodiments, the device 100 may include inclinometers 202, 204, which may provide an indication as to whether the device 100 itself is tilted. For instance, as shown in FIGS. 27-29, the inclinometers 202, 204 may be located on the yoke body 186, optionally positioned perpendicular with respect to one another. Here, a first inclinometer 202 indicates whether the yoke body 186 exhibits any variation in pitch, and the second inclinometer 204 indicates whether the yoke body 186 exhibits any variation in roll. Accordingly, during installation, the inclinometers 202, 204 may provide an indication as to whether the upper surface of the yoke body is level. For some embodiments, while not shown in the figures, a single inclinometer may be mounted on to the yoke body 186 and oriented diagonally, so as to provide an indication as to whether the yoke body 186 is suitably level (e.g., zero pitch and zero roll).

In certain embodiments, for a yoke body 186 that is suitably level, the markings 220 on the turret body 176 that are in alignment with the pointer 222 of the yoke body 186 may indicate the threshold differential pressure required to move the ball 120 between opposing ends of the second conduit 172. Though, if the first inclinometer 202 indicates that the yoke body 186 exhibits a non-level pitch with respect to gravity, then the threshold differential pressure indication provided by the markings 220 and pointer 222 may be inaccurate. If the second inclinometer 204 indicates that the yoke body 186 exhibits a non-level roll which may also affect the pitch of the conduit 172, the ball 120 might not be suitably aligned within the conduit 172 to be able to form a suitable seal when located at the end of the conduit. When this seal remains malformed, movement of the ball 120 within the conduit 172 as well as the pointer markings may be unreliable and inaccurate. Accordingly, for various embodiments, it may be preferable for the inclinometers 202, 204 to indicate that the device 100 is sufficiently level to provide an accurate reading of the threshold differential pressure between spaces required to move the ball between end positions within the respective conduit. If preferred or required, the orientation of the device (e.g., pitch, roll, yaw) can be corrected, for example, by using structural elements, such as shims and/or adjustable standoff screws, etc.

The device 100 may include a detector 600 which provides an indication as to where the ball 120 or other movable element is located within the conduit 172. For example, as depicted in FIG. 27, the detector 600 may include a sensor 610 and an arm 620 on which the sensor is mounted. In some embodiments, the sensor 610 may be a photodetector, motion sensor or camera that detects whether an object is located along the direction in which the sensor is oriented. For example, when the ball is located at the free end stop 130 of the conduit 172, the amount of light received by the sensor 610 may be reduced as compared to when the ball is located at the mounted end stop 173. Upon receiving a threshold reduction or change in light, the detector may provide an indication that the ball is located at the free end of the conduit 172.

As further shown in FIG. 29, the detector 600 may include a coupling region 630 which may, in turn, have a structure that corresponds to a complementary coupling region 632 of the turret portion 170. Here, the coupling region 630 of the detector 600 includes a T-shaped ridge and the coupling region 632 of the turret portion 170 includes a slot for receiving the corresponding T-shaped ridge. Thus, the detector 600 may slide along the slot of the turret portion 170 for suitable coupling therewith. It can be appreciated that the detector 600 may be suitably attached or otherwise secured to the turret portion 170 or other part of the device 100 through any appropriate arrangement, for example, via a fastener, interference fit, etc.

Other arrangements for detecting the location of the ball or other movable element within the conduit 172 may be possible. For example, the detector may include a suitable tactile sensor that detects contact from the ball or other movable object within the conduit, indicating the location thereof.

When the humidity of the surrounding environment is relatively low, there may be a tendency for triboelectric-electrostatic charge to build up at various regions of the device. For example, low humidity air passing through the conduit and over the ball may give rise to electrostatic build up. An accumulation of static discharge may affect the accuracy of the device in providing an indication of whether a threshold of directional differential pressure is met. For example, the movable element may be attracted to or repulsed from a particular region where electrostatic charge has built up. Thus, in such instances, gravity acting on the movable element might not be the only force to be overcome by air flow through the conduit.

Accordingly, in some embodiments, one or more of the conduits of the device may be lined with a conductive material 700 (e.g., metal lining/band) which may, in turn, be connected to a ground 710. Such a conductive material 700 may itself act as an electrical ground that serves to dissipate electrostatic charge build-up in and/or around the device which may be otherwise undesirable. The conductive material may include a metal strip, anti-static coating, other suitable materials, or combinations thereof.

Figure 30A:
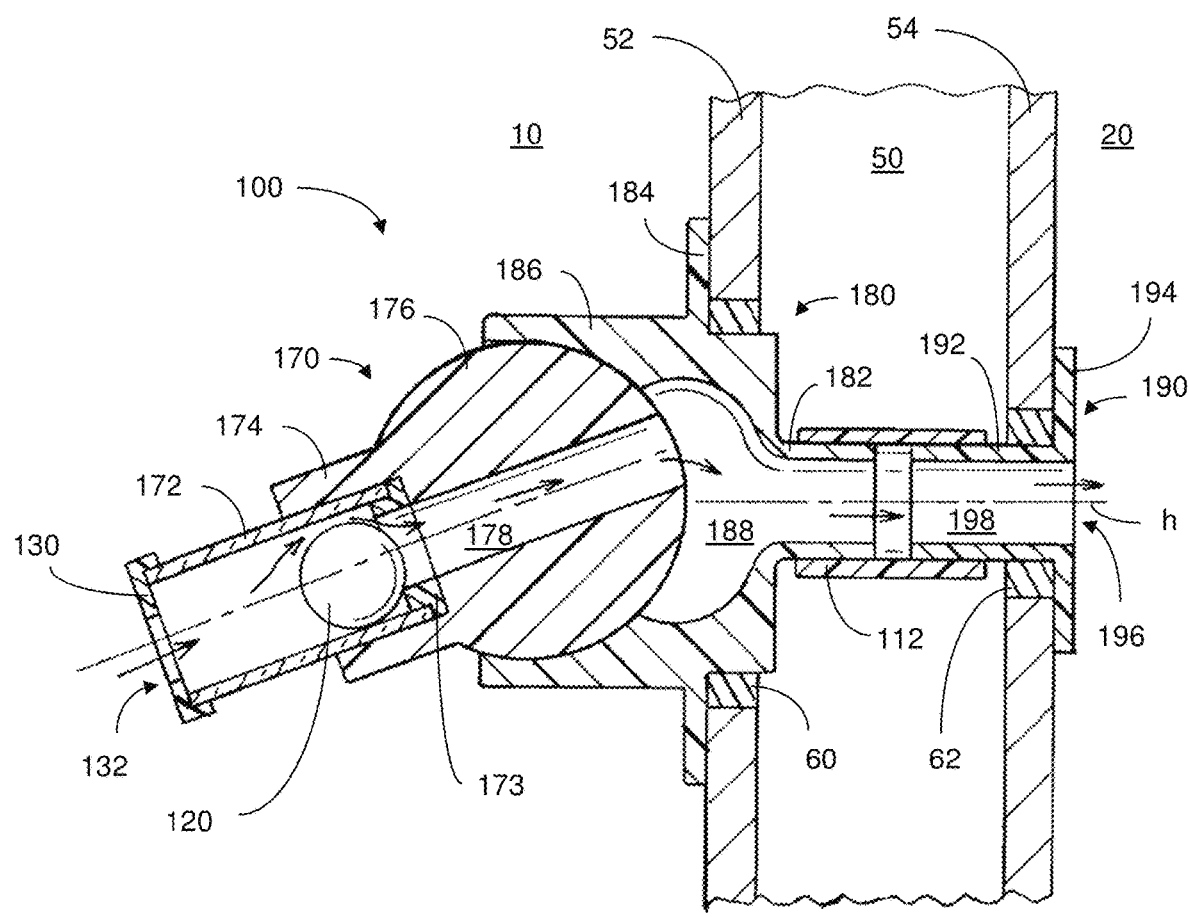
FIGS. 30A-30B are cross-sectional views of another device for detecting a differential pressure in accordance with some embodiments.
Figure 30B:
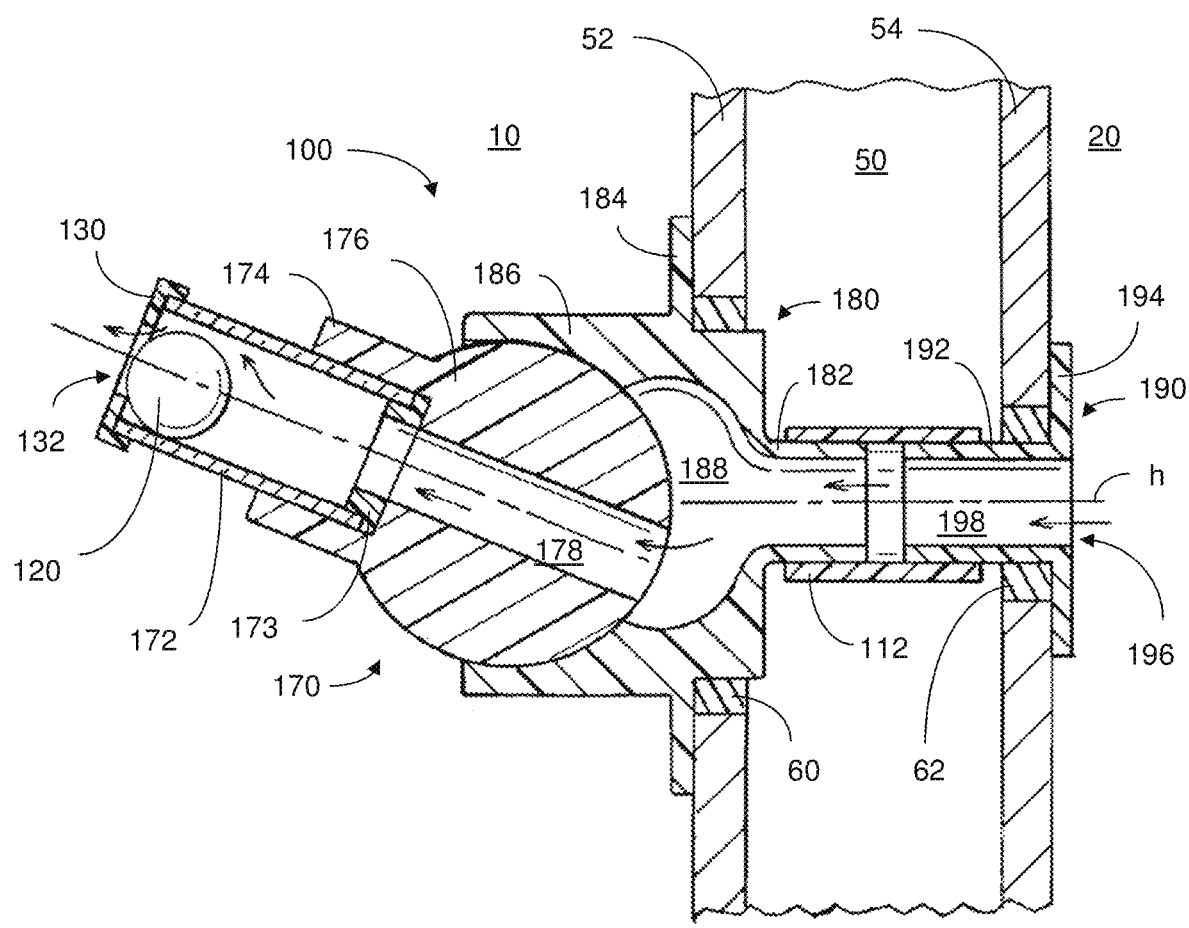

FIGS. 30A-30B show various embodiments of the device 100 where the pressure difference between rooms 10, 20 generates an amount of air flow sufficient to move the ball 120 from a lower end to a higher end. As described herein, the device 100, when installed, may be used to detect whether a desired directional differential pressure exists between the separate rooms 10, 20. When the air pressure between the separate rooms 10, 20 is the same, there will be no net flow of fluid through the conduit from one room to the other, and the ball drops toward the lowest point within the conduit 172.

FIGS. 30A-30B depict schematics of when the air pressure between the rooms 10, 20 is not equal, resulting in a potential of net flow of fluid through the conduit 172. As shown, in FIG. 30A, the turret portion 170 and conduit 172 are rotated downwardly to provide an indication of whether the pressure in room 10 is greater than the pressure in room 20 by a threshold amount. In FIG. 30B, the turret portion 170 and conduit 172 are rotated upwardly to provide an indication of whether the pressure in room 20 is greater than the pressure in room 10 by a threshold amount.

In FIG. 30A, the pressure within room 10 is higher than the pressure within room 20. Hence, air will flow in a direction from room 10 to room 20, as indicated by the arrows shown within the conduit 172. If the force generated by the differential pressure and potential of air flow from room 10 to room 20 meets a threshold value sufficient to overcome the force of gravity on the ball, the ball will then move from the lower end of the conduit 172 towards the higher end of the conduit 172.

Thus, for the embodiment of FIG. 30A, when the ball 120 moves from the end stop 130 (located at a lower position) to the end stop 173 (located at a higher position), the device provides an indication that the differential pressure between rooms 10, 20 has met a corresponding threshold differential pressure In some embodiments, the receptacle 174 extends away from the turret body 176 by a sufficient distance such that the ball 120 is covered by the wall of the receptacle 174 as it comes up against the end stop 173, so that the ball is substantially hidden from view. Accordingly, for this embodiment, when the ball 120 is moved so as to be shrouded by the receptacle 174, it can be determined that at least a threshold differential pressure between rooms 10, 20 exists.

In the embodiment shown in FIG. 30B, the pressure within room 20 is higher than the pressure within room 10, causing air to flow in a direction from room 20 to room 10, as indicated by the arrows. Similar to that with respect to FIG. 30B, if the force generated by the differential pressure and potential of air flow from room 20 to room 10 meets a threshold value sufficient to overcome the force of gravity on the ball, the ball will then move upward within the conduit 172. Accordingly, as depicted in FIG. 30B, upon movement of the ball from the end stop 173 (located at a lower position) to the end stop 130 (located at a higher position), the device provides an indication that the differential pressure between rooms 10, 20 has met a corresponding threshold differential pressure.

In some embodiments, the pressure differential between rooms is sufficient to move the movable element from a lower position to a higher position within the conduit, without flow of fluid around the movable element. For example, a movable element that is sized to exactly match the inner diameter of the conduit, and having a relatively frictionless interface therebetween, may be pushed by the pressure differential without fluid flowing past the movable element, such as in a piston-type arrangement.

As provided herein, the device may include multiple conduits. For example, a first conduit may be located on one side of the wall and a second conduit may be located on the opposite side of the wall. In some embodiments, the angle of inclination of the first conduit on one side of the wall is adjustable independently from the angle of inclination of the second conduit on the other side of the wall. Alternatively, the angle of inclination of respective conduits on opposing sides of the wall may be adjusted together, dependent upon one another. For instance, when the angle of inclination of a first conduit on one side of the wall is adjusted, the angle of inclination of the second conduit on the other side of the wall may also be adjusted to match the new angle of the first conduit, or may remain different from the angle of inclination of the first conduit.

In certain embodiments, the device may include a fire stop system that, upon the detection of a threshold level of smoke or fire, provides a barrier that blocks or otherwise mitigates travel of the smoke/fire from one room to another. The fire stop system may include various components used to seal the passage within the wall. For example, the fire stop may include an intumescent substance that swells significantly as a result of heat exposure. The fire stop materials may be appropriately installed, for example, employing intumescent material as known to those of ordinary skill in the art. In some cases, the intumescent substance may produce char, which is a substance that acts to retard heat transfer.

FIG. 28 shows an embodiment where intumescent fire stops 60, 62 are provided as rings that are located along the wall surfaces 52, 54. Once exposed to a sufficient level of heat, various parts of the device 100 such as the yoke portion 180 and terminal portion 190 may melt or otherwise degrade, and the fire stops 60, 62 will expand radially inward so as to substantially block the passageway within the wall cavity 50 between rooms 10, 20. While FIG. 28 depicts the fire stop system to be located along the wall surfaces 50, 52 (e.g., formed of a non-combustible material), it can be appreciated that the fire stop system may be located at any other suitable location. In some embodiments, a fire stop system may be provided as an intumescent strip or ring located within the passage 198 or sleeve, as shown in FIGS. 31A-33. Such a configuration may be beneficial where, for certain temperature ranges, the yoke and/or terminal portions of the device may not degrade and the intumescent strip or ring more readily expands into the otherwise open passageway to obstruct travel of smoke or fire therethrough.

In some embodiments, the device may include a gate system installed on one or both sides of the wall which is configured to block the passageway between rooms upon detection of smoke or fire. FIGS. 31A-33 depict various embodiments that depict such a gate system, described further below.

Figure 31A:
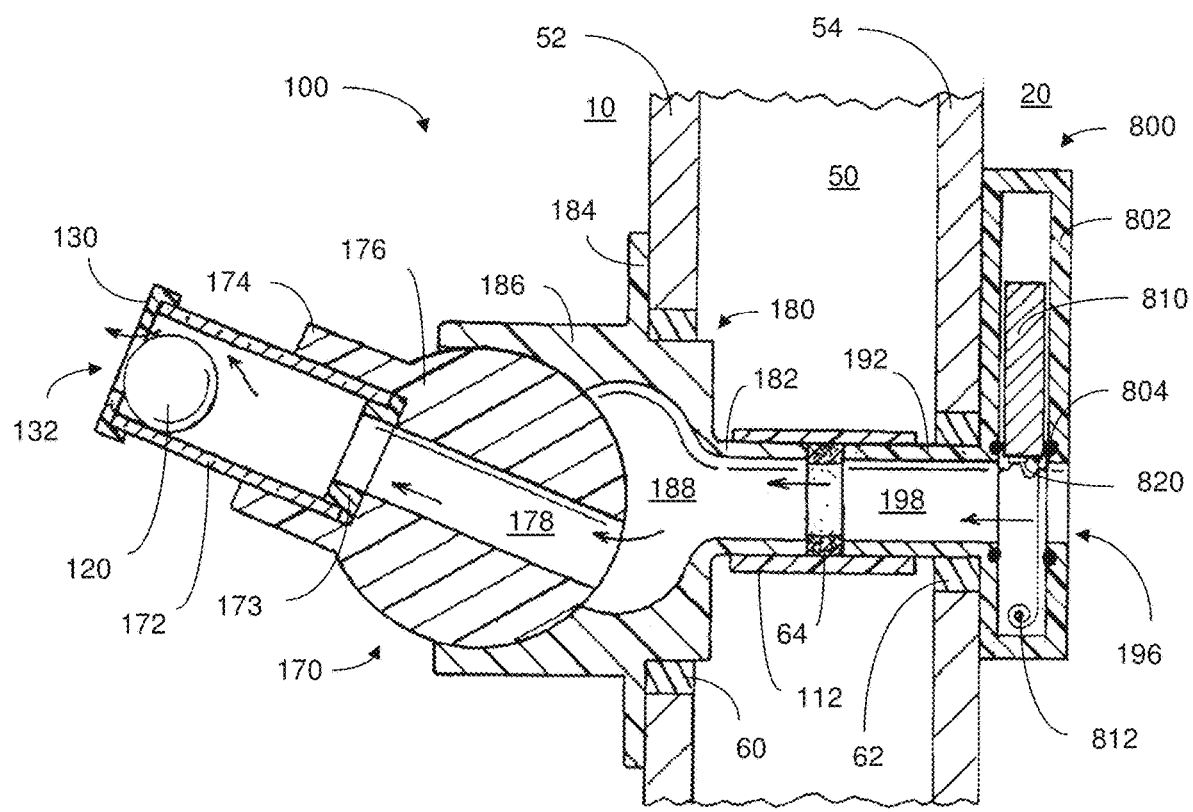
FIGS. 31A-31B are cross-sectional views of yet another device for detecting a differential pressure in accordance with some embodiments.
Figure 31B:
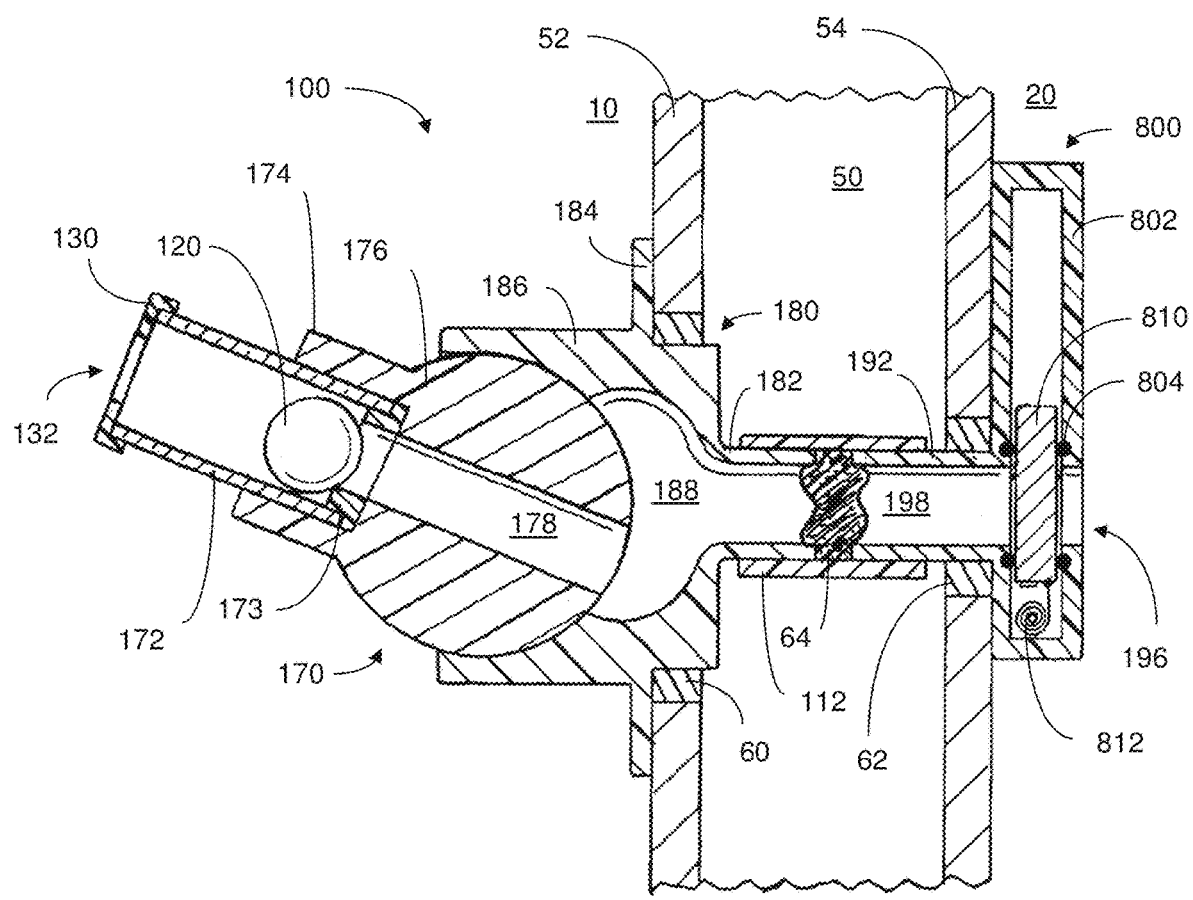

FIGS. 31A-31B depict an illustrative embodiment of a gate system 800 that includes a housing 802 and a shutter 810 provided within the housing, which provides a mechanical guide for the shutter 810 to move between open and closed positions. In various embodiments, the housing 802 may provide structure that allows the shutter 810 to slide back and forth (as shown in FIGS. 31A-31B), swing open and shut (not expressly shown), or have any other suitable arrangement. The gate system 800 may include a barrier 820 (e.g., fusible link) that keeps the shutter 810 in an open position, preventing closure thereof until the barrier is broken or otherwise opened. The housing 802 may further include sealing material 804 for maintaining a seal between the passage 198 and the surrounding environment when the shutter 810 is closed. When the level of smoke or fire reaches a certain threshold, the shutter 810 moves from an open position to a closed position.

Actuating the gate system 800 in a manner that closes the shutter 810 may serve to obstruct air flow within the passageway between rooms, resulting in containment of the smoke and/or fire. Actuation of the gate system 800 may involve moving the shutter 810 between open and closed positions by a suitable stimulus, such as heat, an electrical signal and/or any other appropriate signal. As further shown, an intumescent fire stop material 64 may be located within the passage 198, for forming an occlusion to smoke/fire travel therethrough.

The shutter 810 may be constructed in any suitable manner. For example, the shutter 810 may be weighted such that upon breakage of the barrier 820 (e.g., via melting, degradation, etc.), the shutter 810 falls or slides downward (e.g., similar to a guillotine) so as to block the opening into the passageway. Or, as shown for some embodiments, when in the open position, the shutter 810 is biased toward a closing position by a spring 812. When the barrier 820 breaks, the spring 812 pulls the shutter from the open position to the closed position. Alternatively, a barrier for holding the shutter to prevent it from closing may not be required. For example, the shutter 810 may be electromechanically controlled to move back and forth, similar to a sliding gate or garage door system. Upon detection of a threshold level of smoke or fire, the gate system may cause the shutter to automatically close, blocking the passage of smoke/fire between rooms.

The gate system 800 may be mechanically controlled. For instance, as shown in FIGS. 31A-31B, the barrier 820 for the shutter 810 may be fusible such that, when the barrier 820 is exposed to a sufficient amount of heat (e.g., temperature up to 165 degrees F. or greater), the barrier may melt or otherwise degrade. Upon degradation of the barrier to a sufficient degree, the shutter 810 may be permitted to close, for example, via weight and/or pulling force caused by the spring 812.

FIG. 31A shows an illustrative embodiment where the passages 178, 188, 198 are sufficiently open such that air is able to flow between rooms 10, 20, as indicated by the solid arrows. As depicted, the pressure difference between rooms 10, 20 is large enough that air flowing through the conduit 172 causes the ball 120 to be pushed up against the end stop

130. Upon exposure to a threshold level of heat (e.g., 150-165 degrees F. or greater), should the ball 120 melt and allow hot fluid/air to reach the barrier, the barrier 820 breaks and the shutter 810 is pulled shut, as depicted in FIG. 31B, blocking air flow into the opening 196. In addition, FIGS. 31B shows the intumescent material of the fire stop material 64 having expanded so as to further block air from traveling through the passageway.

Figure 32A:
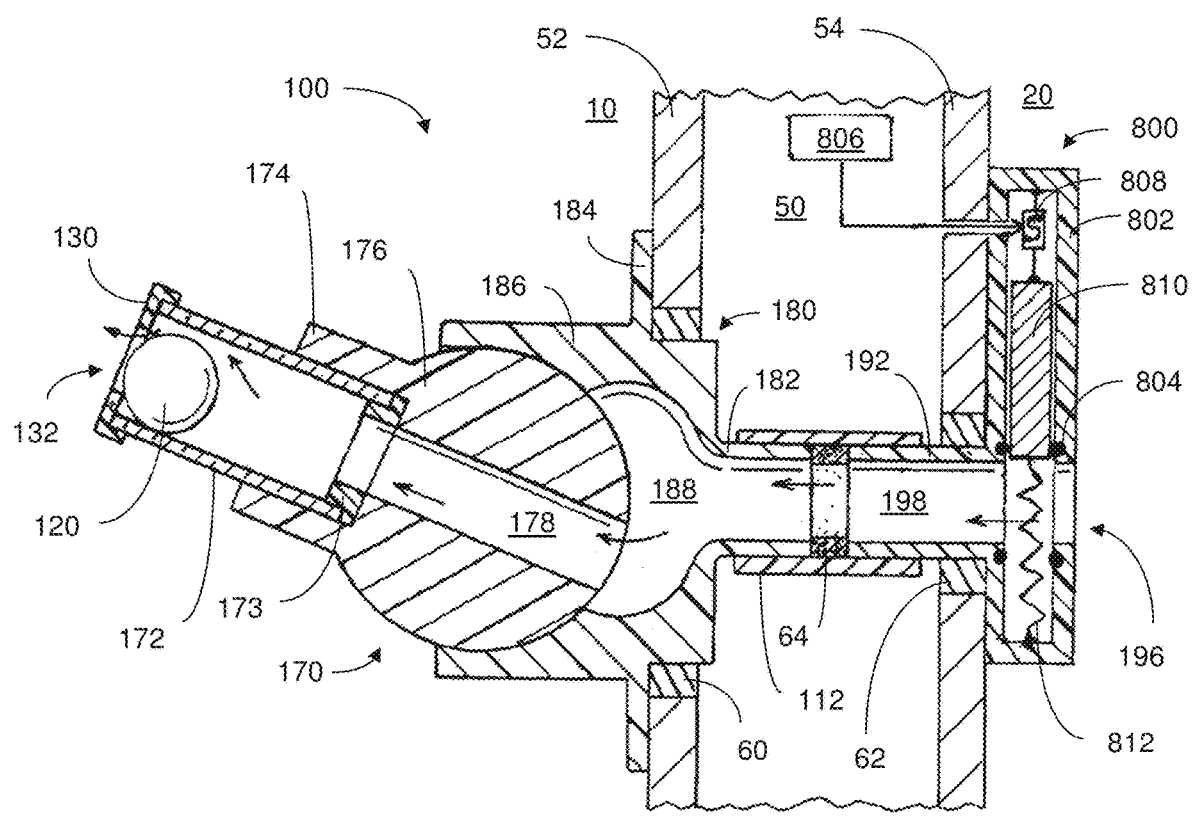
FIGS. 32A-32B are cross-sectional views of another device for detecting a differential pressure in accordance with some embodiments.
Figure 32B:
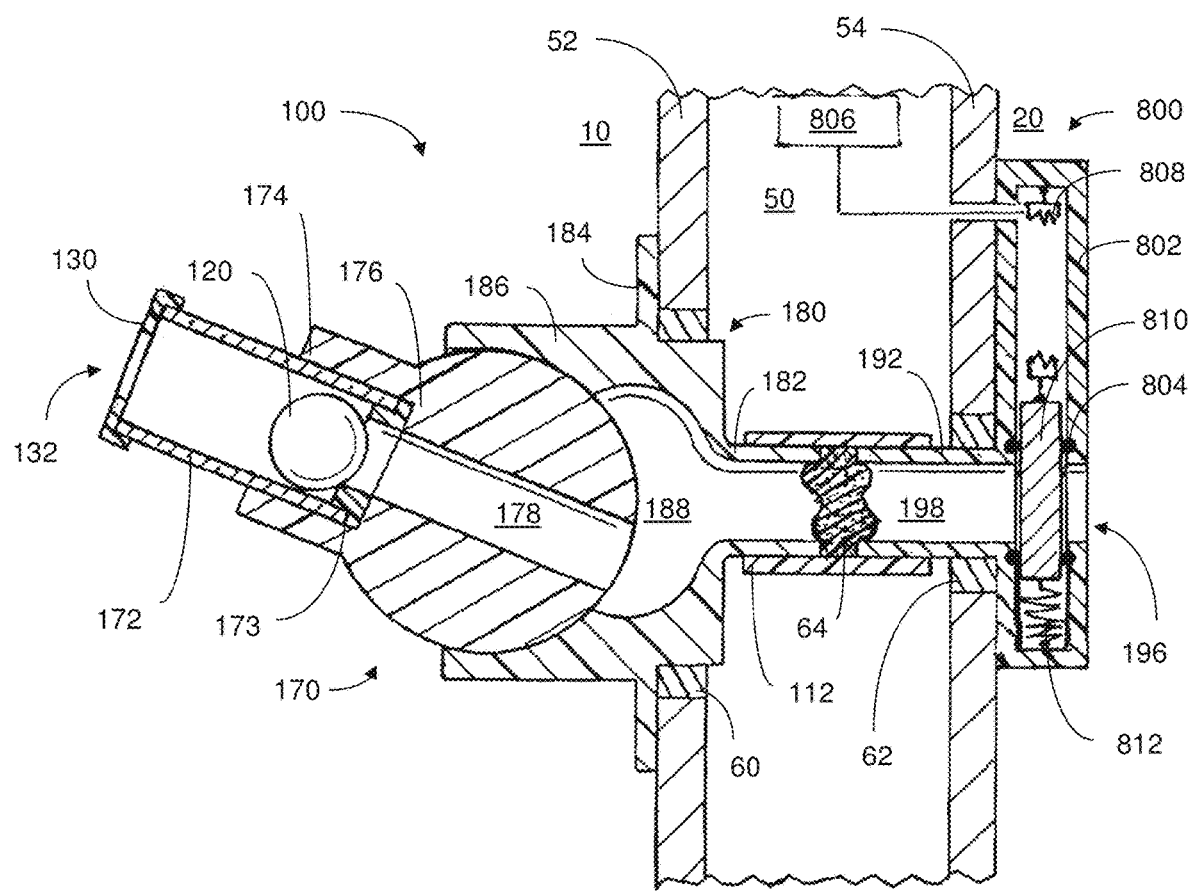

In some embodiments, the gate system 800 may be electrically controlled. For example, as shown in FIGS. 32A-32B, the gate system 800 may be in electrical communication with a smoke or fire detector/alarm 806. When the smoke or fire detector/alarm 806 senses the presence of a hazardous amount of fire or smoke in either room, a respective signal is sent to an actuator or fusible link 808, allowing for the shutter 810 to move from the open position to the closed position. FIGS. 32A depicts air flow through the passages 178, 188, 198, causing the ball 120 to be pushed up against the end stop 130. Upon exposure to a threshold level of heat as sensed by the detector 806, the link 808 is caused to break and the shutter 810 is pulled shut by the spring 812, blocking air flow into the opening 196. It can be appreciated that the detector 806 may be located at any appropriate location and is not required to be within the wall cavity between spaces. In fact, the detector 806 may be located remotely exterior to the device (e.g., within one of the rooms). As also provided for other smoke or fire sensing systems, upon detection of hazardous amounts of fire/smoke, appropriate emergency systems and/or personnel may also be alerted.

Figure 33:
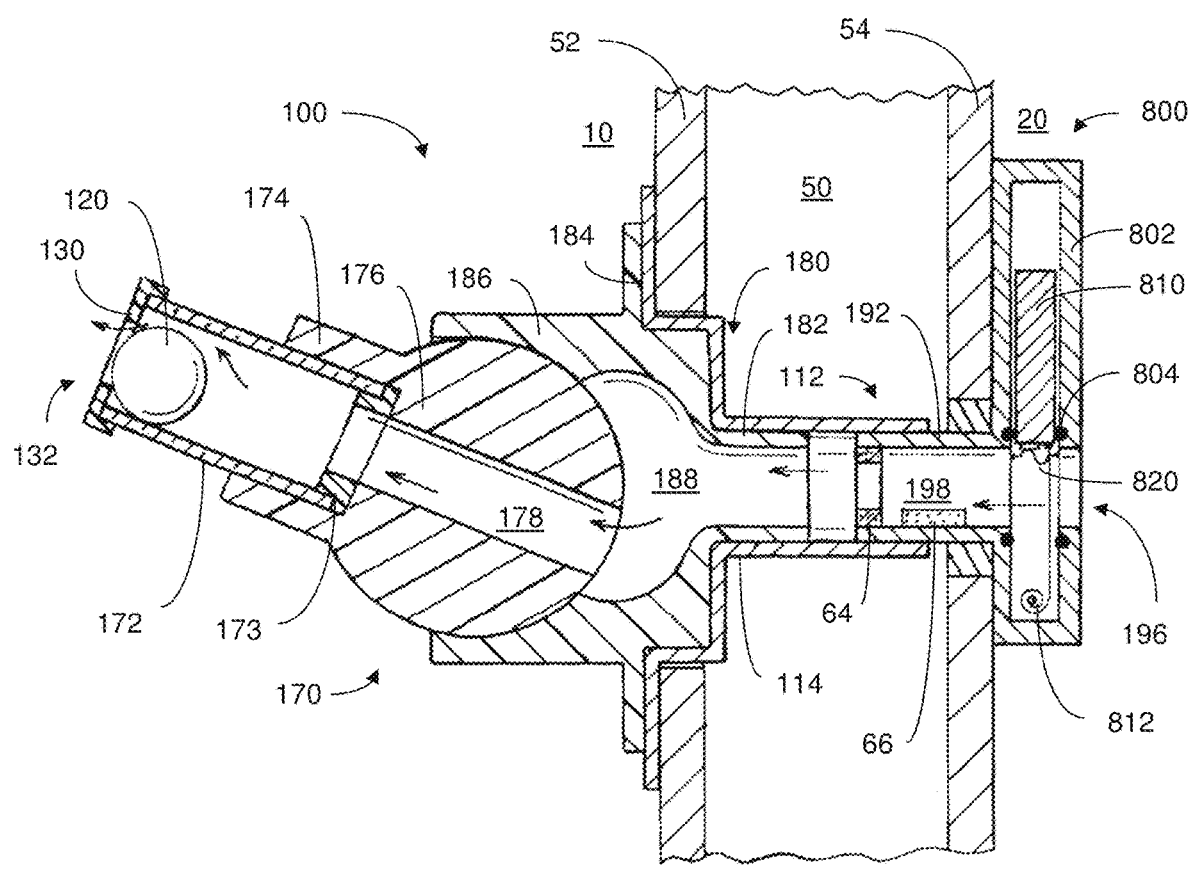
FIG. 33 is a cross-sectional view of another device for detecting a differential pressure in accordance with some embodiments.
Figure 34A:
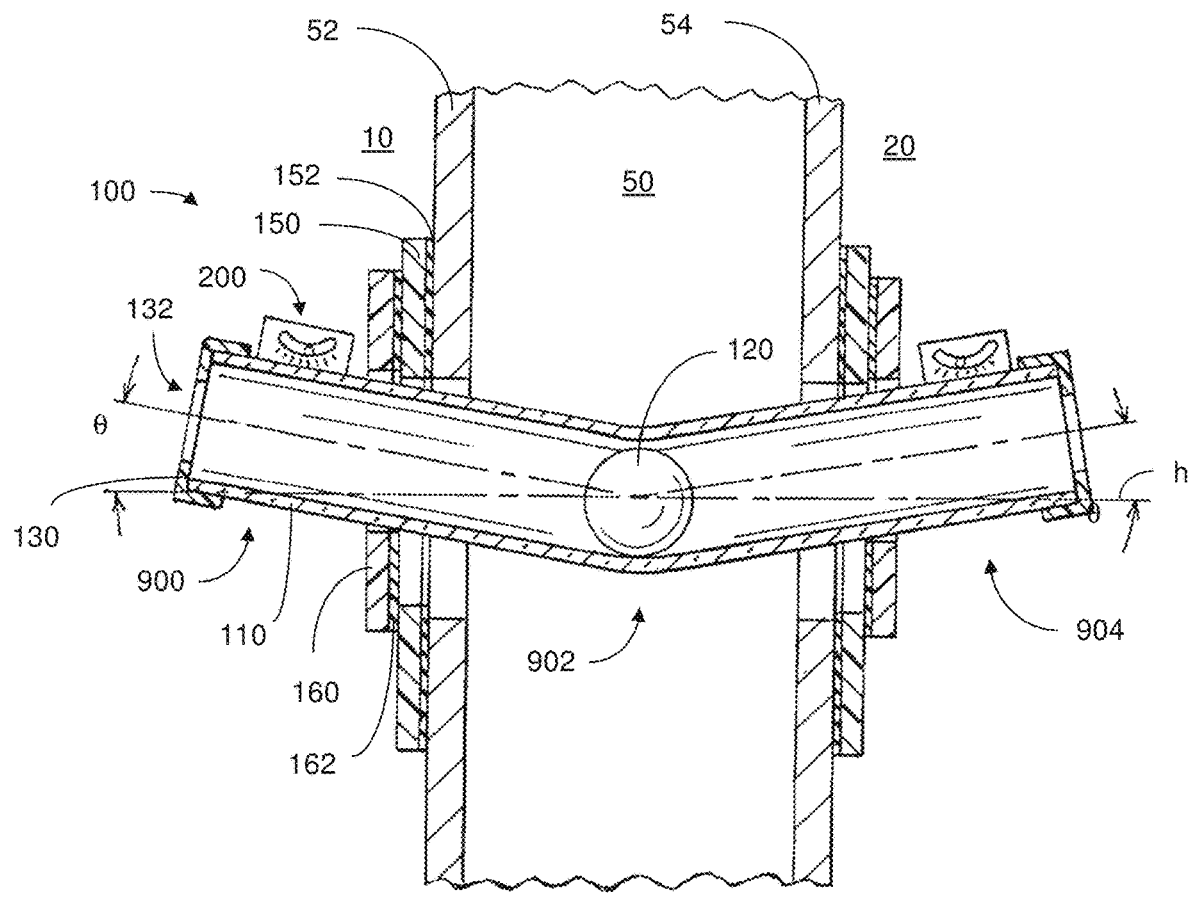
FIGS. 34A-34B are cross-sectional views of yet another device for detecting a differential pressure in accordance with some embodiments.
Figure 34B:
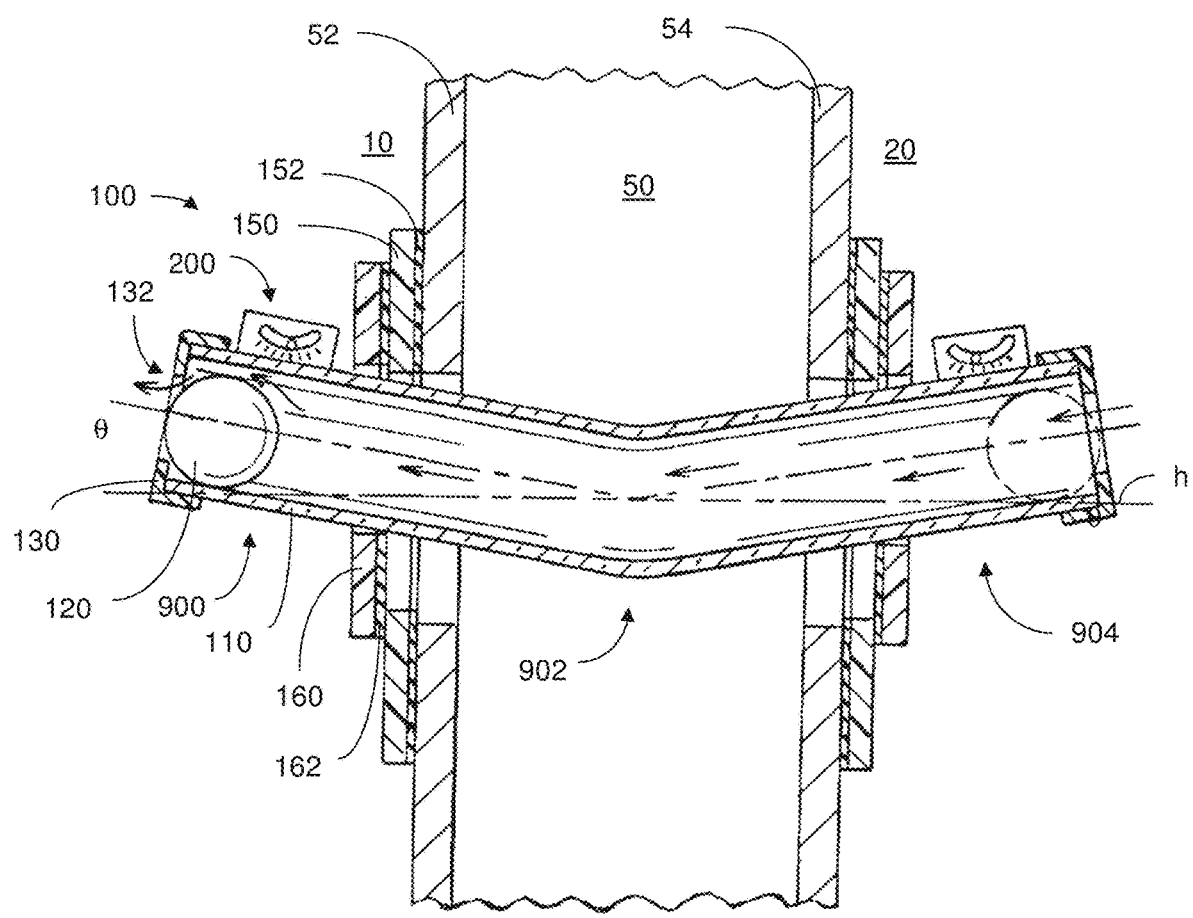

In some embodiments, as shown in FIG. 33, the device 100 may include a sleeve 114 forming a secured attachment between other parts of the device and the wall. As shown, the sleeve 114 may be located between the wall and the yoke portion 180, and may be mated or coupled therewith. The sleeve 114 may also be attached or otherwise coupled to the housing 802 of the gate system 800. The sleeve 114 may also include any suitable material, such as metal, non-combustible material, or another appropriate material. In some embodiments, the sleeve 114 may be adjustable in length (e.g., telescoping). FIG. 33 further depicts an intumescent strip 66 located within the passage 198, as noted above. It can be appreciated that features of this embodiment such as the sleeve and intumescent strip may be suitably employed for any other embodiment in accordance with the present disclosure.

Once a room is configured for a particular positive or negative pressure mode, for some cases, the room will typically remain in that positive or negative pressure mode, despite adjustments in the magnitude of the desired pressure differential. That is, the net direction of fluid flow between spaces may remain the same such that the room remains a positive or negative pressure room. However, for some applications, it may be desirable for the pressure mode of a room to be switched between positive and negative pressure.

Accordingly, in various embodiments described herein, to accommodate a reversal in the pressure mode between spaces, the overall inclination of the conduit may be reversed. That is, the incline of the conduit may be adjusted such that gravity causes the movable element to fall in the other direction. For instance, a straight conduit may be tilted on one side of the wall from an upwardly inclined to a downwardly inclined position, to accommodate for the net directional change in fluid flow.

In an example, animal holding rooms in vivarium research laboratories may have applications that require the room pressure to be switched between positive and negative flow, yet the overall magnitude of differential pressure between spaces remains substantially the same. Accordingly, instead of or in addition to adjusting the incline of the conduit, it may further be convenient for a differential pressure indicator to provide an indication as to whether a particular magnitude of minimum differential pressure exists between spaces and whether the pressure flow is positive or negative.

Alternatively, FIGS. 34A-34B depict another illustrative embodiment of a device 100 including a conduit 110 that extends through the wall, yet exhibits a bent curvature. As shown, the conduit 110 is bent in the middle where openings 132 at opposing ends are both located above the middle of the conduit. Or, for some embodiments, the conduit 110 has a first portion 900, a middle portion 902 and a second portion 904. The first portion 900 extends from the room 10 toward the middle portion 902 and is inclined at an angle θ with respect to the horizontal reference plane h. Similarly, the second portion 904 extends from the room 20 toward the middle portion 902 and is also inclined at an angle θ with respect to the horizontal reference plane h. Though, it can be appreciated that the angle of incline of the first and second portions 900, 904 is not required to be the same. In this embodiment, the end of the first portion 900 located within the room 10 and the end of the second portion 904 located within the room 20 are both vertically higher than the middle portion 902.

As further shown, a variety of inclinometers 200 in accordance with the present disclosure may be positioned on the inclined portion of either side of the conduit. For example, gravity sensing inclinometers 200 that correlate the angle θ of tilt of the conduit with the particular pressure required to overcome the force of gravity may be employed, similar to various embodiments described herein.

A curved tube such as that shown in FIGS. 34A-34B may allow for an indication of reversed room pressure without having to adjust or reset the indicator. In this embodiment, when the room directional differential pressure is less than the desired threshold value, in either direction, gravity moves the ball to the middle of the tube, as shown in FIG. 34A. When the differential pressure in either direction reaches the threshold value, the force of fluid/air flow on the ball overcomes the force of gravity and the ball moves from the middle of the tube toward the end of the tube to which the fluid/air flows.

As noted above, the device may include multiple conduits. For instance, for a system such as that described with respect to FIGS. 34A-34B, more than one tube may include each of the first portion 900, middle portion 902 and second portion 904. That is, the first portion 900, middle portion 902 and second portion 904 may be made up of two or more tubes. It can be appreciated that the device 100 may employ multiple tubes or conduits in any suitable configuration.

In addition, the angle of incline of one or more of the conduits may be optionally adjustable. For instance, multiple conduits may be rotatably coupled with respect to one another via any suitable arrangement (e.g., hinge, pivot, etc.) within the wall cavity. In some embodiments, even though the conduits may move relative to one another, such a coupling may provide a smooth interface so as not to introduce a lip or surface that would otherwise impede movement of the movable element(s). As a result, it may be possible to change the angle of inclination of certain portion(s) of the device so as to suitably adjust the magnitude of the threshold differential pressure that is required between spaces to lift the movable element from the middle portion to either end of the conduit.

Having thus described several aspects of at least one embodiment of the present disclosure, it is to be appreciated various alterations, modifications, and improvements will readily occur to those skilled in the art. Such alterations, modification, and improvements are intended to be part of this disclosure, and are intended to be within the spirit and scope of the present disclosure. Accordingly, the foregoing description and drawings are by way of example only.

What is claimed is:

1. A device comprising:
   a first conduit configured to be in fluid communication with a first space when the device is installed in a barrier separating the first space and a second space;
   a second conduit having an opening that can permit fluid communication between the second conduit and the second space when the device is installed in the barrier, wherein the second conduit is in fluid communication with the first conduit, and an angle of inclination of the second conduit is adjustable with respect to a horizontal reference plane such that a first region of the second conduit is vertically lower than a second vertically higher region of the second conduit, and the second conduit is rotatable along a plane transverse to the barrier such that the angle of inclination of the second conduit is adjustable relative to the horizontal reference plan; and
   at least one movable element movable within the second conduit from the first vertically lower region to the second vertically higher region in response to a differential fluid pressure between the first and second spaces; wherein
   the angle of inclination of the second conduit is adjustable independently from an angle of inclination of the first conduit.

2. The device of claim 1, wherein the plane along which the second conduit is rotatable is a vertical plane.

3. The device of claim 1, further comprising a differential pressure set point indicator configured to correlate each of a plurality of angles of inclination of the second conduit with respect to the horizontal reference plane to a respective threshold differential pressure between the first and second spaces.

4. The device of claim 3, wherein the threshold differential pressure is a threshold differential pressure that is sufficient to cause the at least one movable element to move from the first, lower region of the conduit to the second, higher region.

5. The device of claim 1, wherein the second, higher region is farther from the barrier than the first, lower region.

6. The device of claim 1, wherein the second, higher region is closer to the barrier than the first, lower region.

7. The device of claim 1, further comprising a yoke body adapted to be coupled to the barrier.

8. The device of claim 1, further comprising a turret arrangement which permits the adjustment of the angle of inclination of the second conduit.

9. The device of claim 1, wherein the device is installed in the barrier.

10. The device of claim 1, wherein the angle of inclination of the second conduit is adjustable within only one plane.

11. The device of claim 1, wherein a center of the opening in the second conduit is offset from a center axis of the second conduit.

12. The device of claim 1, wherein the center of the opening in the second conduit is substantially aligned with an axis along which the movable element moves in the second conduit.

13. The device of claim 1, wherein the barrier comprises a wall.

14. A device comprising:
   a first conduit configured to be in fluid communication with a first space when the device is installed in a barrier separating the first space and a second space;
   a second conduit having an opening that can permit fluid communication between the second conduit and the second space when the device is installed in the barrier, wherein the second conduit is in fluid communication with the first conduit, and an angle of inclination of the second conduit is adjustable with respect to a horizontal reference plan such that a first region of the second conduit is vertically lower than a second vertically higher region of the second conduit, and the second conduit is rotatable along a plane transverse to the barrier such that the angle of inclination of the second conduit is adjustable relative to the horizontal reference plane; and
   at least one movable element movable within the second conduit from the first vertically lower region to the second vertically higher region in response to a differential pressure between the first and second spaces; wherein
   the angle of inclination of the second conduit is adjustable without changing the angle of inclination of the first conduit.

15. The device of claim 14, wherein the plane along which the second conduit is rotatable is a vertical plane.

16. The device of claim 14, further comprising a differential pressure set point indicator configured to correlate each of a plurality of angles of inclination of the second conduit with respect to the horizontal reference plane to a respective threshold differential pressure between the first and second spaces.

17. The device of claim 14, wherein the second, higher region is farther from the barrier than the first, lower region.

18. The device of claim 14, further comprising a turret arrangement which permits the adjustment of the angle of inclination of the second conduit.

19. The device of claim 14, wherein the angle of inclination of the second conduit is adjustable within only one plane.

20. The device of claim 14, wherein a center of the opening in the second conduit is offset from a center axis of the second conduit.

21. The device of claim 14, wherein the center of the opening in the second conduit is substantially aligned with an axis along which the movable element moves in the second conduit.

22. The device of claim 14, wherein the barrier comprises a wall.

23. A device comprising:
   a first conduit to be in fluid communication with a first space when the device is installed in a wall separating the first space and a second space, the wall having a first side facing the first space and a second side facing a second space;
   a second conduit to be in fluid communication with the second space when the device is installed in the wall, wherein the second conduit is in fluid communication with the first conduit, and an angle of inclination of the second conduit is adjustable with respect to a horizontal reference plan such that a first region of the second conduit is vertically lower than a second vertically higher region of the second conduit, and second conduit is rotatable along a plane transverse to the barrier such that the angle of inclination of the second conduit is adjustable relative to the horizontal reference plane; and at least one movable element movable within the second conduit from the first vertically lower region to the second vertically higher region in response to a differential pressure between the first and second spaces; wherein the angle of inclination of the second conduit is adjustable from only the second side of the wall.

24. A device comprising:

a first conduit configured to be in fluid communication with a first space when the device is installed in a wall separating the first space and a second space;

a second conduit having an opening that permits fluid communication between the second conduit and the second space when the device is installed in the wall, wherein the second conduit is in fluid communication with the first conduit, and an angle of inclination of the second conduit is adjustable with respect to a horizontal reference plane such that a first region of the second conduit is vertically lower than a second vertically higher region of the second conduit, and the angle of inclination of the second conduit is adjustable; and at least one ball movable within the second conduit from the first vertically lower region to the second vertically higher region in response to a differential fluid pressure between the first and second spaces; wherein a center axis of the opening of the second conduit is offset from a center axis of the conduit.

25. The device of claim 24, wherein the opening is circular.

26. The device of claim 25, wherein the conduit is cylindrical.

27. The device of claim 26, wherein the center axis of the opening is aligned with an axis along which a center of the ball travels.

* * * * *